US011010017B2

(12) United States Patent
Chaudhri et al.

(10) Patent No.: US 11,010,017 B2
(45) Date of Patent: May 18, 2021

(54) EDITING INTERFACE

(71) Applicant: Apple Inc., Cupertino, CA (US)

(72) Inventors: Imran A. Chaudhri, San Francisco, CA (US); Bas Ording, San Francisco, CA (US); Steven P. Jobs

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/261,112

(22) Filed: Apr. 24, 2014

(65) Prior Publication Data

US 2014/0237360 A1 Aug. 21, 2014

Related U.S. Application Data

(63) Continuation of application No. 14/142,640, filed on Dec. 27, 2013, now Pat. No. 10,620,780, which is a continuation of application No. 11/849,938, filed on Sep. 4, 2007, now Pat. No. 8,619,038.

(51) Int. Cl.
| | |
|---|---|
| *G06F 3/0481* | (2013.01) |
| *G06F 3/0488* | (2013.01) |
| *G06F 3/0486* | (2013.01) |
| *G06F 3/01* | (2006.01) |
| *G06F 3/0484* | (2013.01) |
| *G06F 3/0482* | (2013.01) |

(52) U.S. Cl.
CPC .......... *G06F 3/04817* (2013.01); *G06F 3/016* (2013.01); *G06F 3/0482* (2013.01); *G06F 3/0486* (2013.01); *G06F 3/0488* (2013.01); *G06F 3/04842* (2013.01); *G06F 3/04847* (2013.01)

(58) Field of Classification Search
CPC ... G06F 3/04817; G06F 3/0486; G06F 3/0483
USPC .......................................................... 345/173
See application file for complete search history.

(56) References Cited

U.S. PATENT DOCUMENTS

| | | |
|---|---|---|
| 5,051,736 A | 9/1991 | Bennett et al. |
| 5,146,556 A | 9/1992 | Hullot et al. |
| 5,196,838 A | 3/1993 | Meier et al. |
| 5,491,778 A | 2/1996 | Gordon et al. |
| 5,610,653 A | 3/1997 | Abecassis |

(Continued)

FOREIGN PATENT DOCUMENTS

| | | |
|---|---|---|
| AU | 2006338183 A1 | 8/2007 |
| AU | 2012202140 A1 | 5/2012 |

(Continued)

OTHER PUBLICATIONS

Notice of Acceptance received for Australian Patent Application No. 2012202140, dated May 28, 2014, 2 pages.

(Continued)

*Primary Examiner* — Amr A Awad

(74) *Attorney, Agent, or Firm* — Dentons US LLP

(57) ABSTRACT

A portable electronic device displays icons (e.g., graphical objects) in one or more regions of a user interface of a touch-sensitive display, and detects user input specifying an exchange of positions of icons in the user interface. In some aspects, the respective positions of two icons in a user interface can be selected to exchange positions in the one or more regions of the user interface, and one or both icons can change their visual appearance to indicate their selection status.

32 Claims, 11 Drawing Sheets

(56) References Cited

U.S. PATENT DOCUMENTS

| | | | |
|---|---|---|---|
| 5,612,719 | A | 3/1997 | Beernink et al. |
| 5,621,878 | A | 4/1997 | Owens et al. |
| 5,642,490 | A | 6/1997 | Morgan et al. |
| 5,644,739 | A | 7/1997 | Moursund |
| 5,657,049 | A | 8/1997 | Ludolph et al. |
| 5,726,687 | A | 3/1998 | Belfiore et al. |
| 5,745,096 | A | 4/1998 | Ludolph et al. |
| 5,745,116 | A | 4/1998 | Pisutha-Arnond |
| 5,745,910 | A | 4/1998 | Piersol et al. |
| 5,754,179 | A | 5/1998 | Hocker et al. |
| 5,757,371 | A | 5/1998 | Oran et al. |
| 5,760,773 | A * | 6/1998 | Berman et al. ............... 715/808 |
| 5,774,119 | A | 6/1998 | Alimpich et al. |
| 5,796,401 | A | 8/1998 | Winer |
| 5,812,128 | A | 9/1998 | Sterling, IV |
| 5,812,862 | A | 9/1998 | Smith et al. |
| 5,825,349 | A | 10/1998 | Meier et al. |
| 5,825,357 | A | 10/1998 | Malamud et al. |
| 5,870,683 | A | 2/1999 | Wells et al. |
| 5,877,765 | A | 3/1999 | Dickman et al. |
| 5,914,716 | A | 6/1999 | Rubin et al. |
| 5,914,717 | A | 6/1999 | Kleewein et al. |
| 5,923,327 | A | 7/1999 | Smith et al. |
| 5,923,908 | A | 7/1999 | Schrock et al. |
| 5,934,707 | A | 8/1999 | Johnson |
| 5,963,204 | A | 10/1999 | Ikeda |
| 5,995,106 | A | 11/1999 | Naughton et al. |
| 6,025,842 | A | 2/2000 | Filetto et al. |
| 6,043,818 | A | 3/2000 | Nakano et al. |
| 6,049,336 | A | 4/2000 | Liu et al. |
| 6,069,626 | A | 5/2000 | Cline et al. |
| 6,072,486 | A | 6/2000 | Sheldon et al. |
| 6,073,036 | A | 6/2000 | Heikkinen et al. |
| 6,111,573 | A | 8/2000 | McComb et al. |
| 6,133,914 | A | 10/2000 | Rogers et al. |
| 6,144,863 | A | 11/2000 | Charron |
| 6,145,083 | A | 11/2000 | Shaffer et al. |
| 6,177,936 | B1 | 1/2001 | Cragun |
| 6,188,407 | B1 | 2/2001 | Smith et al. |
| 6,195,094 | B1 | 2/2001 | Celebiler |
| 6,199,082 | B1 | 3/2001 | Ferrel et al. |
| 6,211,858 | B1 | 4/2001 | Moon et al. |
| 6,229,542 | B1 | 5/2001 | Miller |
| 6,243,080 | B1 | 6/2001 | Molne |
| 6,256,008 | B1 | 7/2001 | Sparks et al. |
| 6,262,732 | B1 | 7/2001 | Coleman et al. |
| 6,262,735 | B1 | 7/2001 | Etelapera |
| 6,271,841 | B1 | 8/2001 | Tsujimoto |
| 6,275,935 | B1 | 8/2001 | Barlow et al. |
| 6,278,454 | B1 | 8/2001 | Krishnan |
| 6,297,795 | B1 | 10/2001 | Kato et al. |
| 6,313,853 | B1 | 11/2001 | Lamontagne et al. |
| 6,313,855 | B1 | 11/2001 | Shuping et al. |
| 6,317,140 | B1 | 11/2001 | Livingston |
| 6,323,846 | B1 | 11/2001 | Westerman et al. |
| 6,326,970 | B1 | 12/2001 | Mott et al. |
| 6,349,410 | B1 | 2/2002 | Lortz |
| 6,353,451 | B1 | 3/2002 | Teibel et al. |
| 6,359,615 | B1 | 3/2002 | Singh |
| 6,377,698 | B1 | 4/2002 | Cumoli et al. |
| 6,396,520 | B1 | 5/2002 | Ording |
| 6,407,757 | B1 | 6/2002 | Ho et al. |
| 6,411,283 | B1 | 6/2002 | Murphy |
| 6,433,801 | B1 | 8/2002 | Moon et al. |
| 6,466,198 | B1 | 10/2002 | Feinstein |
| 6,466,203 | B2 | 10/2002 | Van Ee |
| 6,486,895 | B1 | 11/2002 | Robertson et al. |
| 6,489,975 | B1 | 12/2002 | Patil et al. |
| 6,496,182 | B1 | 12/2002 | Wong et al. |
| 6,545,669 | B1 | 4/2003 | Kinawi et al. |
| 6,570,557 | B1 | 5/2003 | Westerman et al. |
| 6,570,583 | B1 | 5/2003 | Kung et al. |
| 6,590,568 | B1 | 7/2003 | Astala et al. |
| 6,597,391 | B2 | 7/2003 | Hudson |
| 6,613,100 | B2 | 9/2003 | Miller |
| 6,621,768 | B1 | 9/2003 | Keller et al. |
| 6,628,309 | B1 | 9/2003 | Dodson et al. |
| 6,629,793 | B1 | 10/2003 | Miller |
| 6,639,584 | B1 | 10/2003 | Li |
| 6,677,932 | B1 | 1/2004 | Westerman |
| 6,683,628 | B1 | 1/2004 | Nakagawa et al. |
| 6,700,612 | B1 | 3/2004 | Anderson et al. |
| 6,710,788 | B1 | 3/2004 | Freach et al. |
| 6,714,222 | B1 | 3/2004 | Björn et al. |
| 6,727,916 | B1 | 4/2004 | Ballard |
| 6,763,388 | B1 | 7/2004 | Tsimelzon |
| 6,771,250 | B1 | 8/2004 | Oh |
| 6,781,575 | B1 | 8/2004 | Hawkins et al. |
| 6,820,111 | B1 | 11/2004 | Rubin et al. |
| 6,915,294 | B1 | 7/2005 | Singh et al. |
| 6,915,490 | B1 | 7/2005 | Ewing |
| 6,928,461 | B2 | 8/2005 | Tuli |
| 6,931,601 | B2 | 8/2005 | Vronay et al. |
| 6,934,911 | B2 | 8/2005 | Salmimaa et al. |
| 6,940,494 | B2 | 9/2005 | Hoshino et al. |
| 6,950,949 | B1 | 9/2005 | Gilchrist |
| 6,956,564 | B1 | 10/2005 | Williams |
| 6,970,749 | B1 | 11/2005 | Chinn et al. |
| 6,976,210 | B1 | 12/2005 | Silva et al. |
| 6,978,127 | B1 | 12/2005 | Bulthuis et al. |
| 6,987,991 | B2 | 1/2006 | Nelson |
| 6,990,452 | B1 | 1/2006 | Ostermann et al. |
| 7,003,495 | B1 | 2/2006 | Burger et al. |
| 7,007,239 | B1 | 2/2006 | Hawkins et al. |
| 7,010,755 | B2 | 3/2006 | Anderson et al. |
| 7,017,118 | B1 | 3/2006 | Carroll |
| 7,030,861 | B1 | 4/2006 | Westerman et al. |
| 7,054,965 | B2 | 5/2006 | Bell et al. |
| 7,071,943 | B2 | 7/2006 | Adler |
| 7,075,512 | B1 | 7/2006 | Fabre et al. |
| 7,085,590 | B2 | 8/2006 | Kennedy et al. |
| 7,093,201 | B2 | 8/2006 | Duarte |
| 7,133,859 | B1 | 11/2006 | Wong |
| 7,134,095 | B1 | 11/2006 | Smith et al. |
| 7,149,549 | B1 | 12/2006 | Ortiz et al. |
| 7,166,791 | B2 | 1/2007 | Robbin et al. |
| 7,167,731 | B2 | 1/2007 | Nelson |
| 7,171,625 | B1 | 1/2007 | Sacchi |
| 7,221,933 | B2 | 5/2007 | Sauer et al. |
| 7,231,229 | B1 | 6/2007 | Hawkins et al. |
| 7,283,845 | B2 | 10/2007 | De Bast |
| 7,310,636 | B2 | 12/2007 | Bodin et al. |
| 7,346,855 | B2 | 3/2008 | Hellyar et al. |
| 7,355,593 | B2 | 4/2008 | Hill et al. |
| 7,360,166 | B1 | 4/2008 | Krzanowski |
| 7,362,331 | B2 | 4/2008 | Ording |
| 7,403,910 | B1 | 7/2008 | Hastings et al. |
| 7,432,928 | B2 | 10/2008 | Shaw et al. |
| 7,434,177 | B1 | 10/2008 | Ording et al. |
| 7,437,005 | B2 | 10/2008 | Drucker et al. |
| 7,461,353 | B2 | 12/2008 | Rohrabaugh et al. |
| 7,480,870 | B2 | 1/2009 | Anzures et al. |
| 7,487,467 | B1 | 2/2009 | Kawahara et al. |
| 7,490,295 | B2 | 2/2009 | Chaudhri et al. |
| 7,493,573 | B2 | 2/2009 | Wagner |
| 7,506,268 | B2 | 3/2009 | Jennings et al. |
| 7,509,588 | B2 | 3/2009 | Van Os et al. |
| 7,512,898 | B2 | 3/2009 | Jennings et al. |
| 7,526,738 | B2 | 4/2009 | Ording et al. |
| 7,546,548 | B2 | 6/2009 | Chew et al. |
| 7,546,554 | B2 | 6/2009 | Chiu et al. |
| 7,561,874 | B2 | 7/2009 | Wang et al. |
| 7,587,671 | B2 | 9/2009 | Saft et al. |
| 7,587,683 | B2 | 9/2009 | Ito et al. |
| 7,603,105 | B2 | 10/2009 | Bocking et al. |
| 7,614,008 | B2 | 11/2009 | Ording |
| 7,620,894 | B1 | 11/2009 | Kahn |
| 7,624,357 | B2 | 11/2009 | De Bast |
| 7,633,076 | B2 | 12/2009 | Huppi et al. |
| 7,642,934 | B2 | 1/2010 | Scott |
| 7,650,137 | B2 | 1/2010 | Jobs et al. |
| 7,653,883 | B2 | 1/2010 | Hotelling et al. |
| 7,657,252 | B2 | 2/2010 | Futami |
| 7,657,849 | B2 | 2/2010 | Chaudhri et al. |

(56) References Cited

U.S. PATENT DOCUMENTS

| | | |
|---|---|---|
| 7,663,607 B2 | 2/2010 | Hotelling et al. |
| 7,669,135 B2 | 2/2010 | Cunningham et al. |
| 7,683,889 B2 | 3/2010 | Rimas Ribikauskas et al. |
| 7,694,231 B2 | 4/2010 | Kocienda et al. |
| 7,719,542 B1 | 5/2010 | Gough et al. |
| 7,720,893 B2 | 5/2010 | Boudreau et al. |
| 7,730,401 B2 | 6/2010 | Gillespie et al. |
| 7,735,021 B2 | 6/2010 | Padawer et al. |
| 7,739,271 B2 | 6/2010 | Cook et al. |
| 7,739,604 B1 * | 6/2010 | Lyons et al. .................. 715/736 |
| 7,747,289 B2 | 6/2010 | Wang et al. |
| 7,783,583 B2 | 8/2010 | Sendhoff et al. |
| 7,783,990 B2 | 8/2010 | Amadio et al. |
| 7,788,583 B1 | 8/2010 | Amzallag et al. |
| 7,805,684 B2 | 9/2010 | Arvilommi |
| 7,810,038 B2 | 10/2010 | Matsa et al. |
| 7,831,926 B2 | 11/2010 | Rohrabaugh et al. |
| 7,835,729 B2 | 11/2010 | Hyon |
| 7,840,901 B2 | 11/2010 | Lacey et al. |
| 7,844,889 B2 | 11/2010 | Rohrabaugh et al. |
| 7,844,914 B2 | 11/2010 | Andre et al. |
| 7,853,972 B2 | 12/2010 | Brodersen et al. |
| 7,856,602 B2 | 12/2010 | Armstrong |
| 7,917,846 B2 | 3/2011 | Decker et al. |
| 7,934,152 B2 | 4/2011 | Krishnamurthy et al. |
| 7,940,250 B2 | 5/2011 | Forstall |
| 7,957,762 B2 | 6/2011 | Herz et al. |
| 7,958,457 B1 | 6/2011 | Brandenbergl et al. |
| 7,996,789 B2 | 8/2011 | Louch et al. |
| 8,006,002 B2 | 8/2011 | Kalayjian et al. |
| 8,099,441 B2 | 1/2012 | Surasinghe |
| 8,127,239 B2 | 2/2012 | Louch et al. |
| 8,205,172 B2 | 6/2012 | Wong et al. |
| 8,239,784 B2 | 8/2012 | Hotelling et al. |
| 8,279,180 B2 | 10/2012 | Hotelling et al. |
| 8,306,515 B2 | 11/2012 | Ryu et al. |
| 8,365,084 B1 * | 1/2013 | Lin et al. .................. 715/769 |
| 8,381,135 B2 | 2/2013 | Hotelling et al. |
| 8,446,371 B2 | 5/2013 | Fyke et al. |
| 8,479,122 B2 | 7/2013 | Hotelling et al. |
| 8,519,964 B2 | 8/2013 | Platzer et al. |
| 8,519,972 B2 | 8/2013 | Forstall |
| 8,558,808 B2 | 10/2013 | Forstall |
| 8,564,544 B2 | 10/2013 | Jobs et al. |
| 8,601,370 B2 * | 12/2013 | Chiang et al. .................. 715/700 |
| 8,619,038 B2 | 12/2013 | Chaudhri et al. |
| 8,788,954 B2 | 7/2014 | Lemay et al. |
| 9,256,627 B2 | 2/2016 | Surasinghe |
| 9,367,232 B2 | 6/2016 | Platzer et al. |
| 9,386,432 B2 | 7/2016 | Chu et al. |
| 9,619,143 B2 | 4/2017 | Christie et al. |
| 9,927,970 B2 | 3/2018 | Ording et al. |
| 2001/0024195 A1 | 9/2001 | Hayakawa |
| 2001/0024212 A1 | 9/2001 | Ohnishi |
| 2002/0008691 A1 | 1/2002 | Hanajima et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0018051 A1 | 2/2002 | Singh |
| 2002/0024540 A1 | 2/2002 | McCarthy |
| 2002/0038299 A1 | 3/2002 | Zernik et al. |
| 2002/0054090 A1 | 5/2002 | Silva et al. |
| 2002/0067376 A1 | 6/2002 | Martin et al. |
| 2002/0085037 A1 | 7/2002 | Leavitt et al. |
| 2002/0093531 A1 | 7/2002 | Barile |
| 2002/0104096 A1 | 8/2002 | Cramer et al. |
| 2002/0109721 A1 | 8/2002 | Konaka et al. |
| 2002/0123368 A1 | 9/2002 | Yamadera et al. |
| 2002/0149561 A1 | 10/2002 | Fukumoto et al. |
| 2002/0152283 A1 | 10/2002 | Dutta et al. |
| 2002/0188948 A1 | 12/2002 | Florence |
| 2002/0191029 A1 | 12/2002 | Gillespie et al. |
| 2002/0196238 A1 | 12/2002 | Tsukada et al. |
| 2003/0007012 A1 | 1/2003 | Bate |
| 2003/0013483 A1 | 1/2003 | Ausems et al. |
| 2003/0014415 A1 | 1/2003 | Weiss et al. |
| 2003/0016241 A1 | 1/2003 | Burke |
| 2003/0025676 A1 | 2/2003 | Cappendijk |
| 2003/0030664 A1 | 2/2003 | Parry |
| 2003/0033331 A1 | 2/2003 | Sena et al. |
| 2003/0048295 A1 | 3/2003 | Lilleness et al. |
| 2003/0063072 A1 | 4/2003 | Brandenberg et al. |
| 2003/0063125 A1 | 4/2003 | Miyajima et al. |
| 2003/0081135 A1 | 5/2003 | Boll |
| 2003/0090572 A1 | 5/2003 | Belz et al. |
| 2003/0095135 A1 | 5/2003 | Kaasila et al. |
| 2003/0095155 A1 | 5/2003 | Johnson |
| 2003/0117427 A1 | 6/2003 | Haughawout et al. |
| 2003/0117440 A1 | 6/2003 | Hellyar et al. |
| 2003/0122787 A1 | 7/2003 | Zimmerman et al. |
| 2003/0132938 A1 | 7/2003 | Shibao |
| 2003/0164861 A1 | 9/2003 | Barbanson et al. |
| 2003/0169298 A1 | 9/2003 | Ording |
| 2003/0174172 A1 * | 9/2003 | Conrad et al. .................. 345/781 |
| 2003/0179240 A1 | 9/2003 | Gest |
| 2003/0184552 A1 | 10/2003 | Chadha |
| 2003/0184587 A1 | 10/2003 | Ording et al. |
| 2003/0193524 A1 | 10/2003 | Bates et al. |
| 2003/0200289 A1 | 10/2003 | Kemp et al. |
| 2003/0206195 A1 | 11/2003 | Matsa et al. |
| 2003/0206197 A1 | 11/2003 | McInerney |
| 2003/0210280 A1 | 11/2003 | Baker et al. |
| 2003/0225811 A1 | 12/2003 | Ali et al. |
| 2004/0021643 A1 * | 2/2004 | Hoshino et al. .................. 345/173 |
| 2004/0041849 A1 | 3/2004 | Mock et al. |
| 2004/0056839 A1 * | 3/2004 | Yoshihara .................. 345/156 |
| 2004/0093582 A1 | 5/2004 | Segura |
| 2004/0103156 A1 | 5/2004 | Quillen et al. |
| 2004/0103371 A1 | 5/2004 | Chen et al. |
| 2004/0109013 A1 | 6/2004 | Goertz |
| 2004/0109025 A1 | 6/2004 | Hullot et al. |
| 2004/0121823 A1 | 6/2004 | Noesgaard et al. |
| 2004/0125088 A1 | 7/2004 | Zimmerman et al. |
| 2004/0138569 A1 | 7/2004 | Grunwald et al. |
| 2004/0141011 A1 | 7/2004 | Smethers et al. |
| 2004/0143796 A1 | 7/2004 | Lerner et al. |
| 2004/0155909 A1 | 8/2004 | Wagner |
| 2004/0169674 A1 | 9/2004 | Linjama |
| 2004/0177148 A1 | 9/2004 | Tsimelzon, Jr. |
| 2004/0201595 A1 | 10/2004 | Manchester |
| 2004/0205492 A1 | 10/2004 | Newsome |
| 2004/0205496 A1 | 10/2004 | Dutta et al. |
| 2004/0215719 A1 | 10/2004 | Altshuler |
| 2004/0221006 A1 | 11/2004 | Gopalan et al. |
| 2004/0222975 A1 | 11/2004 | Nakano et al. |
| 2004/0268400 A1 | 12/2004 | Barde et al. |
| 2005/0005246 A1 | 1/2005 | Card et al. |
| 2005/0005248 A1 | 1/2005 | Rockey et al. |
| 2005/0010955 A1 | 1/2005 | Elia et al. |
| 2005/0020317 A1 | 1/2005 | Koyama |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0044509 A1 | 2/2005 | Hunleth et al. |
| 2005/0057524 A1 | 3/2005 | Hill et al. |
| 2005/0057548 A1 | 3/2005 | Kim |
| 2005/0060653 A1 * | 3/2005 | Fukase et al. .................. 715/724 |
| 2005/0060664 A1 | 3/2005 | Rogers |
| 2005/0060665 A1 | 3/2005 | Rekimoto |
| 2005/0066286 A1 | 3/2005 | Makela |
| 2005/0071364 A1 | 3/2005 | Xie et al. |
| 2005/0071736 A1 | 3/2005 | Schneider et al. |
| 2005/0071778 A1 | 3/2005 | Tokkonen |
| 2005/0078804 A1 | 4/2005 | Yomoda |
| 2005/0079896 A1 | 4/2005 | Kokko et al. |
| 2005/0088423 A1 | 4/2005 | Keely et al. |
| 2005/0091609 A1 | 4/2005 | Matthews et al. |
| 2005/0093826 A1 | 5/2005 | Huh |
| 2005/0097089 A1 | 5/2005 | Nielsen et al. |
| 2005/0108657 A1 | 5/2005 | Han |
| 2005/0114788 A1 | 5/2005 | Fabritius |
| 2005/0116026 A1 | 6/2005 | Burger et al. |
| 2005/0120142 A1 | 6/2005 | Hall |
| 2005/0134578 A1 | 6/2005 | Chambers et al. |

(56) References Cited

U.S. PATENT DOCUMENTS

| | | |
|---|---|---|
| 2005/0138569 A1 | 6/2005 | Baxter et al. |
| 2005/0154798 A1 | 7/2005 | Nurmi |
| 2005/0156873 A1 | 7/2005 | Walter et al. |
| 2005/0166232 A1 | 7/2005 | Lamkin et al. |
| 2005/0169527 A1 | 8/2005 | Longe et al. |
| 2005/0177783 A1 | 8/2005 | Agrawala et al. |
| 2005/0183017 A1 | 8/2005 | Cain |
| 2005/0190059 A1 | 9/2005 | Wehrenberg |
| 2005/0192924 A1 | 9/2005 | Drucker et al. |
| 2005/0204385 A1 | 9/2005 | Sull et al. |
| 2005/0210018 A1 | 9/2005 | Singh et al. |
| 2005/0210369 A1 | 9/2005 | Damm, Jr. |
| 2005/0210403 A1 | 9/2005 | Satanek |
| 2005/0216913 A1 | 9/2005 | Gemmell et al. |
| 2005/0229102 A1 | 10/2005 | Watson et al. |
| 2005/0229118 A1 | 10/2005 | Chiu et al. |
| 2005/0250438 A1 | 11/2005 | Makipaa et al. |
| 2005/0251755 A1 | 11/2005 | Mullins, II et al. |
| 2005/0253817 A1 | 11/2005 | Rytivaara et al. |
| 2005/0259087 A1 | 11/2005 | Hoshino et al. |
| 2005/0262448 A1 | 11/2005 | Vronay et al. |
| 2005/0267869 A1 | 12/2005 | Horvitz et al. |
| 2005/0275636 A1 | 12/2005 | Dehlin et al. |
| 2005/0283734 A1 | 12/2005 | Santoro et al. |
| 2005/0285880 A1 | 12/2005 | Lai et al. |
| 2005/0289458 A1 | 12/2005 | Kylmanen |
| 2005/0289476 A1 | 12/2005 | Tokkonen |
| 2006/0005207 A1 | 1/2006 | Louch et al. |
| 2006/0007182 A1* | 1/2006 | Sato et al. .............. 345/173 |
| 2006/0017692 A1 | 1/2006 | Wehrenberg et al. |
| 2006/0025110 A1 | 2/2006 | Liu |
| 2006/0026170 A1 | 2/2006 | Kreitler et al. |
| 2006/0026521 A1 | 2/2006 | Hotelling et al. |
| 2006/0026536 A1 | 2/2006 | Hotelling et al. |
| 2006/0033724 A1 | 2/2006 | Chaudhri et al. |
| 2006/0033751 A1* | 2/2006 | Keely ............... G06F 1/1626 345/619 |
| 2006/0033761 A1 | 2/2006 | Suen et al. |
| 2006/0035628 A1 | 2/2006 | Miller et al. |
| 2006/0036944 A1 | 2/2006 | Wilson |
| 2006/0048069 A1 | 3/2006 | Igeta |
| 2006/0051073 A1 | 3/2006 | Jung et al. |
| 2006/0053386 A1 | 3/2006 | Kuhl et al. |
| 2006/0053387 A1 | 3/2006 | Ording |
| 2006/0055662 A1 | 3/2006 | Rimas-Ribikauskas et al. |
| 2006/0055700 A1 | 3/2006 | Niles et al. |
| 2006/0064647 A1 | 3/2006 | Tapuska et al. |
| 2006/0075355 A1 | 4/2006 | Shiono et al. |
| 2006/0075396 A1 | 4/2006 | Surasinghe |
| 2006/0080616 A1 | 4/2006 | Vogel et al. |
| 2006/0085743 A1 | 4/2006 | Baudisch et al. |
| 2006/0085763 A1 | 4/2006 | Leavitt et al. |
| 2006/0097991 A1 | 5/2006 | Hotelling et al. |
| 2006/0101354 A1 | 5/2006 | Hashimoto et al. |
| 2006/0105814 A1 | 5/2006 | Monden et al. |
| 2006/0112335 A1 | 5/2006 | Hofmeister et al. |
| 2006/0116578 A1 | 6/2006 | Grunwald et al. |
| 2006/0117197 A1 | 6/2006 | Nurmi |
| 2006/0123360 A1 | 6/2006 | Anwar et al. |
| 2006/0125799 A1 | 6/2006 | Hillis et al. |
| 2006/0129647 A1 | 6/2006 | Kaghazian |
| 2006/0139328 A1 | 6/2006 | Maki et al. |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0148526 A1 | 7/2006 | Kamiya et al. |
| 2006/0153531 A1 | 7/2006 | Kanegae et al. |
| 2006/0161871 A1* | 7/2006 | Hotelling et al. .......... 715/863 |
| 2006/0168510 A1 | 7/2006 | Bryar et al. |
| 2006/0174211 A1 | 8/2006 | Hoellerer et al. |
| 2006/0179415 A1 | 8/2006 | Cadiz et al. |
| 2006/0187212 A1 | 8/2006 | Park et al. |
| 2006/0190833 A1 | 8/2006 | Sangiovanni et al. |
| 2006/0197753 A1 | 9/2006 | Hotelling |
| 2006/0209035 A1 | 9/2006 | Jenkins et al. |
| 2006/0210958 A1 | 9/2006 | Rimas-Ribikauskas et al. |
| 2006/0224997 A1 | 10/2006 | Wong et al. |
| 2006/0236266 A1 | 10/2006 | Majava |
| 2006/0238625 A1 | 10/2006 | Sasaki et al. |
| 2006/0242145 A1 | 10/2006 | Krishnamurthy et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0253771 A1 | 11/2006 | Baschy |
| 2006/0265643 A1 | 11/2006 | Saft et al. |
| 2006/0268100 A1 | 11/2006 | Karukka et al. |
| 2006/0271864 A1 | 11/2006 | Satterfield et al. |
| 2006/0271867 A1 | 11/2006 | Wang et al. |
| 2006/0271874 A1* | 11/2006 | Raiz et al. .............. 715/767 |
| 2006/0277460 A1 | 12/2006 | Forstall et al. |
| 2006/0277481 A1 | 12/2006 | Forstall et al. |
| 2006/0277588 A1 | 12/2006 | Harrington et al. |
| 2006/0278692 A1 | 12/2006 | Matsumoto et al. |
| 2006/0282786 A1 | 12/2006 | Shaw et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0004451 A1 | 1/2007 | Anderson |
| 2007/0013665 A1 | 1/2007 | Vetelainen et al. |
| 2007/0022386 A1 | 1/2007 | Boss et al. |
| 2007/0024646 A1 | 2/2007 | Saarinen et al. |
| 2007/0028269 A1 | 2/2007 | Nezu et al. |
| 2007/0030362 A1 | 2/2007 | Ota et al. |
| 2007/0038612 A1 | 2/2007 | Sull et al. |
| 2007/0055947 A1 | 3/2007 | Ostojic et al. |
| 2007/0067272 A1 | 3/2007 | Flynt et al. |
| 2007/0067738 A1 | 3/2007 | Flynt et al. |
| 2007/0083827 A1 | 4/2007 | Scott et al. |
| 2007/0083911 A1 | 4/2007 | Madden et al. |
| 2007/0101292 A1 | 5/2007 | Kupka |
| 2007/0101297 A1 | 5/2007 | Forstall et al. |
| 2007/0106950 A1* | 5/2007 | Hutchinson ............ G09B 5/067 715/761 |
| 2007/0106952 A1 | 5/2007 | Matas et al. |
| 2007/0124677 A1 | 5/2007 | de los Reyes et al. |
| 2007/0132789 A1 | 6/2007 | Ording et al. |
| 2007/0150810 A1 | 6/2007 | Katz et al. |
| 2007/0150830 A1 | 6/2007 | Ording et al. |
| 2007/0152980 A1 | 7/2007 | Kocienda et al. |
| 2007/0152984 A1 | 7/2007 | Ording et al. |
| 2007/0155434 A1 | 7/2007 | Jobs et al. |
| 2007/0156697 A1 | 7/2007 | Tsarkova |
| 2007/0157089 A1 | 7/2007 | Van Os et al. |
| 2007/0157094 A1 | 7/2007 | Lennay et al. |
| 2007/0157228 A1 | 7/2007 | Bayer et al. |
| 2007/0177803 A1 | 8/2007 | Elias et al. |
| 2007/0177804 A1 | 8/2007 | Elias et al. |
| 2007/0180395 A1 | 8/2007 | Yamashita et al. |
| 2007/0189737 A1 | 8/2007 | Chaudhri et al. |
| 2007/0192741 A1 | 8/2007 | Yoritate et al. |
| 2007/0200713 A1 | 8/2007 | Weber et al. |
| 2007/0204218 A1 | 8/2007 | Weber et al. |
| 2007/0233695 A1 | 10/2007 | Boudreau et al. |
| 2007/0234235 A1 | 10/2007 | Scott |
| 2007/0240079 A1 | 10/2007 | Flynt et al. |
| 2007/0243862 A1 | 10/2007 | Coskun et al. |
| 2007/0243905 A1 | 10/2007 | Juh et al. |
| 2007/0245250 A1 | 10/2007 | Schechter et al. |
| 2007/0250768 A1 | 10/2007 | Funakami et al. |
| 2007/0254722 A1 | 11/2007 | Kim et al. |
| 2007/0260999 A1 | 11/2007 | Amadio et al. |
| 2007/0263176 A1 | 11/2007 | Nozaki et al. |
| 2007/0266011 A1 | 11/2007 | Rohrs et al. |
| 2007/0266342 A1 | 11/2007 | Chang et al. |
| 2007/0288860 A1 | 12/2007 | Ording et al. |
| 2007/0288862 A1 | 12/2007 | Ording |
| 2007/0288868 A1 | 12/2007 | Rhee et al. |
| 2007/0300160 A1 | 12/2007 | Ferrel et al. |
| 2008/0001924 A1 | 1/2008 | de los Reyes et al. |
| 2008/0005703 A1 | 1/2008 | Radivojevic et al. |
| 2008/0034309 A1 | 2/2008 | Louch et al. |
| 2008/0042984 A1 | 2/2008 | Lim et al. |
| 2008/0059906 A1 | 3/2008 | Toki |
| 2008/0062137 A1 | 3/2008 | Brodersen et al. |

(56) References Cited

U.S. PATENT DOCUMENTS

| | | |
|---|---|---|
| 2008/0062141 A1 | 3/2008 | Chaudhri |
| 2008/0082930 A1 | 4/2008 | Omernick et al. |
| 2008/0104515 A1 | 5/2008 | Dumitru et al. |
| 2008/0122796 A1 | 5/2008 | Jobs et al. |
| 2008/0125180 A1 | 5/2008 | Hoffman et al. |
| 2008/0132252 A1 | 6/2008 | Altman et al. |
| 2008/0139176 A1 | 6/2008 | Kim |
| 2008/0155617 A1 | 6/2008 | Angiolillo et al. |
| 2008/0161045 A1 | 7/2008 | Vuorenmaa |
| 2008/0168075 A1 | 7/2008 | Kamiyabu |
| 2008/0168365 A1 | 7/2008 | Chaudhri |
| 2008/0168367 A1 | 7/2008 | Chaudhri et al. |
| 2008/0168401 A1 | 7/2008 | Boule et al. |
| 2008/0168478 A1 | 7/2008 | Platzer et al. |
| 2008/0171555 A1 | 7/2008 | Oh et al. |
| 2008/0174562 A1 | 7/2008 | Kim |
| 2008/0182598 A1 | 7/2008 | Bowman |
| 2008/0182628 A1 | 7/2008 | Lee et al. |
| 2008/0184052 A1 | 7/2008 | Itoh et al. |
| 2008/0184112 A1 | 7/2008 | Chiang et al. |
| 2008/0189108 A1 | 8/2008 | Atar |
| 2008/0201452 A1 | 8/2008 | Athas et al. |
| 2008/0216017 A1 | 9/2008 | Kurtenbach et al. |
| 2008/0218523 A1 | 9/2008 | Zuverink |
| 2008/0225013 A1 | 9/2008 | Muylkens et al. |
| 2008/0231610 A1 | 9/2008 | Hotelling et al. |
| 2008/0259045 A1 | 10/2008 | Kim et al. |
| 2008/0259057 A1 | 10/2008 | Brons |
| 2008/0268882 A1 | 10/2008 | Moloney |
| 2008/0276280 A1 | 11/2008 | Nashida et al. |
| 2008/0300055 A1 | 12/2008 | Lutnick et al. |
| 2008/0300572 A1 | 12/2008 | Rankers et al. |
| 2008/0310602 A1 | 12/2008 | Bhupati |
| 2008/0313110 A1 | 12/2008 | Kreamer et al. |
| 2008/0313596 A1 | 12/2008 | Kreamer et al. |
| 2009/0002324 A1 | 1/2009 | Harbeson et al. |
| 2009/0002335 A1 | 1/2009 | Chaudhri |
| 2009/0006991 A1 | 1/2009 | Lindberg et al. |
| 2009/0007017 A1 | 1/2009 | Anzures et al. |
| 2009/0058821 A1 | 3/2009 | Chaudhri et al. |
| 2009/0064055 A1 | 3/2009 | Chaudhri et al. |
| 2009/0070708 A1 | 3/2009 | Finkelstein |
| 2009/0128581 A1 | 5/2009 | Brid et al. |
| 2009/0138827 A1 | 5/2009 | Van Os et al. |
| 2009/0163193 A1 | 6/2009 | Fyke et al. |
| 2009/0178008 A1 | 7/2009 | Herz et al. |
| 2009/0199128 A1 | 8/2009 | Matthews et al. |
| 2009/0217187 A1* | 8/2009 | Kendall .............. G06T 3/00 715/765 |
| 2009/0222765 A1 | 9/2009 | Ekstrand |
| 2009/0249252 A1 | 10/2009 | Lundy et al. |
| 2009/0254799 A1 | 10/2009 | Unger |
| 2009/0288032 A1 | 11/2009 | Chang et al. |
| 2009/0295753 A1 | 12/2009 | King et al. |
| 2010/0095238 A1 | 4/2010 | Baudet |
| 2010/0105454 A1 | 4/2010 | Weber et al. |
| 2010/0169357 A1 | 7/2010 | Ingrassia et al. |
| 2010/0179991 A1 | 7/2010 | Lorch et al. |
| 2010/0283743 A1 | 11/2010 | Coddington |
| 2010/0318709 A1 | 12/2010 | Bell et al. |
| 2011/0007009 A1 | 1/2011 | Ishihara et al. |
| 2011/0252373 A1 | 10/2011 | Chaudhri |
| 2014/0068483 A1 | 3/2014 | Platzer et al. |
| 2015/0012853 A1 | 1/2015 | Chaudhri et al. |
| 2015/0242092 A1 | 8/2015 | Van Os et al. |
| 2016/0182805 A1 | 6/2016 | Emmett et al. |
| 2016/0253065 A1 | 9/2016 | Platzer et al. |
| 2017/0147198 A1 | 5/2017 | Herz et al. |
| 2017/0223176 A1 | 8/2017 | Anzures et al. |
| 2017/0374205 A1 | 12/2017 | Panda |

FOREIGN PATENT DOCUMENTS

| | | |
|---|---|---|
| CA | 2349649 A1 | 1/2002 |
| CN | 1257247 A | 6/2000 |
| CN | 1392977 A | 1/2003 |
| CN | 1464719 A | 12/2003 |
| CN | 1695105 A | 11/2005 |
| CN | 1773875 A | 5/2006 |
| CN | 1818843 A | 8/2006 |
| CN | 1940833 A | 4/2007 |
| CN | 1998150 A | 7/2007 |
| CN | 101072410 A | 11/2007 |
| EP | 0163032 A2 | 4/1985 |
| EP | 322332 A2 | 6/1989 |
| EP | 0404373 A1 | 12/1990 |
| EP | 0476972 A2 | 3/1992 |
| EP | 626635 A2 | 11/1994 |
| EP | 0651544 A2 | 5/1995 |
| EP | 689134 A1 | 12/1995 |
| EP | 0701220 A1 | 3/1996 |
| EP | 844553 A1 | 5/1998 |
| EP | 0880090 A2 | 11/1998 |
| EP | 1049305 A1 | 11/2000 |
| EP | 1143334 A2 | 10/2001 |
| EP | 1231763 A1 | 8/2002 |
| EP | 1517228 A2 | 3/2005 |
| EP | 1632874 A2 | 3/2006 |
| EP | 1674976 A2 | 6/2006 |
| EP | 1744242 A2 | 1/2007 |
| EP | 1752880 A1 | 2/2007 |
| EP | 1964022 B1 | 3/2010 |
| FR | 2819675 A1 | 7/2002 |
| GB | 2301217 A | 11/1996 |
| GB | 2329813 A | 3/1999 |
| GB | 2407900 A | 5/2005 |
| JP | 5-225302 A | 9/1993 |
| JP | 6-051930 A | 2/1994 |
| JP | 6-208446 A | 7/1994 |
| JP | 7-225829 A | 8/1995 |
| JP | 8-221203 A | 8/1996 |
| JP | 9-073381 A | 3/1997 |
| JP | 9-97162 A | 4/1997 |
| JP | 9-101874 A | 4/1997 |
| JP | 9-138745 A | 5/1997 |
| JP | 9-258971 A | 10/1997 |
| JP | 9-297750 A | 11/1997 |
| JP | 10-40067 A | 2/1998 |
| JP | 10-96648 A | 4/1998 |
| JP | 10-214350 A | 8/1998 |
| JP | 11-143604 A | 5/1999 |
| JP | 11-508116 A | 7/1999 |
| JP | 11-242539 A | 9/1999 |
| JP | 11-327433 A | 11/1999 |
| JP | 2000-10702 A | 1/2000 |
| JP | 2000-20213 A | 1/2000 |
| JP | 2000-105772 A | 4/2000 |
| JP | 2000-163031 A | 6/2000 |
| JP | 2000-163193 A | 6/2000 |
| JP | 2000-163444 A | 6/2000 |
| JP | 2000-181436 A | 6/2000 |
| JP | 2000-242390 A | 9/2000 |
| JP | 2001-92430 A | 4/2001 |
| JP | 2001-142604 A | 5/2001 |
| JP | 2001-175386 A | 6/2001 |
| JP | 2001-265481 A | 9/2001 |
| JP | 2001-312347 A | 11/2001 |
| JP | 2002-41197 A | 2/2002 |
| JP | 2002-41206 A | 2/2002 |
| JP | 2002-62966 A | 2/2002 |
| JP | 2002-99370 A | 4/2002 |
| JP | 2002-132412 A | 5/2002 |
| JP | 2002-149312 A | 5/2002 |
| JP | 2002-149616 A | 5/2002 |
| JP | 2002-189567 A | 7/2002 |
| JP | 2002-244635 A | 8/2002 |
| JP | 2002-525705 A | 8/2002 |
| JP | 2002-297514 A | 10/2002 |
| JP | 2002-312105 A | 10/2002 |
| JP | 2002-323850 A | 11/2002 |

(56) References Cited

FOREIGN PATENT DOCUMENTS

| | | |
|---|---|---|
| JP | 2003-066941 A | 3/2003 |
| JP | 2003-139546 A | 5/2003 |
| JP | 2003-162356 A | 6/2003 |
| JP | 2003-248538 A | 9/2003 |
| JP | 2003-256142 A | 9/2003 |
| JP | 2003-271310 A | 9/2003 |
| JP | 2003-536125 A | 12/2003 |
| JP | 2004-38260 A | 2/2004 |
| JP | 2004-38310 A | 2/2004 |
| JP | 2004-62645 A | 2/2004 |
| JP | 2004-70492 A | 3/2004 |
| JP | 2004-118478 A | 4/2004 |
| JP | 2004-132741 A | 4/2004 |
| JP | 2004-152075 A | 5/2004 |
| JP | 2004-159028 A | 6/2004 |
| JP | 2004-164242 A | 6/2004 |
| JP | 2004-206230 A | 7/2004 |
| JP | 2004-227393 A | 8/2004 |
| JP | 2004-288208 A | 10/2004 |
| JP | 2004-318505 A | 11/2004 |
| JP | 2004-341886 A | 12/2004 |
| JP | 2004-341892 A | 12/2004 |
| JP | 2004-343662 A | 12/2004 |
| JP | 2005-4396 A | 1/2005 |
| JP | 2005-018229 A | 1/2005 |
| JP | 2005115896 A | 4/2005 |
| JP | 2005-515530 A | 5/2005 |
| JP | 2005-228088 A | 8/2005 |
| JP | 2005-234291 A | 9/2005 |
| JP | 2005-242669 A | 9/2005 |
| JP | 2005-267049 A | 9/2005 |
| JP | 2005-309933 A | 11/2005 |
| JP | 2005-327064 A | 11/2005 |
| JP | 2005321915 A | 11/2005 |
| JP | 2005-352924 A | 12/2005 |
| JP | 2005352943 A | 12/2005 |
| JP | 2006-18645 A | 1/2006 |
| JP | 2006-099733 A | 4/2006 |
| JP | 2006-155232 A | 6/2006 |
| JP | 2006259376 A | 9/2006 |
| JP | 2007-132676 A | 5/2007 |
| JP | 2008-503007 A | 1/2008 |
| JP | 2008-123553 A | 5/2008 |
| JP | 2008-518330 A | 5/2008 |
| JP | 2009-51921 A | 3/2009 |
| JP | 2009-522666 A | 6/2009 |
| JP | 2009-151821 A | 7/2009 |
| JP | 2010-538394 A | 12/2010 |
| JP | 2013-211055 A | 10/2013 |
| KR | 2002-0010863 A | 2/2002 |
| KR | 10-0490373 B1 | 5/2005 |
| KR | 10-2006-0085850 A | 7/2006 |
| WO | 1999/28815 A1 | 6/1999 |
| WO | 1999/38149 A1 | 7/1999 |
| WO | 1999/054807 A1 | 10/1999 |
| WO | 2000/08757 A1 | 2/2000 |
| WO | 00/16186 A2 | 3/2000 |
| WO | 2001/16690 A2 | 3/2001 |
| WO | 2001/46790 A2 | 6/2001 |
| WO | 2001/57716 A2 | 8/2001 |
| WO | 2002/08881 A2 | 1/2002 |
| WO | 20021013176 A2 | 2/2002 |
| WO | 2002/032088 A2 | 4/2002 |
| WO | 2002/046903 A1 | 6/2002 |
| WO | 2002/082418 A2 | 10/2002 |
| WO | 2002/093542 A1 | 11/2002 |
| WO | 2003/052626 A1 | 6/2003 |
| WO | 2003/060622 A2 | 7/2003 |
| WO | 20031107168 A1 | 12/2003 |
| WO | 2004/021166 A1 | 3/2004 |
| WO | 2004/040481 A1 | 5/2004 |
| WO | 20041063862 A2 | 7/2004 |
| WO | 2005/036416 A2 | 4/2005 |
| WO | 20051041020 A1 | 5/2005 |
| WO | 2005/074268 A1 | 8/2005 |
| WO | 2005/106684 A1 | 11/2005 |
| WO | 2006/003591 A2 | 1/2006 |
| WO | 2006/019639 A2 | 2/2006 |
| WO | 20061020304 A2 | 2/2006 |
| WO | 20061020305 A2 | 2/2006 |
| WO | 20061036069 A1 | 4/2006 |
| WO | 20061037545 A2 | 4/2006 |
| WO | 2006/092464 A1 | 9/2006 |
| WO | 2006/117438 A1 | 11/2006 |
| WO | 2007/031816 A1 | 3/2007 |
| WO | 20071032972 A1 | 3/2007 |
| WO | 20071069835 A1 | 6/2007 |
| WO | 2007/080559 A2 | 7/2007 |
| WO | 20071094894 A2 | 8/2007 |
| WO | 2008/030874 A1 | 3/2008 |
| WO | 2008/030976 A2 | 3/2008 |
| WO | 2008/086303 A1 | 7/2008 |
| WO | 2009/032638 A2 | 3/2009 |
| WO | 2009/032750 A1 | 3/2009 |
| WO | 2009/089222 A2 | 7/2009 |

OTHER PUBLICATIONS

Office Action received for Japanese Patent Application no. 2013-127963, dated Mar. 10, 2014, 7 pages (4 pages of English Translation and 3 pages of Official copy).

Office Action received for Japanese Patent Application No. 2013-127963, dated Aug. 15, 2014, 8 pages (6 pages of English Translation and 2 pages of Official Copy).

Office Action received for Korean Patent Application No. 10-2014-7011273, dated Aug. 14, 2014, 5 pages (2 pages of English Translation and 3 pages of Official Copy).

Office Action received for Korean Patent Application No. 10-2011-7026583, dated Aug. 14, 2014, 6 pages (2 pages of English Translation and 4 pages of Official Copy).

PCFAN, "Boot Camp Introduction/Data Transition/Operability/Ability Truth Derived from Gap Mac&Win Dual Boot Hard Verification", Daily Communications, vol. 13, No. 14, Jun. 15, 2006, p. 57 (Japanese Language only). (See Communication under 37 CFR § 1.98(a) (3)).

Extended European Search Report (includes Partial European Search Report and Search Opinion) received for European Patent Application No. 12189764.9, dated Jan. 4, 2013, 6 pages.

Macworld, "Whip up a widget", available at Available at: <http://www.macworld.com/article/46622/2005/09/octgeekfactor.htm>, Sep. 23, 2005, 6 pages.

snapfiles.com, "Dexpot", Snapfiles, Oct. 10, 2007, 3 pages.

Thomas, et al., "Applying Cartoon Animation Techniques to Graphical User Interfaces", ACM Transactions on Computer-Human Interaction, vol. 8, No. 3, Sep. 2001, pp. 198-222.

Tidwell, J. "Animated Transition, from Designing Interfaces", Copyright 2006, O'Reilly Media, Inc., pp. 84-85.

tuaw.com, "1.1.1 iPhone Multi page Springboard Hack", Available at: http://www.tuaw.com/2007/10/09/1-1-1-iphone-multipage-springboard-hack/ , Oct. 9, 2007.

tuaw.com, "Springboard Scrolling", Mid-Scroll, Available at: http://www.tuaw.com/photos/springboard-scrolling/731348/, Oct. 9, 2007.

tuaw.com, "Springboard Scrolling", Mostly Unpopulated Page, Available at: http://www.tuaw.com/ohotos/springboard-scrolling/4313491, Oct. 9, 2007.

tuaw.com, "Springboard Scrolling", New Page Dot Feature, Available at: http://www.tuaw.com/gallery/springboard-scrolling/4313471, Oct. 9, 2007.

tuaw.com, "TUAW Hack: Mess with Your iPhone Settings", Available at: http://www/tuaw.com/tag/SpringBoard/, Dec. 18, 2007.

VRBA, "iPhone Customizations and Applications", Ezine Articles, Availabe at: http://ezinearticles.com/?iPhone-Customizations-and-Applications&id=815807&opt=print.

Final Office Action received for U.S. Appl. No. 12/364,470, dated May 5, 2010, 16 pages.

Final Office Action received for U.S. Appl. No. 12/364,470, dated Oct. 19, 2011, 21 pages.

Non-Final Office Action received for U.S. Appl. No. 12/364,470, dated Mar. 4, 2011, 17 pages.

(56) References Cited

OTHER PUBLICATIONS

Non-Final Office Action received for U.S. Appl. No. 12/364,470, dated Nov. 13,2009, 15 pages.
Non-Final Office Action received for U.S. Appl. No. 12/364,470, dated Sep. 2, 2010, 26 pages.
Non-Final Office Action received for U.S. Appl. No. 13/104,903, dated Nov. 13, 2012, 9 pages.
Notice of Allowance received for U.S. Appl. No. 13/104,903, dated Apr. 29, 2013, 8 pages.
Non-Final Office Action received for U.S. Appl. No. 13/104,911, dated Feb. 20, 2013, 11 pages.
Notice of Allowance received for U.S. Appl. No. 13/104,911, dated Jun. 10, 2013, 6 pages.
ISO 9241-10:1996, "Ergonomic Requirements for Office Work with Visual Display Terminals{VDTs}—Part 10: Dialogue Pinciples", International Standard—ISO, Zuerich, CH, vol. 9241-10, May 1, 1996, 18 pages.
ISO 9241-11:1998, "Ergonomic Requirements for Office Work Visual Display Terminals (VDTs)—Part 11: Guidance on Usability", International Standard—ISO, Zuerich, CH, vol. 9241-11, Jan. 1, 1998, 28 pages.
"Ergonomic Requirements for Office Work with Visual Display Terminals {VDTs}—Part 12", Presentation of Information, Internation Standard—ISO, Zuerich, CH, vol. 9241-12, Dec. 1, 1998, 52 pages.
Mountfocus Information Systems, "An Onscreen Virtual Keyboard: Touchscreen, Kiosk and Windows Compatible", available at: <http://www.virtual-keyboard.com>, Dec. 19, 2007, 3 pages.
"Asus Eee PC Easy Mode Internet Tab Options", available at: <http://asuseeehacks.blogsqot.com/2007/11/asus-eee-pc-userinterface-tour.html>, Nov. 10, 2007, 33 pages.
Apple Computer, Inc., "Dashboard Tutorial", 2006, 24 pages.
"Desktop Icon Toy-History", <http://www.idesksoft.com/history.html>, Oct. 8, 2009, 2 pages.
Andrew's Widgets, Developing Dashboard Widgets—What the Heck is a Widget, available at: <http://andrew.hedges.name/widgetsldev>, Jan. 25, 2008, 9 pages.
"First Look: Leopard first looks: Dashboard", available at: <http://www.macworld.com/article/52297/2005/08/leodash.html>, Aug. 9, 2006, 3 pages.
WIDGIPEDIA, "I Need a Bog and a Forum Please?", available at: <http://www.widgipedia.com/widgets/details/adni18/hyalo-weather_27.html>, Oct. 19, 2006, 2 pages.
Iphone Dev Wiki, "IPhone Customization", available at: <http://iphone.fivefony.net/wiki/index.php/ Iphone_Customization>.
Iphone Hacks, "iPhone Firmware 1.1.1: Multi-Page SpringBoard Hack", available at: <http://www.iphonehacks.com/2007/10/springboardhack.html>, Oct. 10, 2007, 4 pages.
Jazzmutant, "Jazzmutant Lemur", available at: <http://64.233.167.104/search?q=cache:3g4wFSaZiXIJ:www.nuloop.c, Nov. 16, 2005, 3 pages.
Iphone Info, "Modifying the iPhone SpringBoard", available at: http://iphoneinfo.ca/modifying-the-iphone-springboard.
Iphone Hacks, "SummerBoard for iPhone OS v1.1.1: iPhone Hack Enables Scrolling of iPhone's Home Screen", available at: <http://www.iphonehacks.com/2007/10/summerboard-v3.html>.
Jazzmutant, "The Lemur: Multitouch Control Surface", available at: <http://64233.167.104/search?q=cache: j0_nFbNVzOcJ:www.cycling7, Nov. 16, 2005, 3 pages.
Elo, "Touschscreen User Manual, Elo Projected Capacitance Driver Software Version 1.00 (Serial)", Elo TouchSystems, Inc., Dec. 30, 2005, 37 pages.
Realnetworks, "Transition Effects", RealNetworks Production Guide, available at: <http://service.real.com/help/library/guides/productionguidepreview/HTML/htmfiles/transit.htm>, 2001, 21 pages.
Zhang, et al., "An Ergonomics Study of Menu-Operation on Mobile Phone Interface", In Proceedings of the workshop on Intelligent Information Technology Application, Dec. 2007, 5 pages.

Opera Software, "Welcome to Widgetize", Copyright© 2006 Opera Software ASA, available at: http://widgets.opera.com/widgetize, 1 page.
Agarawala et al., "Database Compendex/EI", Engineering Information, Inc., Apr. 27, 2006, 1 page.
Agarawala et al., "Keepin' It Real: Pushing the Desktop Metaphor with Physics, Piles and the Pen", CHI 2006, Apr. 22-27, 2006, pp. 1283-1292.
Apple, "Welcome to Tiger", copyright© 2005 Apple Computer, Inc., available at: http://manuals.info.apple.com/en/Welcome_to_Mac_OS_X_v10.4_Tiger.pdf, 32 pages.
apple.com, "Tiger Developer Overview Series—Developing Dashboard Widgets", available at: <http://developer.apple.com/macosx/dashboard.html>, Jun. 23, 2006, 9 pages.
Berka, J., "iFuntastic 3 Opens Up New iPhone Functionality", ars technica, available at: http://arstechnica.com/journals/apple.ars/2007/08/30/ifuntastic-3-opens-up-new-iphone-functionality, Aug. 30, 2007, 2 pages.
Cha, B., "HTC Touch (Sprint)", CNET Reviews, available at: http://web.archive.org/web/20071106065114/http://reviews.cnet.com/smartphones/htc-touch-sprint/4505-6452_7-3267123.html, Nov. 6, 2007, 10 pages.
Chang et al., "Animation: From Cartoons to the User Interface", UIST '93 Proceedings of the 6th Annual ACM symposium on User Interface Software and Technology, 1993, pp. 1-18.
Chartier, D., "iPhone 1.1.3 Video Brings the Proof", ars technica, available at: http://arstechnica.com/journals/apple.are/2007/12/30/iphone-1-1-3-video-brings-the-proof, Dec. 30, 2007, 3 pages.
CNET, "Video:Create Custom Widgets with Web Clip", CNET News, available at: http://news.cnet.com/1606-2-6103525.html, Aug. 8, 2006, 3 Pages.
Delltech, "Working with Graphics", Windows XP: The Complete Reference, Chapter 18, Apr. 5, 2005, 4 pages.
Dodge et al., "Microsoft Office Excel 2003 Office Manual", Microsoft Press, vol. 1, unable to locate English translation, Jul. 12, 2004, pp. 66-68.
Domshlak et al., "Preference-Based Configuration of Web Page Content", Proceedings of the 17th Int'l Joint Conf. on Artificial Intelligence (IJCAI), Seattle, W A, pp. 1451-1456.
Edwards, iPhone 1.1.3 Firmware Feature Gallery, Gear Live, Available at: http://www.gearlive.com/news/article/q407-iphone-113-firmware-feature-gallery/, Dec. 28, 2007, 3 pages.
Fondantfancies, Dash Clipping: Don't Wait for Mac OS X 10.5 Leopard, fondantfancies.com, Available at: http://www.fondantfancies.com/blog/3001239/, Aug. 8, 2006, 9 pages.
Forsberg et al., "Aperture Based Selection for Immersive Virtual Environments", Proceedings of the ACM Symposium on User Interface Software and Technology, 1996, 2 pages.
Gada, HTC Touch (Sprint)—MobileTechReview, Smartphone Reviews by Mobile Tech Review, Available at: http:www.mobiletechrevie'vV.com!phones/HTC-Touch.html, Nov. 2, 2007, 7 pages.
Hesseldahl, An App the Mac can Brag About, Forbes.com, Available at: http://www.forbes.com/2003112/15/cxah1215tentechprint.html, Dec. 15, 2003, 2 pages.
Mello, Jr, Tiger's Dashboard Brings Widgets to New Dimension, MacNewsWorld, Available at: http://www.macnewsworld.com/storv/42630.html., Jun. 23, 2006, 3 pages.
microsoft.com, Right-Clicking with a Pen, Microsoft, Available at: http://www.microsoft.com/windowsxp/using/tabletpc/learnmore/rightclick.mspx, Nov. 7, 2002, 3 pages.
O'Hara, Absolute Beginner's Guide to Microsoft Window XP 2003, 1 page.
Sadun, Erica's Documentation: Applications and Utilities for the iPhone and iPod Touch, Copyright 2007, Available at: http://ericasadun.com/ftQ/DeQrecated/Documentation/Manual-0.04.odf.
Notice of Acceptance received in Australian Patent Application No. 2008296445, dated Dec. 14, 2011, 3 pages.
Notification of Acceptance received in Australian Patent Application No. 2009204252, dated Oct. 17, 2011, 3 pages.
Office Action received for Australian Patent Application No. 2009204252, dated May 18, 2011, 2 pages.
Notice of Acceptance received for Australian Patent Application No. 2010200763, dated Aug. 21, 2012, 3 pages.

(56) References Cited

OTHER PUBLICATIONS

Certification of Australian Innovation Patent No. 2011101194, dated Mar. 2, 2012, 4 pages.
Office Action received for Australian Patent Application No. 2012202140, dated Aug. 12, 2013, 2 pages.
Office Action received for Australian Patent Application No. 2008296445, dated Oct. 29, 2010, 2 pages.
Office Action received for Australian Patent Application No. 2009100812, dated Sep. 14, 2009 2 pages.
Office Action received for Australian Patent Application No. 2009100813, dated Sep. 14, 2009, 2 pages.
Office Action received for Australian Patent Application No. 2009204252, dated Apr. 20, 2010 3 pages.
Office Action received for Australian Patent Application No. 2010200763, dated Jul. 28, 2011 2 pages.
Office Action received from Canadian Patent Application No. 2,633,759, dated Apr. 18, 2013, 2 pages.
Office Action received for Canadian Patent Application No. 2,633,759, dated Apr. 2, 2009.
Office Action received for Canadian Patent Application No. 2,633,759, dated Aug. 12, 2010.
Office Action received for Canadian Patent Application No. 2,633,759, dated Dec. 10, 2009.
Office Action received from Chinese Patent Application No. 200880112570.2, dated Feb. 20, 2013, 5 pages.
Intention to grant received in Chinese Patent Application No. 200910173272.0, dated Oct. 23, 2012, 1 page.
Office Action received from Chinese Patent Application No. 200910173272.0 dated Nov. 30, 2011, 8 pages.
Office Action received from Chinese Patent Application No. 200980000229.2 dated Jul. 2, 2013, 4 pages.
Office Action received from Chinese Patent Application No. 200980000229.2 dated Nov. 30, 2011, 24 pages.
Office Action received from Chinese Patent Application No. 200980000229.2, dated Oct. 26, 2012, 22 pages.
Office Action received for Chinese Patent Application No. 200680053441.1, dated Nov. 12, 2010.
Office Action received from Chinese Patent Application No. 200680053441.1 dated Mar. 30, 2010, 5 pages.
Grant for Invention Patent Received in Chinese Patent Application No. ZL200680053441.1, dated Jan. 28, 2011.
Office Action received for Chinese Patent Application No. 200780041309.3, dated Nov. 1, 2012, 5 pages.
Office Action received from Chinese Patent Application No. 200780041309.3 dated Jan. 18, 2012, 15 pages.
Decision to grant dated Aug. 6, 2012, received on Chinese Patent Application No. 200880110709.X, 2 pages.
Office Action received from Chinese Patent Application No. 200880112570.2 dated Aug. 24, 2011, 6 pages.
Office Action received from European Patent Application No. 07814689.1 dated Dec. 1, 2011, 6 pages.
Office Action received from European Patent Application No. 07814689.1 dated Mar. 4, 2011, 6 pages.
Summons to attend oral proceedings received in European Application No. 08798713.7, dated Aug. 30, 2013, 15 pages.
Office Action received from European Patent Application No. 09170697.8 dated Dec. 13, 2011, 5 pages.
Summons to attend oral proceedings received in European Application No. 09170697.8, dated Apr. 22, 2013, 6 pages.
Grant notice received in European Application No. 09700333.9, dated Jun. 20, 2013, 7 pages.
Office Action received from European Patent Application No. 09700333.9, dated Jun. 10, 2011, 5 pages.
Office Action received from European Patent Application No. 09700333.9, dated Sep. 21, 2012, 4 pages.
Extended European Search Report received for European Patent Application No. 12177813.8, dated Feb. 1, 2013, 6 pages.
European Search Report received for European Patent Application No. 12189764.9, dated Dec. 18, 2012, 5 pages.
European Search Report received for European Patent Application No. 12194312.0, dated Jan. 16, 2013, 8 pages.
European Search Report received for European Patent Application No. 12194315.3, dated Jan. 16, 2013, 7 pages.
Office Action received from European Patent Application No. 06846840.4 dated Oct. 13, 2008, 3 pages.
Office Action received for European Patent Application No. 08829660.3, dated Oct. 15, 2010, 8 pages.
Office Action received from European Patent Application No. 08829660.3 dated Aug. 2, 2013, 7 pages.
Office Action received from European Patent Application No. 09700333.9 dated Nov. 26, 2010, 5 pages.
Wildarya, iDesksoft Desktop Icon Toy v2.9, Available at: http://www.dl4all.com/2007/10/16/idesksoft:desktoo icon tov v2.9.html, Oct. 16, 2007, 4 pages.
Office Action received from German Patent Application No. 112006003600.9 dated Aug. 9, 2011.
Office Action received from German Patent Application No. 112006003600.9, dated Oct. 27, 2009.
Office Action received from Japanese Patent Application No. 200780041309.3, dated Jul. 2, 2013, 12 pages.
Office Action received from Japanese Patent Application No. 2008548858 dated May 30, 2011.
Office Action received from Japanese Patent Application No. 2008-548858 dated Jan. 20, 2012, 5 pages.
Patent Grant received in Japanese Patent Application No. 2008-548858, dated Sep. 24, 2012, 3 pages.
Office Action received from Japanese Patent Application No. 2009-51921 dated Jan. 20, 2012, 3 pages.
Examiner's Pre-Reveiw received in Japanese Application No. 2009-051921 dated May 31, 2013, 7 pages.
Office Action received from Japanese Patent Application No. 2009-051921 dated Jun. 27, 2011.
Office Action received from Japanese Patent Application No. 2009-051921 dated Sep. 2012, 3 pages.
Decision to grant dated May 31, 2013, received on Japanese Patent Application No. 2010-524102, 3 pages.
Office Action received for Japanese Patent Application No. 2010-524102, dated Feb. 13, 2012, 2 pages.
Office Action received from Japanese Patent Application No. 2010-524102 dated Oct. 26, 2012, 4 pages.
Office Action received from Korean Patent Application No. 1020107007258 dated Jan. 30, 2013, 4 pages.
Office Action received from Korean Patent Application No. 10-2010-7007258 dated Aug. 8, 2011, 2 pages.
International Search Report and Written Opinion received for PCT Patent Application No. PCT/US2007/077639, dated Jul. 8, 2008, 11 pages.
International Search Report and Written Opinion received for PCT Patent Application No. PCT/US2008/050430, dated Sep. 1, 2008, 13 pages.
Invitation to Pay Additional Fees and Partial Search Report Received received for PCT Patent Application No. PCT/US2008/050430, dated Jun. 27, 2008, 7 pages.
International Search Report and Written Opinion received for PCT Patent Application No. PCT/US2008/050431, dated Jun. 17, 2008, 10 pages.
International Search Report and Written Opinion received for PCT Patent Application No. PCT/US2008/074341, dated Nov. 27, 2009, 25 pages.
Non-Final Office Action received for U.S. Appl. No. 12/242,851, dated Sep. 20, 2012, 19 pages.
International Preliminary Report on Patentability received for PCT Patent Application No. PCT/US2008/074625, dated Mar. 18, 2010, 6 pages.
International Search Report and Written Opinion received for PCT Patent Application No. PCT/US2008/074625, dated Jan. 8, 2009, 8 pages.
International Preliminary Report on Patentability received for PCT Patent Application No. PCT/US2009/030225, dated Jul. 15, 2010, 10 pages.

(56) References Cited

OTHER PUBLICATIONS

International Search Report and Written Opinion received for PCT Patent Application No. PCT/US2009/030225, dated Feb. 25, 2010, 15 pages.
Invitation to Pay Additional Fees and Partial Search Report Received received for PCT Patent Application No. PCT/US2009/030225, dated Nov. 16, 2009, 4 pages.
International Search Report and Written Opinion received for PCT Patent Application No. PCT/US2007/077643, dated May 8, 2008.
Final Office Action received for U.S. Appl. No. 11/849,938, dated Jan. 30, 2013, 31 pages.
Final Office Action received for U.S. Appl. No. 11/849,938, dated May 27, 2011, 21 pages.
Non-Final Office Action received for U.S. Appl. No. 11/849,938, dated Dec. 14, 2011, 26 pages.
Non-Final Office Action received for U.S. Appl. No. 11/849,938, dated Oct. 12, 2010, 19 pages.
Notice of Allowance received for U.S. Appl. No. 11/849,938, dated Oct. 10, 2013, 28 pages.
Final Office Action received for U.S. Appl. No. 11/850,005, dated Sep. 14, 2012, 22 pages.
Final Office Action received for U.S. Appl. No. 11/850,010, dated Feb. 15, 2013, 21 pages.
Final Office Action received for U.S. Appl. No. 11/850,010, dated Oct. 17, 2011, 11 pages.
Non-Final Office Action received for U.S. Appl. No. 11/850,010, dated May 16, 2012, 12 pages.
Non-Final Office Action received for U.S. Appl. No. 11/850,010, dated May 2, 2011, 10 pages.
Final Office Action received for U.S. Appl. No. 11/850,011, dated Dec. 1, 2010, 15 pages.
Non-Final Office Action received for U.S. Appl. No. 11/850,011, dated Aug. 11, 2010 19 pages.
Notice of Allowance received for U.S. Appl. No. 11/850,011, dated Feb. 18, 2011, 9 pages.
Final Office Action received for U.S. Appl. No. 11/969,809, dated Jul. 14, 2011, 26 pages.
Non-Final Office Action received for U.S. Appl. No. 11/969,809, dated Mar. 14, 2011, 22 pages.
Notice of Allowance received for U.S. Appl. No. 11/969,809, dated Apr. 26, 2013, 23 pages.
Final Office Action received for U.S. Appl. No. 11/969,912, dated Oct. 31, 2011, 14 pages.
Non-Final Office Action received for U.S. Appl. No. 11/969,912, dated Apr. 3, 2011, 9 pages.
Non-Final Office Action received for U.S. Appl. No. 11/969,912, dated Sep. 10, 2013, 12 pages.
Final Office Action received for U.S. Appl. No. 12/217,029, dated Oct. 5, 2012, 32 pages.
Non-Final Office Action received for U.S. Appl. No. 12/217,029, dated Apr. 18, 2011, 24 pages.
Non-Final Office Action received for U.S. Appl. No. 12/217,029, dated Aug. 19, 2013, 10 pages.
Non-Final Office Action received for U.S. Appl. No. 12/217,029, dated Jan. 25, 2012, 24 pages.
Final Office Action received for U.S. Appl. No. 12/242,851, dated Dec. 12, 2011, 17 pages.
Final Office Action received for U.S. Appl. No. 12/242,851, dated May 10, 2013, 33 pages.
Non-Final Office Action received for U.S. Appl. No. 12/242,851, dated Apr. 15, 2011, 21 pages.
Notice of Allowance received for U.S. Appl. No. 11/849,938, dated Nov. 27, 2013, 2 pages.
Non Final Office Action received for U.S. Appl. No. 11/850,005, dated May 29, 2015, 12 pages.
Non Final Office Action received for U.S. Appl. No. 14/142,640, dated Jun. 5, 2015, 29 pages.
Autocomplete Plugin, Emesene Forum, available at <http://emeseme.org/smf/index.olm?topic=1276.0>, Jun. 20, 2008, 5 pages.
ImageShack—Hosting, available at <http://img129.imageshack.us/mv.php?image=autocompleteemoticonprexw0.jpg>, Nov. 10, 2008, 1 page.
Smiley Conversion Table, available at <http://surf-style.us/manual3.htm>, Dec. 5, 2008, 8 pages.
International Preliminary Report on Patentability received for PCT Patent Application No. PCT/US2006/062685, dated Jul. 1, 2008, 6 pages.
International Search Report and Written Opinion received for PCT Patent Application No. PCT/US2007/077638, dated Feb. 19, 2008, 9 pages.
International Preliminary Report on Patentability received for PCT Patent Application No. PCT/US2007/077639, dated Mar. 10, 2009, 6 pages.
International Preliminary Report on Patentability received for PCT Patent Application No. PCT/US2007/077643, dated Mar. 10, 2009, 7 pages.
International Search Report and Written Opinion received for PCT Patent Application No. PCT/US2007/077644, dated May 30, 2008, 18 pages.
Invitation to pay additional fees received for PCT Patent Application No. PCT/US2007/077644, dated Jan. 23, 2008, 10 pages.
International Search Report and Written Opinion received for PCT Patent Application No. PCT/US2007/077773, dated Jan. 15, 2008, 8 pages.
International Search Report and Written Opinion received for PCT Patent Application No. PCT/US2007/088879, dated Jun. 30, 2008, 8 pages.
International Search Report and Written Opinion received for PCT Patent Application No. PCT/US2007/088893, dated Jul. 11, 2008, 10 pages.
International Preliminary Report on Patentability received for PCT Patent Application No. PCT/US2008/050430, dated Jul. 7, 2009, 10 pages.
International Preliminary Report on Patentability received for PCT Patent Application No. PCT/US2008/050431, dated Jul. 7, 2009, 8 pages.
International Preliminary Report on Patentability received for PCT Patent Application No. PCT/US2008/074341, dated Mar. 9, 2010, 8 pages.
Office Action received for European Patent Application No. 07814690.9, dated Jun. 21, 2010, 5 pages.
Office Action received for European Patent Application No. 07814690.9, dated Oct. 19, 2010, 8 pages.
Summons to Attend Oral Proceedings received for European Patent Application No. 07814690.9, mailed on Nov. 22, 2011, 4 pages.
Office Action received for European Patent Application No. 07841980.1, dated Feb. 23, 2012, 5 pages.
Summons to Attend Oral Proceedings received for European Patent Application No. 07841980.1, mailed on Sep. 28, 2012, 8 pages.
Office Action received for European Patent Application No. 07869929.5, dated Dec. 27, 2010, 6 pages.
Summons to Attend Oral Proceedings received for European Patent Application No. 07869929.5, mailed on Dec. 13, 2011, 6 pages.
Summons to Attend Oral Proceedings received for European Patent Application No. 07869929.5, mailed on Jan. 23, 2012, 1 page.
Communication received for European Patent Application No. 08798713.7, dated Apr. 28, 2010, 2 pages.
Office Action received for European Patent Application No. 08798713.7, dated Feb. 9, 2012, 7 pages.
Office Action received for European Patent Application No. 08798713.7, dated Jul. 29, 2014, 18 pages.
Office Action received for European Patent Application No. 08798713.7, dated Jun. 22, 2011, 10 pages.
Extended European Search Report (includes Partial European Search Report and European Search Opinion) received for European Patent Application No. 09170697.8, dated Apr. 28, 2010, 3 pages.
Decision to Refusal received for European Patent Application No. 09171787.6, dated Dec. 14, 2011, 11 pages.
Extended European Search Report (includes Partial European Search Report and European Search Opinion) received for European Patent Application No. 09171787.6, dated Jan. 26, 2010, 6 pages.

(56) References Cited

OTHER PUBLICATIONS

Office Action received for European Patent Application No. 09171787.6, dated Jul. 12, 2011, 5 pages.
Extended European Search Report (includes Partial European Search Report and European Search Opinion) received for European Patent Application No. 12169786.6, dated Jul. 11, 2012, 10 pages.
Office Action received for European Patent Application No. 12194312.0, dated Jan. 13, 2014, 4 pages.
Office Action received for European Patent Application No. 12194312.0, dated Oct. 8, 2013, 5 pages.
Office Action received for European Patent Application No. 12194315.3, dated Jan. 13, 2014, 4 pages.
Office Action received for European Patent Application No. 12194315.3, dated Oct. 8, 2013, 5 pages.
Extended European Search Report (includes Partial European Search Report and European Search Opinion) received for European Patent Application No. 13174706.5, dated Jan. 8, 2015, 8 pages.
Office Action received for Australian Patent Application No. 2007289019, dated Jul. 2, 2009, 3 pages.
Office Action received for Australian Patent Application No. 2007289019, dated Oct. 7, 2009, 2 pages.
Notice of Acceptance received for Australian Patent Application No. 2007292383, dated Jan. 4, 2012, 3 pages.
Office Action received for Australian Patent Application No. 2007292383, dated Dec. 22, 2011, 2 pages.
Office Action received for Australian Patent Application No. 2007292383, dated Mar. 24, 2010, 2 pages.
Office Action received for Australian Patent Application No. 2007292383, dated May 12, 2011, 2 pages.
Notice of Allowance received for Canadian Patent Application No. 2,633,759, dated Sep. 9, 2013, 1 page.
Youtube, "Broadcasting Ourselves", The Official Youtube blog Available at <http://youtube-global.blogspot.in/2005_11_01_archive.html>, Nov. 15, 2005, 5 pages.
Youtube, "Broadcast Yourself", Available at <www.youtube.com>, Nov. 1, 2005, 2 pages.
Notice of Allowance received for Canadian Patent Application No. 2,845,297, dated Nov. 10, 2014, 1 page.
Office Action received for Canadian Patent Application No. 2,845,297, dated Apr. 23, 2014, 2 pages.
Decision to Grant received for Chinese Patent Application No. 200780001140.9, dated Feb. 3, 2012, 4 pages (2 pages of English Translation and 2 pages of Official copy).
Office Action received for Chinese Patent Application No. 200780001140.9, dated Jan. 15, 2010, 5 pages (English Translation only).
Final Office Action received for U.S. Appl. No. 11/850,005, dated Jul. 8, 2011, 9 pages.
Final Office Action received for U.S. Appl. No. 11/850,005, dated May 22, 2014, 13 pages.
Non-Final Office Action received for U.S. Appl. No. 11/850,005, dated Mar. 18, 2011, 10 pages.
Non-Final Office Action received for U.S. Appl. No. 11/850,005, dated Nov. 10, 2011, 11 pages.
Non-Final Office Action received for U.S. Appl. No. 11/850,005, dated Oct. 24, 2013, 11 pages.
Final Office Action received for U.S. Appl. No. 11/850,008, dated Dec. 29, 2010, 14 pages.
Non-Final Office Action received for U.S. Appl. No. 11/850,008, dated Aug. 2, 2010, 14 pages.
Notice of Allowance received for U.S. Appl. No. 11/850,008, dated Mar. 11, 2011, 7 pages.
Final Office Action received for U.S. Appl. No. 11/850,010, dated May 8, 2014, 11 pages.
Non Final Office Action received for U.S. Appl. No. 11/850,010, dated Dec. 17, 2014, 10 pages.
Non-Final Office Action received for U.S. Appl. No. 11/850,010, dated Oct. 24, 2013, 13 pages.
Notice of Allowance received for U.S. Appl. No. 11/850,011, dated Feb. 11, 2011, 5 pages.
Supplemental Notice of Allowance received for U.S. Appl. No. 11/850,011, dated Feb. 24, 2011, 6 pages.
Non-Final Office Action received for U.S. Appl. No. 11/850,013, dated Jun. 11, 2010, 32 pages.
Notice of Allowance received for U.S. Appl. No. 11/850,013, dated Oct. 20, 2010, 20 pages.
Final Office Action received for U.S. Appl. No. 11/850,638, dated May 15, 2012, 16 pages.
Final Office Action received for U.S. Appl. No. 11/850,638, dated Feb. 8, 2011, 14 pages.
Non-Final Office Action received for U.S. Appl. No. 11/850,638, daated Oct. 26, 2010, 17 pages.
Non-Final Office Action received for U.S. Appl. No. 11/850,638, dated Jan. 17, 2012, 15 pages.
Final Office Action received for U.S. Appl. No. 11/961,773, dated Nov. 2, 2011, 12 pages.
Final Office Action received for U.S. Appl. No. 11/961,773, dated Nov. 29, 2012, 15 pages.
Non-Final Office Action received for U.S. Appl. No. 11/961,773, dated Apr. 15, 2011, 21 pages.
Non-Final Office Action received for U.S. Appl. No. 11/961,773, dated May 10, 2012, 14 pages.
Notice of Allowance received for U.S. Appl. No. 11/969,912, dated Jun. 11, 2014, 4 pages.
Notice of Allowance received for U.S. Appl. No. 11/969,912, dated Mar. 6, 2014, 12 pages.
Final Office Action received for U.S. Appl. No. 12/217,029, dated May 22, 2014, 12 pages.
Advisory Action received for U.S. Appl. No. 12/242,851, dated Nov. 15, 2013, 4 pages.
Non-Final Office Action received for U.S. Appl. No. 12/242,851, dated Oct. 6, 2014, 27 pages.
Final Office Action received for U.S. Appl. No. 12/274,346, dated Mar. 14, 2012, 39 pages.
Non-Final Office Action received for U.S. Appl. No. 12/274,346, dated Aug. 26, 2011, 26 pages.
Notice of Allowance received for U.S. Appl. No. 12/274,346, dated Jul. 17, 2013, 10 pages.
Notice of Allowance received for U.S. Appl. No. 12/274,346, dated Mar. 12, 2013, 18 pages.
Final Office Action received for U.S. Appl. No. 12/365,887, dated Feb. 29, 2012, 15 pages.
Non-Final Office Action received for U.S. Appl. No. 12/365,887, dated Aug. 31, 2011, 22 pages.
Notice of Allowance received for U.S. Appl. No. 12/365,887, dated May 23, 2012, 5 pages.
Non-Final Office Action received for U.S. Appl. No. 12/365,888, dated Nov. 10, 2011, 8 pages.
Non-Final Office Action received for U.S. Appl. No. 12/981,433, dated Oct. 11, 2012, 29 pages.
Non-Final Office Action received for U.S. Appl. No. 13/155,304, dated Sep. 5, 2012, 11 pages.
Agarwal, Amit, "iTunesInlineVideo", Digital Inspiration—The Tech Guide, available online at <http://labnol.blogspot.com/2006_09_17_labnol_archive.html>, 2006, 27 pages.
Ahmad et al., "Content-Based Image Retrieval on Mobile Devices", Proceedings of SPIE-IST Electronic Imaging, vol. 5684, 2005, pp. 255-264.
Alam et al., "Web Document Manipulation for Small Screen Devices: A Review", Available at <http://www.csc.liv.ac.uk/wda2003/Papers/Section_II/Paper_8.pdf>, 2003, pp. 33-36.
Alejandre, Suzanne, "Graphing Linear Equations", Available at <http://mathforum.org/alejandre/palm/times.palm.html>, retrieved on Jun. 12, 2006, 3 pages.
Apparao et al., "Level 1 Document Object Model Specification", W3C Working Draft, available at <http://www.w3.org/TR/WD-DOM/>, Jul. 20, 1998, 3 pages.
Apple, "Iphone User Guide", iPhone first generation, Available at: <http://pocketpccentral.net/iphone/products/1g_iphone.htm> Retrieved on Sep. 25, 2013, Jun. 29, 2007, 124 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.

(56) References Cited

OTHER PUBLICATIONS

Apple Iphone School, "Customize 1.19 Update for the iPhone", 4:02 minutes video, available at <http://www.youtube.com/watch?v=5ogDzOM89oc>, uploaded on Dec. 8, 2007, 2 pages.
Apple Iphone School, "SummerBoard 3.0a9 for iPhone", 4:50 minutes video, available at <http://www.youtube.com/watch?v=s_P_9mrZTKs>, uploaded on Oct. 21, 2007, 2 pages.
Barsch, Bill, "3D Desktop! TouchScreen and XGL on Linux!", 2:42 minutes video, available at <http://www.youtube.com/watch?v=Yx9FgLr9oTk>, uploaded on Aug. 15, 2006, 2 pages.
Baudisch et al., "Collapse-to-Zoom: Viewing Web Pages on Small Screen Devices by Interactively Removing Irrelevant Content", Microsoft Research Available at <http://www.patrickbaudisch.com/publications/2004-Baudisch-UIST04-CollapseToZoonn.pdf>, Oct. 27, 2004, 4 pages.
Bitstream, "ThunderHawk Pocket PC Edition for End Users", Available at <http://www.bitstream.com/wireless/products/pocketpc/faq_using.html>, retrieved on Jun. 12, 2006, 4 pages.
Blickenstorfer, Conrad H.., "NeoNode N1 Can a Unique Interface Put this Compelling Smart Phone on the Map?", available at <http://pencomputing.com/WinCE/neonode-n1-review.html>, retrieved on Sep. 1, 2014, 5 pages.
Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.
Buyukkokten et al., "Power Browser: Efficient Web Browsing for PDAs", Proceedings of the SIGCHI conference on Human Factors in Computing Systems, Dec. 27, 2000, 8 pages.
Cerulean Studios, "Trillian Online User Manual", available at <http://www.ceruleanstudios.com/support/manual.php?hchap=4hsub=1hsect=5>, 2006, 11 pages.
Chen et al., "A Novel Navigation and Transmission Technique for Mobile Handheld Devices", Technical Report CSE-2003-1, Department of Computer Science, University of California at Davis,, 2003, 8 pages.
Chen et al., "Detecting Web Pages Structure for Adaptive Viewing on Small Form Factor Devices", Proceedings of the 12th international conference on World Wide Web, 2003, 9 pages.
Chen et al., "DRESS: A Slicing Tree Based Web Page Representation for Various Display Sizes", Microsoft Researach, Technical Report, Nov. 16, 2002, 9 pages.
CNET, "Bounding Box", available at <http://www.cnet.com/Resources/Info/Glossary/Terms/boundingbox.html>, retrieved on Dec. 29, 2008, 1 page.
CNET, "Fujitsu LifeBook B6110D", Reviews, Nov. 24, 2005, 2 pages.
Cooper, Alan, "The Inmates Are Running the Asylum", Sams Publishing, Mar. 23, 1999, pp. 138-147.
Dearman et al., "Rendezvousing with Location-Aware Devices: Enhancing Social Coordination", Interacting with Computers, vol. 17, Issue 5, available at <http://www.dgp.toronto.edu/dearman/publications/dearman_IWC05.pdf>, Sep. 2005, pp. 542-566.
Opera Software, "Opera 8.5 Beta 2 for Windows Mobile, Pocket PC", Available at <http://www.opera.com/productslmobile/products/winmobileppc>, retrieved on Apr. 5, 2006, 2 pages.
Expansystv, "HTC Touch Dual Demonstration by eXpansys", 5:26 minutes video, available at <http://www.youtube.com/watch?v=Tupk8MYLhMk>, uploaded on Oct. 1, 2007, 2 pages.
Eyemodule Springboard Compatible, "Turn Your Handspring Visor Handheld into a Digital Camera", User's Manual, 2000, 9 pages.
Farber, Dan, "Jobs: Today Apple is Going to Reinvent the Phone", ZDNet, available at <http://www.zdnet.com/blog/btl/jobs-today-apple-is-going-to-reinvent-the-phone/4249>, Jan. 9, 2007, 3 pages.
Fingerworks Forums, "Is the Multitouch Lemur Related?", Dec. 24, 2004, 2 pages.
Fingerworks, Inc., "Installation and Operation Guide for the TouchStream and TouchStream LP", available at <http://www.fingerworks.com>, 2002, 14 pages.
Fingerworks, Inc., "Quick Reference Guide for iGesture Products", available at <http://www.fingerworks.com>, 1999-2002, 2 pages.
Fingerworks, Inc., "Quick Reference Guide for TouchStream ST/LP", available at <http://www.fingerworks.com>, 2001-2003, 4 pages.
Fingerworks, Inc., "TouchStream LP Silver", available at <http://www.fingerworks.com>, Apr. 27, 2005, 18 pages.
Foxit, "Foxit Reader v. 1.3 Feature Description", available at <http://www.foxitsoftware.com/pdf/reader2/verhistory.htm>, 2008, 4 pages.
Geary, Leigh, "Orange SPV C600 Review", Available at <http://www.coolsmartphone.com/2010/12/23/orange-spv-c600-review/>, Apr. 14, 2006, 58 pages.
Getgreg, "Jeff Han's Multiple Touch Point Display, the Stuff Dreams are Made of", Available at http://www.theyshoulddothat.com/2006/08/jeff_hanns_multiple_touch_poin_html, retrieved on Aug. 16, 2006, 2 pages.
GSM, Arena, "Neonode N2 User Interface", 3:06 minutes video, available at <https://www.youtube.com/watch?v=MfDMHmIZRLc>, uploaded on Feb. 13, 2007, 2 pages.
Gsmarena, Team, "HTC Touch Review: Smart to Touch the Spot", available at <http://www.gsmarena.com/htc_touch-review-189.php>, Nov. 28, 2007, 18 pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Han, Jeff, "Unveiling the Genius of Multi-touch Interface Design", Ted Ideas Worth Spreading, available at <http://www.ted.com/index.php/talks/view/id/65>, Aug. 2006, 1 page.
Hart, Kim, "Rewriting the Web for Mobile Phones", washingtonpost.com, available at <http://www.washingtonpost.com/wp-dyn/content/article/2006/07/25/AR2006072501517_pf.html>, Jul. 26, 2006, 2 pages.
Hinckley et al., "Input/Output Devices and Interaction Techniques", CRC Press, Nov. 2004, pp. 1-79.
Holmquist, Lars Erik., "The Zoom Browser Showing Simultaneous Detail and Overview in Large Documents", Available at <http://www.hb.se/bhs/ith/3-98/leh.htm> retrieved Dec. 17, 2007, Human IT, 1998, 12 pages.
Infoworld Video, "Two Geeks and an iPhone: Part 3", available at <http://web.archive.org/web/20080124065641/http:/www.infoworld.com/video/interviews/Mobile-Tech-Apple-iPhone/Two-Geeks-and-an-iPhone-Part-3/video_1966.html>, Dec. 18, 2007, 2 pages.
Joire, Myriam, "Neonode N1m Review", 9:55 minutes video, available at <http://www.youtube.com/watch?v=Tj-KS2kflr0>, uploaded on Jun 29, 2007, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", CHI 2005, 2005, 17 pages.
Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384key2=2419987911co11=GUIDEd1=GUIdECFID=47073625CFTOKEN=65767142>, Oct. 29, 2004, pp. 19-24.
Kinoma, "Kinoma Player 4 EX Documentation", Available at <http://replay.waybackmachine.org/20061101175306/http//www.kinoma.com/index/pd-player-4>, archived on Nov. 1, 2006, 28 pages.
Laakko et al., "Adapting Web Content to Mobile User Agents", IEEE Internet Computing, vol. 9, No. 2, Mar./Apr. 2005, pp. 46-53.
Landragin, Frederic, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.
Lie, Hakon Wium., "Cascading Style Sheets", University of Osloensis, MDCCCXI, 2005, pp. 243-247.
Microsoft Word, "Example of Scrolling Pages in Word 2003", 2003, 3 pages.
Milic-Frayling et al., "SmartView: Enhanced Document Viewer for Mobile Devices", Microsoft Technical Report, available at <ftp://

(56) References Cited

OTHER PUBLICATIONS ftp.research.microsoft.com/pub/tr/tr-2002-114.pdf>, retrieved on Dec. 17, 2007, Nov. 15, 2002, 9 pages.

Milic-Frayling et al., "SmartView: Flexible Viewing of Web Page Contents", Proceedings of the Eleventh International World Wide Web Conference, available at <http://www2002.org/CDROM/poster/172/>, May 11, 2002, 4 pages.

Miller, Matthew, "HTC Touch and TouchFLO Interface", 7:53 minutes video, available at <http://www.youtube.com/watch?v=6oUp4wOcUc4>, uploaded on Jun 6, 2007, 2 pages.

Neonode Inc., "Welcome to the N1 Guide", available at <http://www.ebookspdf.com/gadget/2818/neonode-n1m-manual/>, Jul. 2004, pp. 1-42.

neonode.com, "N1 Quick Start Guide", Version 0.5, Apr. 5, 2005, pp. 1-24.

NTT Docomo, "i-mode Compatible Pictograms", available at <http://www.nttdocomo.co.jp/english/service/imode/make/content/pictograph/index.html>, 2008, 2 pages.

Oliver, Dick, "Adding Multimedia to Your Web Site", Chapter 22, Web Publishing Professional Reference Edition, Available online at <http://www.ssuet.edu.pk/taimoor/books/1-57521-198-X/index.htm>, 1997, 14 pages.

Opera Software, "Download the Opera Mobile Browser", Available at <http://www.opera.com/products/mobile/ products/>, retrieved on Oct. 19, 2006, 5 pages.

Opera Software, "Opera 7.60 for Series 60 Mobile", Available at <http://jp.opera.com/support/tutorials/s60/760/O760manual.pdf>, 2009, 14 pages.

Response to Notice of Opposition filed for Australian Patent Application No. 2009204252, Apr. 28, 2014, 4 pages.

Opera Software, "Opera 8.5 for S60 Phones-Get the Full Internet Experience on Your Mobile Phone", Available at <http://www.symbian-freak.com/news/1105/opera.htm>, Oct. 14, 2005, 3 pages.

Opera Software, "Opera for Mobile, The Full Web Anytime, Anywhere", Available at <www.opera.com/mobile>, Jan. 2006, 7 pages.

Opera Software, "Opera for S60 Tutorial", Available at <http://www.xmarks.com/site/www.opera.com/support/tutorials/s60/>, retrieved on Apr. 5, 2006, 5 pages.

Opera Software, "Opera for Windows Mobile Smartphone 2003 Tutorial", Available at <http://www.opera.com/support/tutorials/winmobile>, retrieved on Apr. 5, 2005, 4 pages.

Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.

Palme et al., "MIME Encapsulation of Aggregate Documents, such as HTML", Network Working Group, 1999, 24 pages.

Palmone, "Your Mobile Manager", Chapter 2, LifeDrive User's Guide, available at <http://www.palm.com/us/support/handbooks/lifedrive/en/lifedrive_handbook.pdf>, 2005, 23 pages.

Park, Will, "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.

Park, Will, "Neonode N2 Unboxing Pics!", available at <http://www.intomobile.com/2007/07/18/neonode-n2-unboxing-pics/>, Jul. 18, 2007, 7 pages.

pocketgear.com, "Software Keyboards: Efzy-Japanese (Eng/Jp) 4.0", TimeSpacesystem Co. Ltd, available at <http://classic.pocketgear.com/software detail.asp?id=9115>, updated on Sep. 23, 2008.

Potter, "Graffiti Smilies", PalmInfocenter Forums, available at <http://www.palminfocenter.com/forum/viewtopic.php?t=11307>, Feb. 9, 2003, 6 pages.

Raman et al., "Application-Specific Workload Shaping in Multimedia-Enabled Personal Mobile Devices", CODES+ISSS, Oct. 22-25, 2006, pp. 4-9.

Robie, Jonathan, "What is the Document Object Model?", Texcel Research, available at <http://www.w3.org/TR-DOM/introduction.html>, 2006, 5 pages.

Rohrer, Tim, "Metaphors We Compute by: Bringing Magic into Interface Design", Available online at <http://www.uoregon.edu/-uophil/metaphor/gui4web.htm>, retrieved on Jun. 13, 2006, 7 pages.

Roto et al., "Minimap—A Web Page Visualization Method for Mobile Phones", Proceedings of the SIGCHI Conference on Human Factors in Computing Systems, Apr. 22-27, 2006, pp. 35-44.

Sadun, Erica, "1.1.1 iPhone Multipage Springboard Hack", Available at: <http://www.tuaw.com/2007/10/09/1-1-1-iphone-multipage-springboard-hack/>, on Oct. 9, 2007, Oct. 9, 2007, 3 pages.

Sadun, Erica, "Found Footage: Scrolling iPhone Dock Smashes Through 16-icon Home Screen Limit", The Unofficial Apple Weblog, available at <http://www.tuaw.com/2007/08/30/found-footage-scrolling-iphone-dock-smashes-through-16-icon-hom/>, Aug. 30, 2007, 3 pages.

Salmre, I., "Characteristics of Mobile Applications", Chapter 2, Salmre_02.fm, Dec. 20, 2004, pp. 19-36.

Schreiner, Tony, "High DPI in IE: Tip Mystery Solved", Tony Schreiner's Blog, available at <http://Iblogs.msdn.com/tonyschr/archive/2004/05/05/126305.aspx>, May 2004, 2 pages.

Sharewareconnection, "Handy Animated Emoticons", available at <http://www.sharewareconnection.com/handy-animated-emoticons.htm>, Jul. 2007, 3 pages.

Stampfli, Tracy, "Exploring Full-Screen Mode in Flash Player 9", Available online at <http://www.adobe.com/devnet/flashplayer/articles/full_screen_mode.html>, Nov. 14, 2006, 2 pages.

Stanek et al., "Video and Animation Plug-Ins", Chapter 9, Web Publishing Professional Reference Edition, available at <http://www.ssuet.edu.pk/taimoor/books/1-57521-198-X/index.htm>, 1997, 18 pages.

Surfin'Safari, "XUL", Available online at <http://weblogs.mozillazine.org/hyatt.archives/2003_10.html>, Oct. 2003, 7 pages.

Zytronic, "Touchscreen User Manual Zytronic X-Y Controller (Serial and USB)", XP007916436, Nov. 17, 2006, pp. 1-51.

Tooeasytoforget, "iPhone—Demo of SummerBoard Its Features", 5:05 minutes video, available at <http://www.youtube.com/watch?v=CJOb3ftQLac>, uploaded on Sep. 24, 2007, 2 pages.

Versiontracker, "Photogather-7.2.6. Hi-res Image Viewer Editor for Palm", Available at <http://www.versiontracker.com/dyn/moreinfo/palm/4624>, retrieved on Jun. 12, 2006, 2006, 5 pages.

w3schools.com, "Playing Videos on the Web", Available at <http://www.w3schools.com/media/media_browservideos.asp?out=print, 2006>, 3 pages.

w3schools.com, "Multimedia Video Formats", Available at <http://www.w3sschools.com/media/media_videoformats.asp?output=print>, 2006, 2 pages.

w3schools.com, "Playing QuickTime Movies", Available at <http://www.3schools.com/media/media_quicktime.asp?output=print, 2006>, 2 pages.

Warabino et al., "Video Transcoding Proxy for 3Gwireless Mobile Internet Access", IEEE Communications Magazine, vol. 38, No. 10, Oct. 2000, pp. 66-71.

Wave Technologies, International Inc., "Certified Internet Webmaster Foundations Study Guide", A Thomson Learning Company, CIWF-SGMN-0101A, copyright 1988-2000, 88 pages.

Weblogs, "An Overview of WebCore", Chapter 2, WebCore Documentation, available at <http://lweblogs.mozillazine.org/hyatt/WebCore/chapter2.html>, 2006, 3 pages.

Weblogs, "Downloading and Building WebCore", Chapter 1, WebCore Documentation, available at <http://weblogs.mozillazine.org/hyatt/WebCore/chapter1.html>, 2006, 2 pages.

webmasterworld.com, "Page Zooming with IE-Hidden Feature!", Available at <http://www.webmasterworld.com/forum83/4179.htm>, Jul. 2004, 7 pages.

Wikipedia, "Comparison of Layout Engines", The free encyclopedia, available at <http://en.wikipedia.org/wiki/Comparison_of layout_engines>, 2006, 3 pages.

Wikipedia, "History of YouTube", The Free Encyclopedia, available at <http://en.wikipedia.org/wiki/History_of_YouTube>, retrieved on Mar. 15, 2011, 4 pages.

Wikipedia, "KDE", Tthe free encyclopedia, available at <http://en.wikipedia.org/wiki/KDE>, 2006, 9 pages.

Wikipedia, "KHTML", The free encyclopedia, available at <http://en.wikipedia.org/wiki/KHTML>, 2006, 3 pages.

(56) References Cited

OTHER PUBLICATIONS

Wikipedia, "List of Layout Engines", The Free Encyclopedia, available at <http://en.wikipedia.org/wiki/List_of_layout_engines>, 2006, 1 page.
Williams, Martyn, "LG's Cell Phone Can Pause Live TV", PC World, Oct. 11, 2005, 2 pages.
Wobbrock et al., "WebThumb: Interaction Techniques for Small-Screen Browsers", UIST'02, Paris France, Oct. 27-30, 2002, pp. 205-208.
Xiao et al., "Slicing-Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.
Office Action received for Australian Patent Application No. 2009100760, dated Sep. 28, 2009, 2 pages.
Office Action received for Korean Patent Application No. 10-2009-7007067, dated Aug. 30, 2011, 2 pages (English Translation only).
Office Action received for Korean Patent Application No. 10-2009-7007067, dated Nov. 12, 2010, 3 pages (English Translation only).
Office Action received for Chinese Patent Application No. 200780001140.9, dated Jun. 10, 2011, 7 pages (English Translation only).
Office Action received for Chinese Patent Application No. 2007800412226, dated Feb. 29, 2012, 6 pages (3 pages of English Translation and 3 pages of Official copy).
Office Action received for Chinese Patent Application No. 200780041222.6, dated Jul. 25, 2012, 3 pages (English Translation only).
Office Action received for Chinese Patent Application No. 200780041222.6, dated Oct. 13, 2010, 10 pages (English Translation only).
Office Action received for Chinese Patent Application No. 200780052019.9, dated Feb. 29, 2012, 6 pages (3 pages of English Translation and 3 pages of Official Copy).
Office Action received for Chinese Patent Application No. 200880110709.X, dated Nov. 24, 2011, 10 pages (English Translation only).
Office Action received for German Patent Application No. 112007002107.1, dated Jun. 7, 2010, 3 pages (English Translation only).
Office Action received for Taiwan Patent Application No. 097100075, dated Dec. 29, 2011, 5 pages (English Translation only).
Notice of Allowance received for Korean Patent Application No. 10-2009-7007064, dated Sep. 30, 2011, 2 pages (Official Copy only).(See Communication under 37 CFR § 1.98(a) (3)).
Notice of Allowance received for Korean Patent Application No. 10-2009-7007067, dated Dec. 1, 2011, 2 pages (Official Copy only).(See Communication under 37 CFR § 1.98(a) (3)).
Notice of Allowance received for Korean Patent Application No. 10-2011-7026583, dated Apr. 29, 2015, 2 pages (Official Copy only).(See Communication under 37 CFR § 1.98(a) (3)).
Notice of Allowance received for Korean Patent Application No. 10-2014-7011273, dated Apr. 28, 2015, 2 pages (Official Copy only).(See Communication under 37 CFR § 1.98(a) (3)).
Notice of Allowance received for Korean Patent Application No. 10-2010-7007258, dated Nov. 20, 2013, 2 pages (Official Copy only).(See Communication under 37 CFR § 1.98(a) (3)).
Yin et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.
Notice of Allowance received for U.S. Appl. No. 11/620,647 dated Mar. 2, 2012, 8 pages.
Notice of Allowance received for Korean Patent Application No. 10-2011-7014104, dated Aug. 29, 2013, 2 pages (Official Copy only).(See Communication under 37 CFR § 1.98(a) (3)).
Office Action received for Korean Patent Application No. 10-2011-7014104, dated Jan. 17, 2013, 4 pages (1 page of English Translation and 3 pages of Official Copy).
Notice of Allowance received for Korean Patent Application No. 10-2011-7019633, dated May 18, 2012, 2 pages (Official Copy only).(See Communication under 37 CFR § 1.98(a) (3)).
Notice of Allowance received for Japanese Patent Application No. 2009-051921, dated Jan. 20, 2014, 2 pages (Official Copy only). (See Communication under 37 CFR § 1.98(a) (3)).
Office Action received for Japanese Patent Application No. 2013-252338, dated Jan. 30, 2015, 4 pages (Official Copy only). (See Communication under 37 CFR § 1.98(a) (3)).
Office Action received for Chinese Patent Application No. 200910175852.3, dated Apr. 24, 2012, 10 pages (6 pages of English Translation and 4 pages of Official Copy).
Office Action received for Chinese Patent Application No. 200910175852.3, dated Jun. 2, 2011, 6 pages (English Translation only).
Office Action received for Australian Patent Application No. 2009204252, dated Nov. 28, 2013, 2 pages.
Office Action received for Australian Patent Application No. 2009204252, dated Sep. 16, 2014, 6 pages.
Office Action received for Japanese Patent Application No. 2009-527541, dated May 21, 2012, 3 pages (English Translation only).
Office Action received for Japanese Patent Application No. 2009-527541, dated Sep. 26, 2011, 3 pages (English Translation only).
Office Action received for Japanese Patent Application No. 2009-527566, dated Aug. 15, 2011, 3 pages (English Translation only).
Office Action received for Japanese Patent Application No. 2009-527566, dated Sep. 21, 2012, 3 pages (English Translation only).
Notice of Allowance received for Japanese Patent Application No. 2011-537452, dated Jun. 14, 2013, 3 pages (Official Copy only). (See Communication under 37 CFR § 1.98(a) (3)).
Office Action received for Japanese Patent Application No. 2013-011209, dated Feb. 7, 2014, 3 pages (Official Copy only). (See Communication under 37 CFR § 1.98(a) (3)).
Office Action received for Chinese Patent Application No. 200980000229.2, dated Jun. 27, 2014, 7 pages (4 pages of English Translation and 3 pages of Official copy).
Office Action received for Chinese Patent Application No. 200980152822.9, dated Dec. 5, 2012, 10 pages (English Translation only).
Office Action received for Chinese Patent Application No. 200980152822.9, dated Oct. 21, 2013, 2 pages (English Translation only).
Certificate of Examination received for Australian Patent Application No. 2011101190, dated Nov. 23, 2011, 1 page.
Office Action received for Australian Patent Application No. 2011101194, dated Oct. 21, 2011, 2 pages.
Office Action received for Japanese Patent Application No. 2013-011209, dated Oct. 27, 2014, 3 pages (Official Copy only). (See Communication under 37 CFR § 1.98(a) (3)).
Office Action received for Japanese Patent Application No. 2011-537452, dated Jan. 25, 2013, 7 pages (3 pages of English Translation and 4 pages of Official Copy).
Office Action received for Chinese Patent Application No. 200980000229.2, dated Jan. 6, 2014, 6 pages (3 pages of English Translation and 3 pages of Official Copy).
Notice of Allowance received for Chinese Patent Application No. 200980000229.2, dated Oct. 24, 2014, 2 pages (Official Copy only).(See Communication under 37 CFR § 1.98(a) (3)).
Office Action received for Chinese Patent Application No. 201210399033.9, dated Nov. 27, 2014, 7 pages (Official Copy only).(See Communication under 37 CFR § 1.98(a) (3)).
Office Action received for Australian Patent Application No. 2012200475, dated Nov. 19, 2013, 4 pages.
Notice of Acceptance received for Australia Patent Application No. 2012261534, dated Jan. 6, 2015, 2 pages.
Office Action received for Australian Patent Application No. 2012261534, dated Dec. 3, 2013, 3 pages.
Non-Final Office Action received for U.S. Appl. No. 11/459,602, dated Sep. 4, 2008, 13 pages.

(56) References Cited

OTHER PUBLICATIONS

Notice of Allowance received for U.S. Appl. No. 11/459,602, dated Jan. 9, 2009, 6 pages.
Final Office Action received for U.S. Appl. No. 11/620,647, dated Dec. 23, 2010, 21 pages.
Non-Final Office Action received for U.S. Appl. No. 11/620,647 dated Jun. 24, 2010, 19 pages.
Non-Final Office Action received for U.S. Appl. No. 11/620,647 dated Nov. 17, 2009, 20 pages.
Non-Final Office Action received for U.S. Appl. No. 11/620,647, dated Oct. 13, 2011, 23 pages.
Final Office Action received for U.S. Appl. No. 11/850,005, dated Nov. 16, 2015, 13 pages.
Office Action received for Japanese Patent Application No. 2013-011209, dated Nov. 2, 2015, 9 pages (2 pages of English Translation and 7 pages of Official Copy).
Office Action received for Japanese Patent Application No. 2013-252338, dated Dec. 4, 2015, 4 pages (2 pages of English Translation and 2 pages of official copy).
Non-Final Office Action received for U.S. Appl. No. 11/850,010, dated Jun. 25, 2015, 10 pages.
Non-Final Office Action received for U.S. Appl. No. 12/242,851, dated Jun. 26, 2015, 33 pages.
Office Action received for Australian Patent Application No. 2012200475, dated Jun. 29, 2015, 3 pages.
Office Action received for Australian Patent Application No. 2012200475, dated Aug. 4, 2015, 3 pages.
Office Action received for Australian Patent Application No. 2014204422, dated Aug. 7, 2015, 3 pages.
Decision to refuse a European Patent application received for European Patent Application No. 06846840.4, dated Mar. 4, 2010, 10 Pages.
Summons to Attend Oral proceedings received for European Patent Application No. 06846840.4, mailed on May 18, 2009, 7 pages.
Decision to Refuse Patent Application received for European Patent Application No. 07814689.1, dated May 11, 2012, 15 pages.
Decision to Refuse Application received for European Patent Application No. 09170697.8, dated Oct. 23, 2013, 12 Pages.
Decision to Grant received for European Patent Application No. 09700333.9, dated Nov. 7, 2013, 2 pages.
Non-Final Office Action received for U.S. Appl. No. 12/217,029, dated Oct. 28, 2015, 23 pages.
Notice of Allowance received for U.S. Appl. No. 14/011,639, dated Sep. 29, 2015, 11 pages.
Office Action received for Chinese Patent Application No. 201210399033.9, dated oct. 8, 2015, 8 pages (3 pages of English Translation and 5 pages of Official Copy).
Notice of Acceptance received for Australian Patent Application No. 2012200475, dated Aug. 24, 2015, 2 pages.
Notice of Allowance received for Japanese Patent Application No. 2013-127963, dated Oct. 9, 2015, 2 pages (Official Copy only). (See Communication under 37 CFR § 1.98(a) (3)).
Notice of Acceptance received for Australian Patent Application No. 2014204422, dated Apr. 28, 2016, 2 pages.
Office Action received for Chinese Patent Application No. 2013107247335, dated Apr. 12, 2016, 14 pages (3 pages of English Translation and 11 pages of Official Copy).
Office Action received for Australian Patent Application No. 2015202076, dated May 5, 2016, 3 pages.
Board Opinion received for Chinese Patent Application No. 200780041309.3, dated Apr. 1, 2016, 16 pages (9 pages of English Translation and 7 pages of Official Copy).
Notice of Allowance received for Japanese Patent Application No. 2013-011209, dated Jun. 13, 2016, 2 pages (Only Official Copy) (See Communication under 37 CFR § 1.98 (3)).
Intention to Grant received for European Patent Application No. 12177813.8, dated Jul. 6, 2016, 8 pages.
Notice of Allowance received for Chinese Patent Application No. 201210399033.9, dated Jun. 20, 2016, 3 pages (2 pages of English Translation and 1 page of Official Copy).

Office Action received for European Patent Application No. 08829660.3, dated Jul. 5, 2016, 5 pages.
Office Action received for Japanese Patent Application No. 2013-252338, dated Jun. 24, 2016, 4 pages (2 pages of English Translation and 2 pages of official copy).
Summons to oral proceedings received for European Application No. 09170697.8 dated Jul. 29, 2016, 9 pages.
Office Action Received for Australian Patent Application No. 2015215876, dated Aug. 1, 2016, 4 pages.
Final Office Action received for U.S. Appl. No. 12/242,851, dated Jul. 1, 2016, 90 pages.
Final Office Action received for U.S. Appl. No. 11/850,010, dated Apr. 18, 2016, 16 pages.
Final Office Action received for U.S. Appl. No. 14/142,640, dated Mar. 8, 2016, 35 pages.
Non-Final Office Action received for U.S. Appl. No. 14/710,125, dated Apr. 12, 2016, 12 pages.
Notice of Allowance received for U.S. Appl. No. 14/011,639, dated Feb. 16, 2016, 5 pages.
Office Action Received for European Patent Application No. 12189764.9, dated Mar. 1, 2016, 6 pages.
Office Action Received for Chinese Patent Application No. 201410251400.X, dated Jul. 4, 2016, 8 Pages (2 pages of English Translation and 6 pages of Official Copy).
Office Action received for Japanese Patent Application No. 2014-253365, dated Dec. 14, 2015, 6 pages (3 pages of English Translation and 3 pages Official Copy).
Shima et al., "Android Application-Development", From basics of development to mashup/hardware interaction, a road to "takumi" of Android application-development, Section I, difference from prior platforms, things which can be done with Android, SoftwareDesign, Japan, Gijutsu-Hyohron Co., Ltd., Issue vol. 287 (No. 221), Mar. 18, 2009, pp. 58-65. (See Communication under 37 CFR § 1.98(a) (3)).
Notice of Allowance received for Japanese Patent Application No. 2013-252338, dated Jun. 23, 2017, 3 pages (Official Copy only) (see attached 37 CFR § 1.98(a) (3)).
Office Action received for Chinese Patent Application No. 201410250688.9, dated Jun. 1, 2017, 12 pages (5 pages of English Translation and 7 pages of Official Copy).
Office Action received for Chinese Patent Application No. 201410251370.2, dated May 12, 2017, 8 pages (4 pages of English Translation and 4 pages of Official Copy).
Office Action Received for Chinese Patent Application No. 201410251400.X, dated May 26, 2017, 11 pages (3 pages of English Translation and 8 pages of Official Copy).
Non-Final Office Action received for U.S. Appl. No. 11/850,010, dated Jul. 24, 2017, 19 pages.
Office Action received for Japanese Patent Application No. 2016-091460, dated Jun. 26, 2017, 6 pages (3 pages of English Translation and 3 pages of Official Copy).
Office Action received for Australian Patent Application No. 2015215876, dated Jun. 28, 2017, 4 pages.
Microsoft, "Working Screenshot of Microsoft Office 2003", Aug 19, 2003,14 Pages.
Non-Final Office Action received for U.S. Appl. No. 11/850,005, dated Apr. 12, 2017, 11 pages.
Notice of Allowance received for Australian Patent Application No. 2015202076, dated Apr. 5, 2017, 3 pages.
Office Action received for Japanese Patent Application No. 2016-042767, dated Mar. 3, 2017, 10 pages (6 pages of English Translation and 4 pages of Official Copy).
"Launch 'Em Version 3.1", Retrieved from the Internet: URL:http://www.fladnag.net/downloads/telephone/palm/APPS/Inchem31/Documentation/LaunchEm.pdf, pp. 1-39.
"Nokia 7710", Online available at https://www.nokia.com/en_int/phones/sites/default/files/user-guides/Nokia_7710_UG_en.pdf, pp. 1-153.
"TH8000 Series Programmable Thermostats", Retrieved from the Internet:URL:https://ia802507.us.archive.org/1/items/generalmanual_000075065/generalmanual_000075065.pdf, 44 pages.
Advisory Action received for U.S. Appl. No. 12/217,029, dated Dec. 14, 2016, 3 pages.

(56) References Cited

OTHER PUBLICATIONS

Advisory Action received for U.S. Appl. No. 14/710,125, dated Mar. 14, 2017, 3 pages.
Huang, et al., "Effects of Visual Vibratory Perception by Cross-Modali Matching with Tactile Sensation", Retrieved from the Internet: <http://media.nuas.ac.jp/~robin/Research/ADC99.html>, pp. 1-7.
Kondo, Daisuke, "Windows XP Tablet PC Edition Quick Review Challenging by Microsoft", PC fan No. 9, No. 28, Japan, Mainichi Communication, pp. 12-17(Official Copy only) (see attached 37 CFR § 1.98(a) (3)).
"Macintosh Human Interface Guidelines", (chapter 1), pp. 3-14.
Nakata, Atsushi, "Tablet PC aiming at spread pen input by changing target user", Nikkei Windows for IT Professionals, Nikkei Business Publications, Inc. No. 69, pp. 14-16, (Official Copy only) (see attached 37 CFR § 1.98(a) (3)).
Nazley, et al., "LauncherX", Online Available at <http://www.palmx.org/mambo/index2php?option=com_content&task=view&id=65&1temid>, 3 pages.
Notice of Allowance received for U.S. Appl. No. 12/217,029, dated Jan. 17, 2017, 10 pages.
Notice of Allowance received for U.S. Appl. No. 12/242,851, dated Dec. 27, 2016, 20 pages.
Office Action received for Chinese Patent Application No. 200780041309.3, dated Feb. 8, 2017, 4 pages (1 page of English Translation and 3 pages of Official Copy).
Office Action received for Chinese Patent Application No. 201310724733.5, dated Dec. 30, 2016, 13 pages (3 pages of English Translation and 10 pages of Official Copy).
Office Action received for Chinese Patent Application No. 201410250648.4, dated Oct. 9, 2016, 6 pages (3 pages of English Translation and 3 pages of Official Copy).
Office Action received for Chinese Patent Application No. 201410251370.2 dated Sep. 5, 2016, 7 pages (3 pages of English Translation and 4 pages of Official Copy).
Office Action received for European Patent Application No. 09170697.8, dated Mar. 3, 2017, 8 pages
Office Action received for Japanese Patent Application No. 2013-252338, dated Jan. 27, 2017, 10 pages (5 pages of English Translation and 5 pages of Official Copy).
Shiota, Shinji, "Special Developer's Story", DOSN magazine, vol. 13, No. 10, pp. 156-161, (Official Copy only) (see attached 37 CFR § 1.98(a) (3)).
"SilverScreen Theme Library", Online Available at <https://web.archive.org/web/20061113121041/http://vvww.pocketsensei.com/ss_themes.htm>, 3 pages.
"SilverScreen User Guide", Online Available at <https://web.archive.org/web/20061113121032/http://www.pocketsensei.com/ss_guide.htm>, 12 pages.
Summons to Oral Proceedings received for European Patent Application No. 12194312.0, dated Dec. 8, 2016, 9 pages.
Summons to Oral Proceedings received for European Patent Application No. 12194315.3, dated Dec. 8, 2016, 9 pages.
Wright, Ben, "Palm OS PDA Application Mini-Reviews", Online Available at <http://library.indstate.edu/newsletter/feb04/palmmini.htm>, 11 pages.
Decision of Board of Appeal received for European Patent Application No. 09170697.8 dated Oct. 24, 2016, 24 pages.
Decision to Grant received for European Patent Application No. 12177813.8, dated Nov. 24, 2016, 3 pages.
Final Office Action received for U.S. Appl. No. 14/710,125, dated Oct. 27, 2016, 13 pages.
Office Action received for Chinese Patent Application No. 2014102506889, dated Sep. 28, 2016, 7 pages(3 pages of English Translation and 4 pages of Official Copy).
Office Action received for Japanese Patent Application No. 2014-253365, dated Oct. 17, 2016, 11 pages (5 pages of English Translation and 6 pages of Official Copy).

Office Action received for Japanese Patent Application No. 2016-091460, dated Nov. 4, 2016, 6 pages (3 pages of English Translation and 3 pages of Official Copy).
Intention to Grant received for European Patent Application No. 12194315.3, dated May 31, 2017, 8 pages.
Notice of Allowance received for Canadian Patent Application No. 2,890,778, dated Apr. 24, 2017, 1 page.
Office Action received for Australian Patent Application No. 2015215876, dated May 24, 2017, 4 pages.
Office Action received for Australian Patent Application No. 2016213886, dated May 18, 2017, 2 pages.
Office Action received for Chinese Patent Application No. 201310724733.5, dated Apr. 21, 2017, 18 pages (5 pages of English Translation and 13 pages of Official Copy).
Office Action received for Japanese Patent Application No. 2014-253365, dated Jul. 18, 2017, 9 pages (4 page of English Translation and 5 pages of Official Copy).
Takahashi, Masaaki, "Inside Macintosh, Mystery of File V, Mystery of Drag & Drop", NikkeiMAC, Nikkei Business Publications Inc., vol. 17, Aug. 15, 1994, pp. 212-217. {See Communication Under 37 CFR § 1.98(a) (3)}.
Decision to Grant received for European Patent Application No. 12194312.0, dated Feb. 1, 2018, 2 pages.
Examiner's Answer to Appeal Brief received for U.S. Appl. No. 14/710,125, dated Jan. 26, 2018, 6 pages.
Office Action received for Canadian Patent Application No. 2,890,778, dated May 19, 2016, 6 pages.
Office Action received for Chinese Patent Application No. 201310724733.5, dated Oct. 30, 2017, 14 pages (3 pages of English Translation and 11 pages of Official copy).
Office Action received for Chinese Patent Application No. 201410250688.9, dated Nov. 16, 2017, 6 pages (3 pages of English Translation and 3 pages of Official copy).
Extended European Search Report received for European Patent Application No. 17210062.0, dated Feb. 20, 2018, 12 pages.
Notice of Acceptance received for Australian Patent Application No. 2016213886, dated Feb. 9, 2018, 3 pages.
Office Action received for Australian Patent Application No. 2017201768, dated Feb. 28, 2018, 4 pages.
Turetta, Jonathan, "Steve Jobs iPhone 2007 Presentation (HD)", Retrieved from the Internet: URL:https://www.youtube.com/watch?v=vN4U5NrOdQ&feature=youtu.be, retrieved on Mar. 5, 2018, May 13, 2013, 2 pages.
Clifton, Marc, "Detect if Another Process is Running and Bring it to the Foreground", Online Available at: https://www.codeproject.com/Articles/2976/Detect-if-another-process-is-running-andbring-it, Sep. 30, 2002, 6 pages.
Cocoabuildercom, "Single Instance of a Cocoa Application", Available at: http://www.cocoabuilder.com/archive/cocoa/167892-single-instance-of-cocoa-application.html, Jul. 19, 2006, 4 pages.
Deanhill, 1971, "Run a Program or Switch to an Already Running Instance", Available at: URL:https://autohotkey.com/board/topic/7129-run-a-program-or-switch-to-an-already-runninginstance/, Feb. 1, 2006, 16 pages.
Decision to Grant Received for European Patent Application No. 12194315.3, dated Oct. 12, 2017, 2 pages.
Intention to Grant received for European Patent Application No. 12194312.0, dated Aug. 3, 2017, 8 pages.
Notice of Allowance received for Chinese Patent Application No. 200780041309.3, dated Jul. 31, 2017, 2 pages (Official Copy only) (see attached 37 CFR § 1.98(a) (3)).
Notice of Allowance received for U.S. Appl. No. 12/364,470, dated Nov. 24, 2017, 9 pages.
Office Action received for Australian Patent Application No. 2015215876, dated Jul. 26, 2017, 6 pages.
Office Action received for Chinese Patent Application No. 201410250648.4, dated Jun. 29, 2017, 13 pages (5 pages of English Translation and 8 pages of Official Copy).
Office Action received for European Patent Application No. 13174706.5, dated Oct. 16, 2017, 8 pages.
Summons to Attend Oral Proceedings received for European Application No. 09170697.8, mailed on Oct. 19, 2017, 12 pages.

(56) References Cited

OTHER PUBLICATIONS

Examiner's Pre-review report received for Japanese Patent Application No. 2014-253365, dated Dec. 12, 2017, 7 pages (3 page of English Translation and 4 pages of Official Copy).
Office Action received for Japanese Patent Application No, 2016-091460, dated Nov. 27, 2017, 7 pages (4 pages of English Translation and 3 pages of Official Copy).
Examiner's Answer for Appeal Brief received for U.S. Appl. No. 11/850,005, dated Apr. 10, 2018, 34 pages.
Office Action received for Chinese Patent Application No. 201410251370.2, dated Feb. 11, 2018, 14 pages (5 pages of English Translation and 9 pages of Official Copy).
Final Office Action received for U.S. Appl. No. 11/850,010, dated May 11, 2018, 24 pages.
Office Action received for Chinese Patent Application No, 201310724733,5, dated Apr. 9, 2018, 11 pages (2 pages of English Translation and 9 pages of Official copy).
Final Office Action received for U.S. Appl. No. 11/850,010, dated Aug. 14, 2018, 21 pages.
Minutes of the Oral Proceedings received for European Application No. 08798713.7, mailed on Aug. 6, 2018, 4 pages.
Notice of Allowance received for Chinese Patent Application No. 201410250648.4, dated Aug. 20, 2018, 2 pages (1 page of English Translation and 1 page of Official copy).
Notice of Allowance received for Chinese Patent Application No. 201410250688.9, dated May 21, 2018, 3 paages (1 page of English Translation and 2 pages of Official copy).
Notice of Allowance received for Chinese Patent Application No. 201410251370.2, dated Jul. 31, 2018, 2 pages (1 page of English Translation and 1 page of Official copy).
Office Action received for Canadian Patent Application No. 2,983,178, dated Aug. 16, 2018, 5 pages.
Office Action received for Australian Patent Application No. 2017202587, dated Jul. 4, 2018, 4 pages.
Jobs, Steve, "iPhone Introduction in 2007 (Complete)", available at <https://www.youtube.com/watch?v=9hUlxyE2Ns8>, Jan. 10, 2013, 3 pages.
Non-Final Office Action received for U.S. Appl. No. 15/153,617, dated Apr. 2, 2018, 12 pages.
Office action received for Chinese Patent Application No. 201410250648.4, dated Feb. 14, 2018, 6 pages (3 pages of English Translation and 3 pages of Official Copy).
Office Action received for Chinese Patent Application No. 201410251400.X, dated Feb. 8, 2018, 6 pages (3 pages of English Translation and 3 pages of Official Copy). r.
Summons to Attend Oral proceedings received for European Patent Application No. 08798713.7, mailed on Mar. 26, 2018, 11 pages.
Higuchi, Tadahiro, "Making a cool application with Visual Basic 6.0", 1st edition, Japan, AI Publishing, AI Mook 221, Jul. 16, 1999, pp. 1-23 (Official Copy only) (see attached 37 CFR § 1.98(a) (3)).
Minutes of Meeting received for European Patent Application No. 09170697.8, mailed on Jul. 10, 2018, 6 pages.
Notice of Allowance received for Chinese Patent Application No. 201410251400.X, dated Aug. 20, 2018, 3 pages (1 page of English Translation and 2 pages of Official Copy).
Office Action received for Chinese Patent Application No. 201310724733.5, dated Aug. 15, 2018, 2 pages (1 page of English Translation and 1 page of Official copy).
Office Action received for Japanese Patent Application No. 2017-204561, dated Aug. 6, 2018, 7 pages (4 pages of English Translation and 3 pages of Official Copy).
Office Action received for Japanese Patent Application No. 2017-223021, dated Jul. 30, 2018, 12 pages (6 pages of English Translation and 6 pages of Official Copy).
Office Action received for Japanese Patent Application No. 2014-253365, dated Aug. 31, 2018, 6 pages (3 pages of English Translation and 3 pages of Official Copy).
Decision to Refuse Application received for European Patent Application No. 09170697.8, dated Jul. 10, 2018, 31 pages.
Office Action received for Japanese Patent Application No. 2016-091460, dated Jun. 1, 2018, 3 pages (1 pages of English Translation and 2 pages of Official Copy).
Office Action received for Australian Patent Application No. 2018200272, dated Jan. 17, 2019, 2 pages.
Notice of Allowance received for Japanese Patent Application No. 2014-253365, dated Nov. 26, 2018, 3 pages (1 page of English Translation and 2 pages of Official Copy).
Notice of Allowance received for Chinese Patent Application No. 201310724733.5, dated Dec. 27, 2018, 2 pages (1 page of English translation and 1 page of Official Copy).
Office Action received for European Patent Application No. 08829660.3, dated Jan. 11, 2019, 7 pages.
Office Action Received for European Patent Application No. 12189764.9, dated Jan. 21, 2019, 7 pages.
Advisory Action received for U.S. Appl. No. 12/217,029, dated Dec. 12, 2014, 3 pages.
Advisory Action received for U.S. Appl. No. 15/493,672, dated Aug.12, 2019, 7 pages.
Applicant-Initiated Interview Summary received for U.S. Appl. No. 15/493,672, dated Jan. 31, 2020, 5 pages.
Corrected Notice of Allowance received for U.S. Appl. No. 14/142,640, dated Feb. 5, 2020, 4 pages.
Decision on Acceptance received for Australian Patent Application No. 2017202587, dated Oct. 8, 2019, 19 pages.
Decision on Appeal received for U.S. Appl. No. 14/142,640, dated Oct. 7, 2019, 9 pages.
Decision on Appeal received for U.S. Appl. No. 14/710,125, dated Mar. 11, 2019, 7 pages.
Decision to Grant received for European Patent Application No. 13174706.5, dated Jul. 11, 2019, 2 pages.
Decision to Grant received for European Patent Application No. 17210062.0, dated Oct. 1, 2020, 2 pages.
Decision to Refuse received for European Patent Application No. 19190231.1, dated Jan. 14, 2020, 2 pages.
Examiner's Answer to Appeal Brief received for U.S. Appl. No. 11/850,005, dated Jun. 5, 2020, 19 pages.
Final Office Action received for U.S. Appl. No. 11/850,005, dated Jun. 6, 2019, 14 pages.
Final Office Action received for U.S. Appl. No. 15/426,836, dated Mar. 29, 2019, 49 pages.
Final Office Action received for U.S. Appl. No. 15/493,672, dated May 31, 2019, 25 pages.
Intention to Grant received for European Patent Application No. 13174706.5, dated Apr. 30, 2019, 7 pages.
Intention to Grant received for European Patent Application No. 13174706.5, dated Nov. 22, 2018, 12 pages.
Intention to Grant received for European Patent Application No. 17210062.0, dated Jun. 23, 2020, 8 pages.
Minutes of Oral Proceedings received for European Patent Application No. 17210062.0, dated Jun. 17, 2020, 5 pages.
Non-Final Office Action received for U.S. Appl. No. 11/850,005, dated Dec. 31, 2018, 14 pages.
Non-Final Office Action received for U.S. Appl. No. 15/426,836, dated Oct. 18, 2018, 40 pages.
Non-Final Office Action received for U.S. Appl. No. 15/493,672, dated Dec. 12, 2019, 32 pages.
Non-Final Office Action received for U.S. Appl. No. 15/493,672, dated Nov. 6, 2018, 21 pages.
Notice of Acceptance received for Australian Patent Application No. 2017201768, dated Nov. 21, 2018, 3 pages.
Notice of Acceptance received for Australian Patent Application No. 2017202587, dated Nov. 6, 2019, 3 pages.
Notice of Acceptance received for Australian Patent Application No. 2018200272, dated Apr. 23, 2019, 3 pages.
Notice of Acceptance received for Australian Patent Application No. 2019200692, dated Apr. 7, 2020, 3 pages.
Notice of Allowance received for Japanese Patent Application No. 2016-091460, dated Oct. 9, 2018, 3 pages (1 page of English Translation and 2 pages of Official Copy).
Notice of Allowance received for Japanese Patent Application No. 2017-204561, dated Mar. 12, 2019, 4 pages (1 page of English Translation and 3 pages of Official Copy).

(56) References Cited

OTHER PUBLICATIONS

Notice of Allowance received for Japanese Patent Application No. 2018-201088, dated Sep. 18, 2020, 4 pages (1 page of English Translation and 3 pages of Official Copy).
Notice of Allowance received for U.S. Appl. No. 14/142,640, dated Dec. 11, 2019, 7 pages.
Notice of Allowance received for U.S. Appl. No. 14/710,125, dated Apr. 19, 2019, 8 pages.
Notice of Allowance received for U.S. Appl. No. 14/710,125, dated May 7, 2019, 9 pages.
Notice of Allowance received for U.S. Appl. No. 15/153,617, dated Nov. 23, 2018, 10 pages.
Notice of Allowance received for U.S. Appl. No. 15/426,836, dated Dec. 16, 2019, 16 pages.
Notice of Allowance received for U.S. Appl. No. 15/493,672, dated Apr. 14, 2020, 16 pages.
Notice of Allowance received for U.S. Appl. No. 11/850,010, dated Feb. 6, 2019, 25 pages.
Office Action received for Australian Patent Application No. 2017202587, dated Apr. 26, 2019, 4 pages.
Office Action received for Australian Patent Application No. 2017202587, dated Jul. 4, 2019, 4 pages.
Office Action received for Australian Patent Application No. 2019200692, dated Dec. 24, 2019, 2 pages.
Office Action received for Australian Patent Application No. 2019204835, dated Sep. 16, 2020, 6 pages.
Office Action received for Australian Patent Application No. 2019210673, dated Jul. 28, 2020, 4 pages.
Office Action received for Australian Patent Application No. 2019210673, dated Sep. 28, 2020, 2 pages.
Office Action received for Canadian Patent Application No. 2,983,178, dated Jul. 22, 2019, 6 pages.
Office Action received for Chinese Patent Application No. 201310724733.5, dated Aug. 28, 2018, 6 pages (3 pages of English Translation and 3 pages of Official copy).
Office Action received for European Patent Application No. 08829660.3, dated Jan. 3, 2020, 6 pages.
Office Action received for European Patent Application No. 17210062.0, dated Jan. 3, 2019, 6 pages.
Office Action received for Japanese Patent Application No. 2017-223021, dated Apr. 8, 2019, 7 pages (3 pages of English Translation and 4 pages of Official Copy).
Office Action received for Japanese Patent Application No. 2017-204561, dated Nov. 6, 2018, 8 pages (4 pages of English Translation and 4 pages of Official copy).
Office Action received for Japanese Patent Application No. 2017-223021, dated Sep. 11, 2020, 20 pages (10 pages of English Translation and 10 pages of Official Copy).
Office Action received for Japanese Patent Application No. 2017-223021, dated Sep. 24, 2019, 6 pages (3 pages of English Translation and 3 pages of Official Copy).
Office Action received for Japanese Patent Application No. 2018-201088, dated Oct. 11, 2019, 9 pages (5 pages of English Translation and 4 pages of Official Copy).
Office Action received for Japanese Patent Application No. 2019-024663, dated Apr. 27, 2020, 8 pages (4 pages of English Translation and 4 pages of Official Copy).
Office Action received for Korean Patent Application No. 10-2011-7026583, dated Oct. 25, 2013, 4 pages (1 page of English Translation and 3 pages of Official Copy).
Record of Oral Hearing received for U.S. Appl. No. 14/142,640, dated Nov. 20, 2019, 15 pages.
Result of Consultation received for European Patent Application No. 17210062.0, dated Apr. 20, 2020, 2 pages.
Summons to Attend Oral Proceedings received for European Patent Application No. 12189764.9, dated Mar. 12, 2020, 11 pages.
Summons to Attend Oral Proceedings received for European Patent Application No. 12189764.9, dated May 20, 2020, 11 pages.
Summons to Attend Oral Proceedings received for European Patent Application No. 17210062.0, dated Oct. 30, 2019, 7 pages.
Third Party Proceedings received for European Patent Application No. 17210062.0, dated Apr. 23, 2020, 6 pages.
Gsmarena Team,"HTC Touch review", Online Available at: <twww.gsmarena.com/htc_touch-review-189p3.php>, Nov. 28, 2007, 5 Pages.
Mobilissimo.RO,"HTC Touch—Touch FLO Demo", Online Available at: <<https://www.youtube.com/watch?v=YQ8TQ9Rr_7E>, Jun. 5, 2007, 1 page.
Minutes of the Oral Proceedings received for European Patent Application No. 12189764.9, dated Oct. 13, 2020, 6 pages.
Result of Consultation received for European Patent Application No. 08829660.3, dated Nov. 18, 2020, 5 pages.
Notice of Acceptance received for Australian Patent Application No. 2019210673, dated Oct. 17, 2020, 3 pages.
Notice of Allowance received for Japanese Patent Application No. 2017-223021, dated Dec. 18, 2020, 3 pages (1 page of English Translation and 2 pages of Official Copy).

* cited by examiner

EDITING INTERFACE

CROSS-REFERENCE TO RELATED APPLICATIONS

This application is a continuation of U.S. application Ser. No. 14/142,640, filed Dec. 27, 2013, which is a continuation of U.S. application Ser. No. 11/849,938, filed Sep. 4, 2007, which are incorporated herein by reference in their entirety.

TECHNICAL FIELD

The disclosed embodiments relate to graphical user interfaces.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable electronic devices (e.g., mobile phones) have resorted to adding more push buttons, overloading the functions of pushbuttons, or using complex menu systems to allow a user to access, store and manipulate functions or data. These conventional user interfaces often result in complicated key sequences and menu hierarchies that must be memorized by the user.

Many conventional user interfaces, such as those that include physical pushbuttons, are also inflexible. This is unfortunate because the inflexibility may prevent a user interface from being configured and/or adapted by either an application running on the portable device or by users. When coupled with the time consuming requirement to memorize multiple key sequences and/or menu hierarchies, such inflexibility is frustrating to many users.

Some conventional user interfaces can be configured by users, thereby allowing at least partial customization. Unfortunately, the process of modifying such conventional user interfaces is often as cumbersome and complicated as the use of the conventional user interface itself. In particular, the required behaviors during configuration of such conventional user interfaces are often counter intuitive and the corresponding indicators guiding user actions are often difficult to understand. These challenges are often a source of additional frustration for users.

SUMMARY

A portable electronic device displays icons (e.g., graphical objects) in one or more regions of a user interface of a touch-sensitive display, and detects user input specifying an exchange of positions of icons in the user interface. In some aspects, the respective positions of two icons in a user interface can be selected to exchange positions in the one or more regions of the user interface, and one or both icons can change their visual appearance to indicate their selection status.

In some implementations, a method includes: displaying a first icon in a first position in a touch-sensitive display; displaying a second icon in a second position of the touch-sensitive display; receiving first touch input specifying selection of the first icon; responsive to the first touch input, modifying the visual appearance of the first icon; receiving second touch input indicating movement of the first icon to within proximity of the second icon; and responsive to the second touch input, modifying the visual appearance of the second icon.

In some implementations, a method includes: displaying an icon in a first position of a touch-sensitive display; receiving first touch input specifying selection of the icon; responsive to the first touch input, modifying the visual appearance of the icon; receiving second touch input indicating movement of the icon to within proximity of a second position in the user interface; and responsive to the second touch input, modifying the visual appearance of the second position.

In some implementations, a method includes: displaying a first icon in a first page of a touch-sensitive display; receiving first touch input specifying selection of the first icon; responsive to the first touch input, modifying the visual appearance of the first icon; receiving second touch input indicating movement of the first icon to within proximity of an edge of the touch sensitive display; responsive to the second touch input, displaying a second page of the touch-sensitive display, the second page including a second icon; receiving third touch input indicating movement of the first icon to within proximity of the second icon; and responsive to the third touch input, modifying the visual appearance of the second icon.

DESCRIPTION OF EMBODIMENTS

Figure 1:
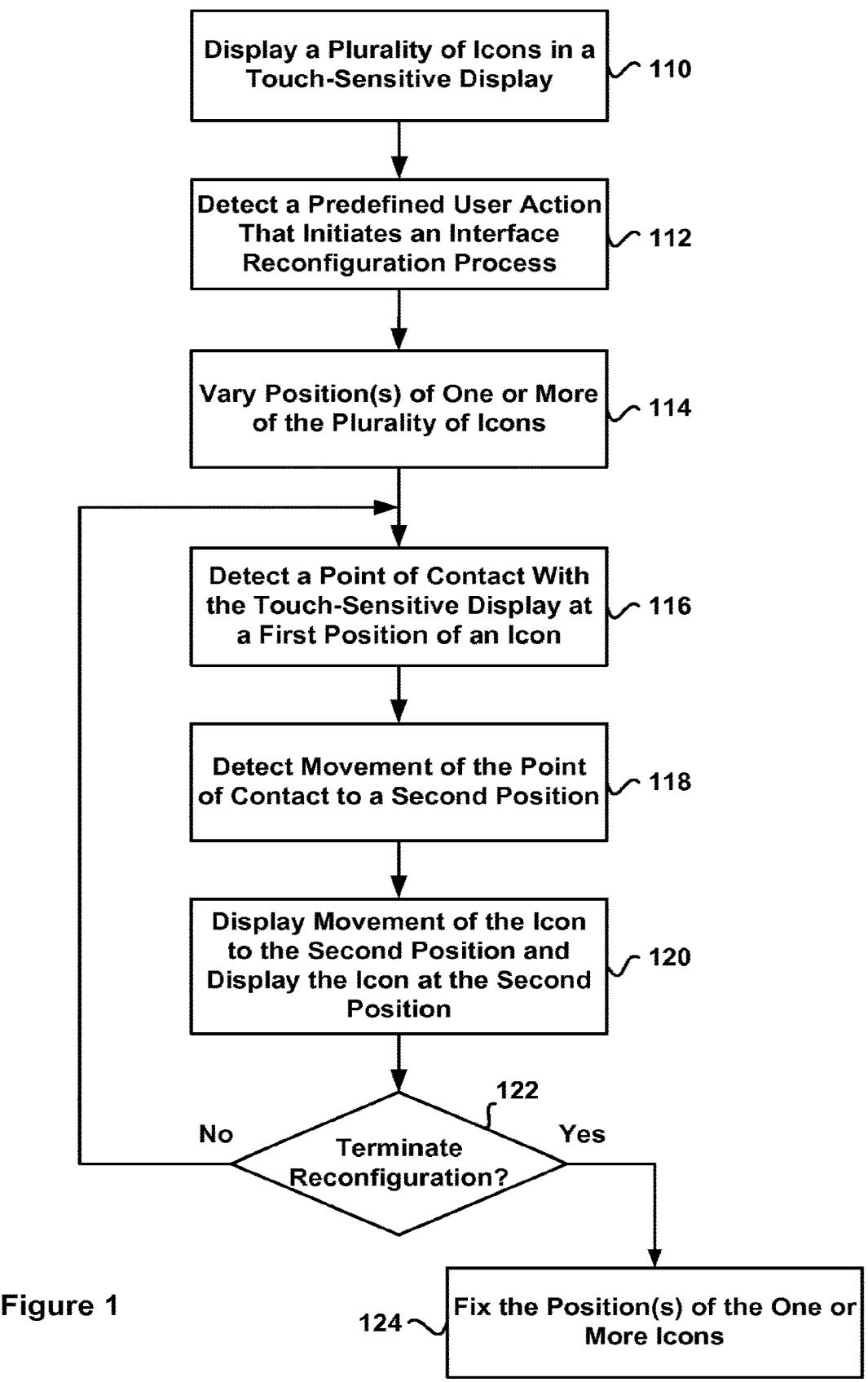
FIG. 1 is a flow diagram of one embodiment of a position adjustment process for a portable electronic device.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Overview of the Interface Reconfiguration Mode

Attention is directed towards embodiments of portable electronic devices, including portable communications devices, that have graphical user interfaces (GUIs). The portable devices include an interface reconfiguration mode. In response to a user initiating the interface reconfiguration mode, positions of one or more icons displayed on the portable device may be varied about respective average positions. The varying of the positions of the one or more icons may include animating the one or more icons to simulate floating of the one or more icons on a surface corresponding to a surface of a display in the portable device. The display may be a touch-sensitive display, which responds to physical contact by a stylus or one or more fingers at one or more contact points. While the following embodiments may be equally applied to other types of displays, a touch-sensitive display is used as an illustrative example.

The varying of the positions of the one or more icons may intuitively indicate to the user that the positions of the one or more icons may be reconfigured by the user. The user may modify, adapt and/or reconfigure the positions of the one or more icons. In embodiments where the portable device includes a touch-sensitive display, the user may make contact with the touch-sensitive display proximate to a respective icon at a first position. Upon making contact with the touch-sensitive display, the respective icon may cease varying its position. The user may drag the respective icon to a second position. Upon breaking contact with the touch-sensitive display, the respective icon may resume varying its position. In some embodiments, the display may include two regions. During the interface reconfiguration mode, positions of one or more icons displayed in the first region may be varied while positions of one or more icons displayed in the second region may be stationary.

The user may similarly modify, adapt and/or reconfigure the positions of additional icons during the interface reconfiguration mode. When the user has completed these changes (at least for the time being), he or she may terminate reconfiguration mode. In response to this user action, the portable device may return to a normal mode of operation and the varying of the displayed positions of the one or more icons will cease.

The user may initiate or terminate the interface reconfiguration process by selecting one or more appropriate physical buttons on the portable device, by a gesture (such as making contact and swiping one or more fingers across the touch-sensitive display and holding for more than a predefined time period) and/or by selecting one or more soft buttons (such as one or more icons that are displayed on the touch-sensitive display). As used herein, a gesture is a motion of the object/appendage making contact with the touch screen display surface. In some embodiments, the interface reconfiguration process terminates a pre-defined time after the interface reconfiguration process is initiated, i.e., there is a time out.

The one or more icons displayed on the portable device may be graphical objects. In some embodiments, the one or more icons may be widgets, which are combinations of states and procedures that constitute on-screen representations of controls that may be manipulated by the user, such as bars, buttons and text boxes. In an exemplary embodiment, the one or more icons correspond to application programs (email, browser, address book, etc.) that may be selected by the user by contacting the touch-sensitive display proximate to an icon of interest.

FIG. 1 is a flow diagram of one embodiment of a position adjustment process 100 for a portable electronic device. While the position adjustment process 100 described below includes a number of operations that appear to occur in a specific order, it should be apparent that the process 100 can include more or fewer operations, which can be executed serially or in parallel (e.g., using parallel processors or a multi-threading environment), an order of two or more operations may be changed and/or two or more operations may be combined into a single operation.

In the position adjustment process 100, a plurality of icons are displayed in a GUI in a touch-sensitive display (110). A first predefined user action that initiates an interface reconfiguration process is detected (112). Exemplary predefined user actions include selecting a physical button on the portable device, making a predefined gesture on the touch screen display surface, or selecting a soft button. Position(s) of one or more of the plurality of displayed icons are varied (114). A point of contact with the touch-sensitive display at a first position of a respective icon is detected (116). Movement of the point of contact to a second position is detected (118). Movement of the respective icon to the second position is displayed and the respective icon is displayed at the second position (120).

If a second predefined user action that terminates the interface reconfiguration process is detected (122—yes), the position(s) of the one or more icons is fixed (124). Exemplary predefined user actions include selecting or deselecting a physical button on the portable device, making another predefined gesture on the touch screen display surface, or selecting or deselecting a soft button. The fixed position(s) may correspond to a respective average position(s) for the one or more icons. If a second pre-defined user action that terminates the interface reconfiguration process is not detected (122—no), the process may continue when a point of contact proximate to the same or another icon is detected (116).

Figure 2A:
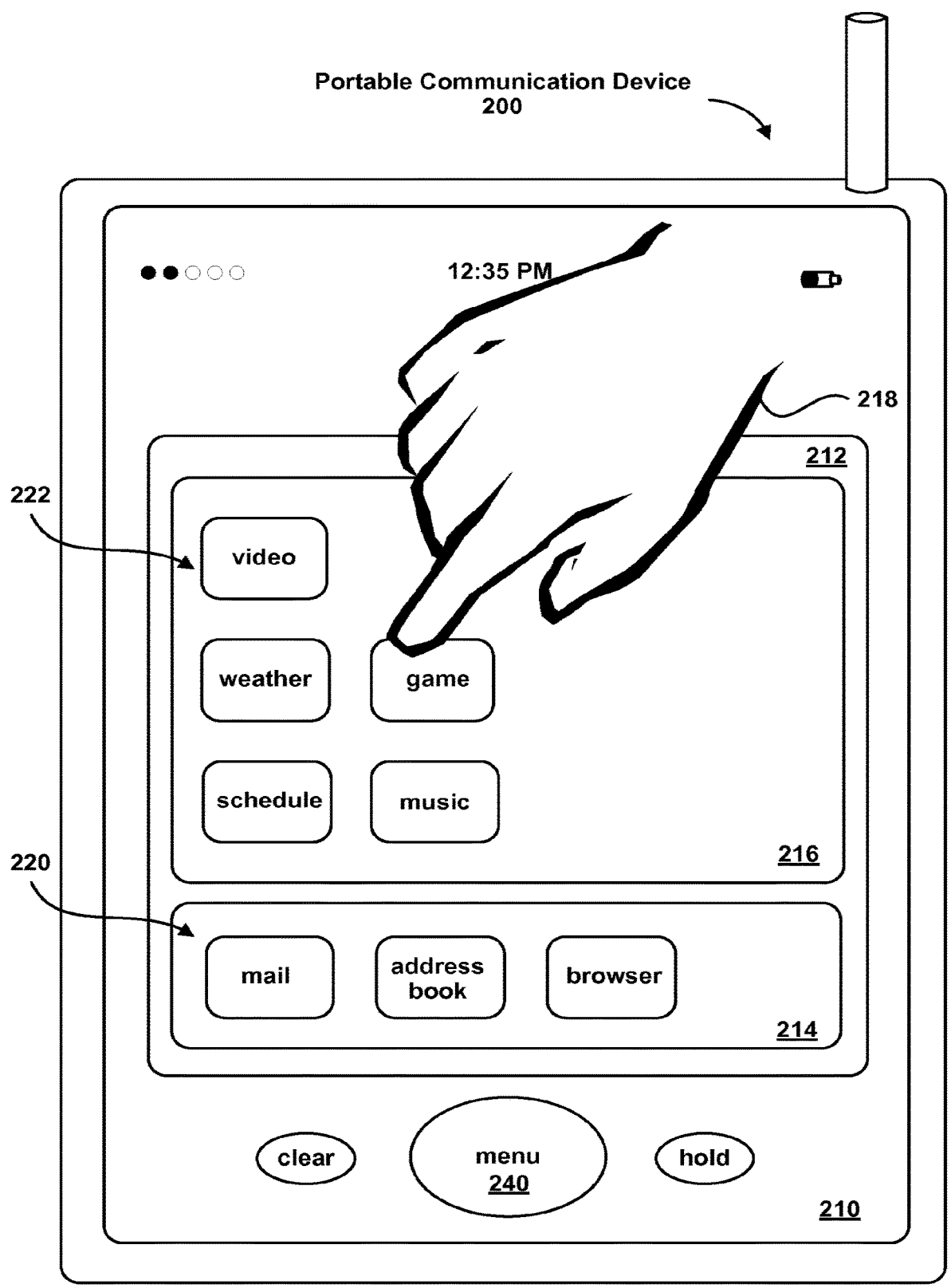
FIG. 2A is an illustration of one embodiment of a portable electronic device responsive to touch input for adjustment of the position of one or more icons.

FIG. 2A is an illustration of one embodiment of a portable electronic device 200 responsive to touch input for adjustment of the position of one or more icons. The portable electronic device 200 includes a touch-sensitive display with a GUI 210. The display surface is transparent to allow various graphical objects to be displayed to the user (e.g., widgets). In some embodiments, the GUI 210 is divided into multiple sections or windows. For example, a region 212 of GUI 210 may include a tray 216 for holding icons or graphical objects 222 representing functions that are frequently used by the user (e.g., video, weather, schedule, game, music, etc.) and a tray 214 for holding icons or graphical objects 220 representing functions that are used less frequently by the user (e.g., mail, address book, browser, etc.). The GUI 210 may also include graphical objects corresponding to high-level functions of the portable electronic device 200. For example, various objects and/or images may be presented and changed in GUI 210 by pressing a menu button 240. In embodiments that include a mobile phone, dedicated graphical objects can be presented in GUI 210 representing traditional voice and data service operations (e.g., hold, clear, etc.).

The user may interact with the portable communications device 200 by making contact with the display surface with GUI 210 using a stylus, a finger 218 (not drawn to scale in FIG. 2) or more than one finger. For example, the user may make contact with the display surface at a position of one of the icons 222 (direct contact), thereby activating the function or application program corresponding to that icon. In some embodiments, the icon 222 is activated when the user makes contact at the position of the icon and then breaks contact (for example, a tapping gesture). In some embodiments, the contact with the display surface used to activate the icon may not be at the position of the icon 222. Instead, contact may be proximate to the icon 222 (indirect contact). The latter technique is similar to "hot spots" used with Web pages and other computer user interfaces.

Figure 2B:
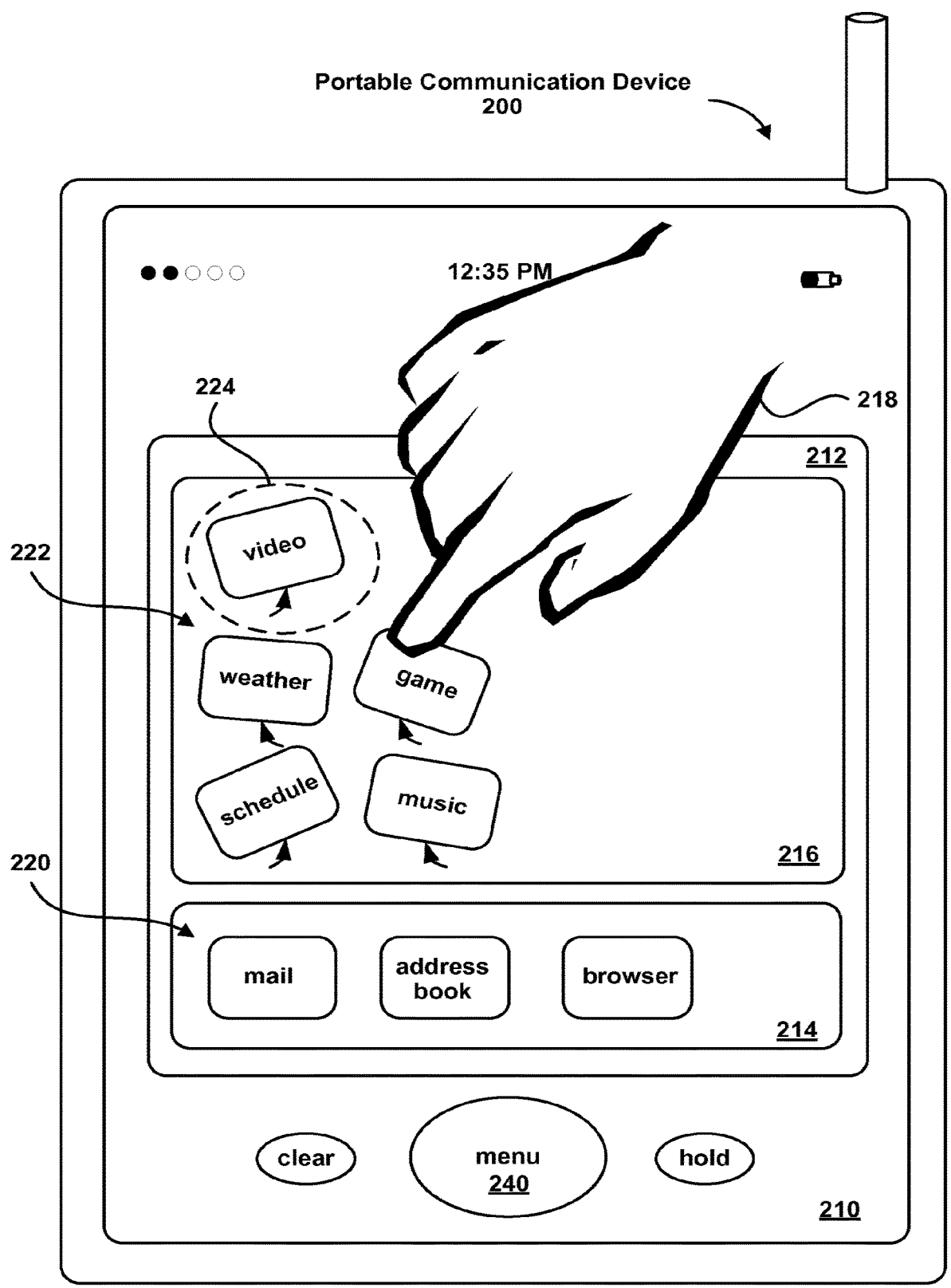
FIG. 2B is an illustration of one embodiment of a portable electronic device responsive to touch input for adjustment of the position of one or more icons.
Figure 2C:
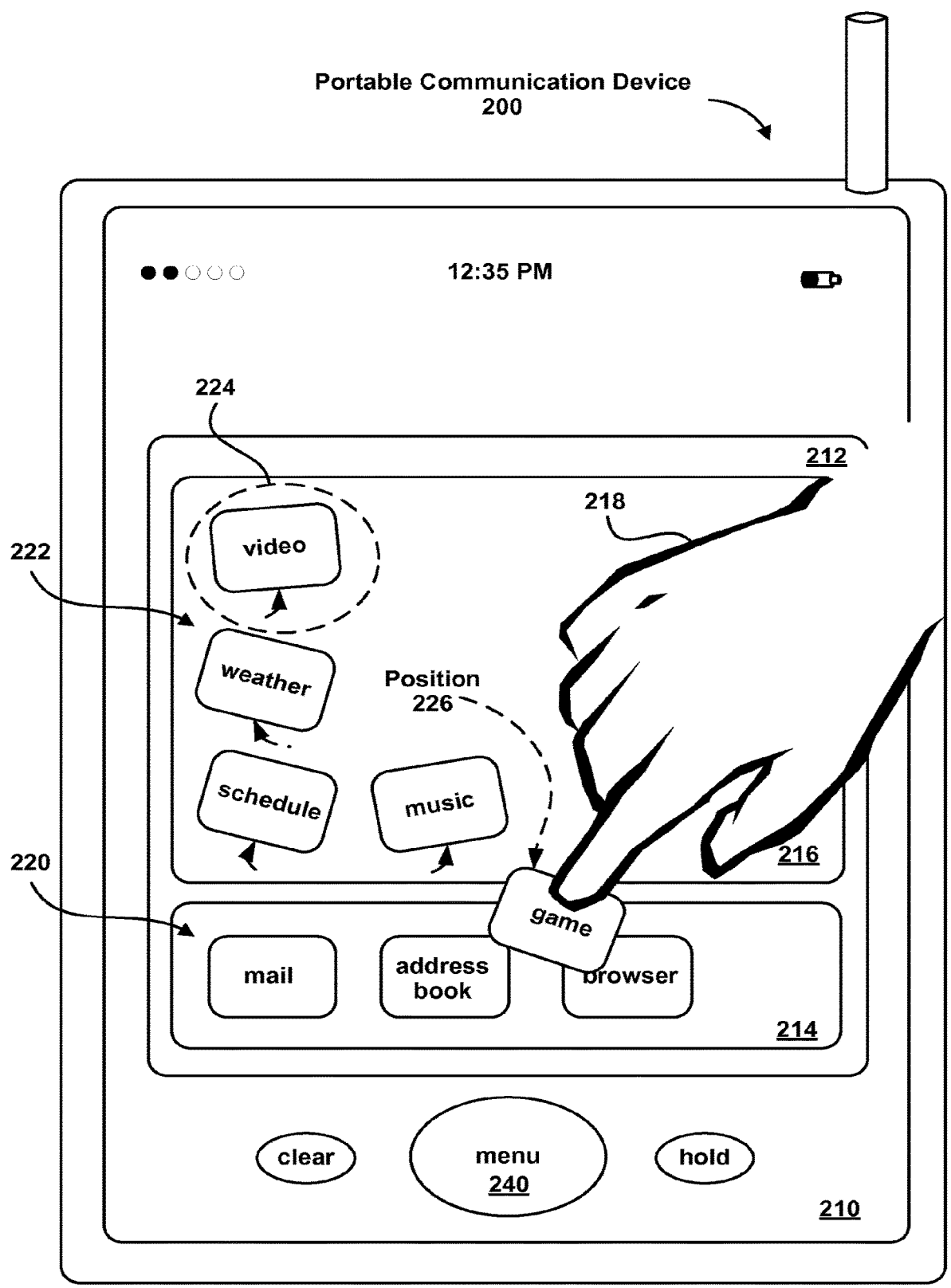
FIG. 2C is an illustration of one embodiment of a portable electronic device responsive to touch input for adjustment of the position of one or more icons.
Figure 2D:
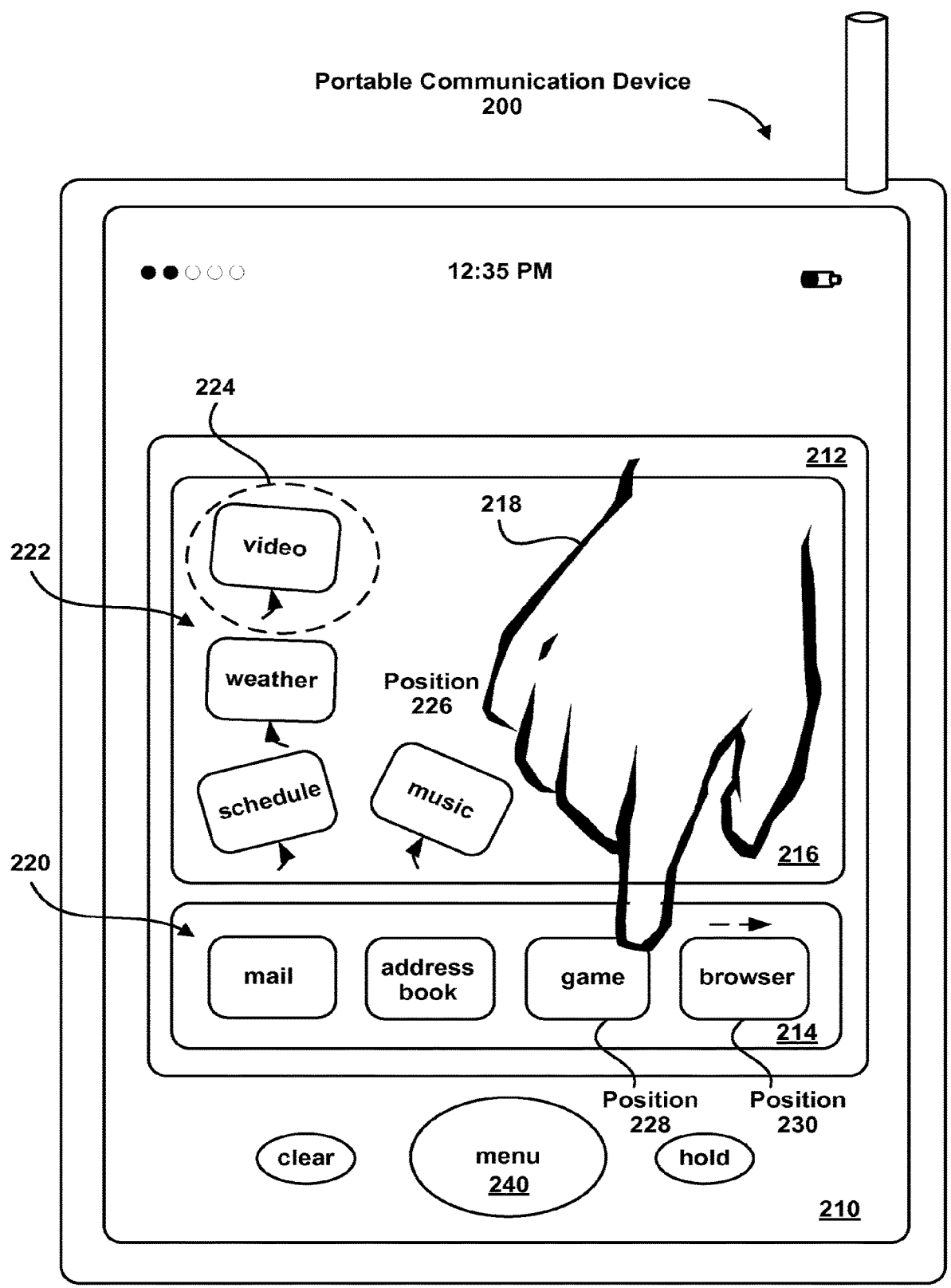
FIG. 2D is an illustration of one embodiment of a portable electronic device responsive to touch input for adjustment of the position of one or more icons.

FIGS. 2B-D show the portable electronic device 200 during the interface reconfiguration mode. After the interface reconfiguration mode is initiated, the display of one or more of the icons 222 in the tray 216 is modified from the previous stationary positions to time-varying positions. As noted previously, the display may include animating one or more of the icons 222 to simulate floating of one or more of the icons 222 on a surface corresponding to the display surface. For example, the animated varying of the positions of one or more of the icons 222 during the interface reconfiguration mode may resemble that of a hockey puck in an air hockey game. The displayed position(s) of a respective icon in the icons 222 may be varied in a region 224 centered on the average position of the respective icon.

While FIG. 2B-2D illustrates movement of one or more of the icons 222 in the tray 216, in other embodiments positions of one or more of the icons 220 in another region of GUI 210, such as tray 214, may be varied separately or in addition to those of one or more of the icons 222 in tray 216.

The time-varying position(s) of one or more of the icons 222 intuitively indicate to the user that the positions of one or more of the icons 222 may be modified. This is illustrated in FIGS. 2C-D, which show the portable electronic device 200 during the interface reconfiguration mode. The user makes contact, either direct or indirect, with one of the icons that is moving at a position 226 and moves the point of contact across the display surface with GUI 210. The contact and the motion are detected by the portable electronic device 200. As a consequence, the displayed icon, in this example corresponding to a game, is moved accordingly.

As shown in FIG. 2D, the user moves the game icon to position 228 and breaks contact with the display surface. The game icon is now displayed at the position 228. While the displayed position of the game icon is shown as stationary in FIG. 2D, in some embodiments the position of the game icon may be varied once the user breaks contact with the display surface. In some embodiments, only icons displayed in one or more subsections of the GUI 210 are displayed with a varying position during the interface reconfiguration mode. Thus, if the game icon had been dragged to another position in the tray 222, it may be displayed with a varying position after the user breaks contact with the display.

FIG. 2D also illustrates the optional displacement of the browser icon to position 230. The browser icon was displaced from its initial position 228 to its new position 230 due to at least partial overlap with the game icon, i.e., when the portable electronic device 200 determined that the user positioned the game icon over the browser icon, the displayed position of the browser icon was changed.

In other embodiments, an icon may be evicted or removed from the tray 214 when an additional icon, such as the browser icon, is added to the tray 214. For example, the tray 214 may be configured to accommodate a finite number of icons, such as 4 icons. If an additional icon is added to the tray 214, a nearest icon to the additional icon or an icon that at least partially overlaps the additional icon may be evicted or removed from the tray 214.

Figure 2E:
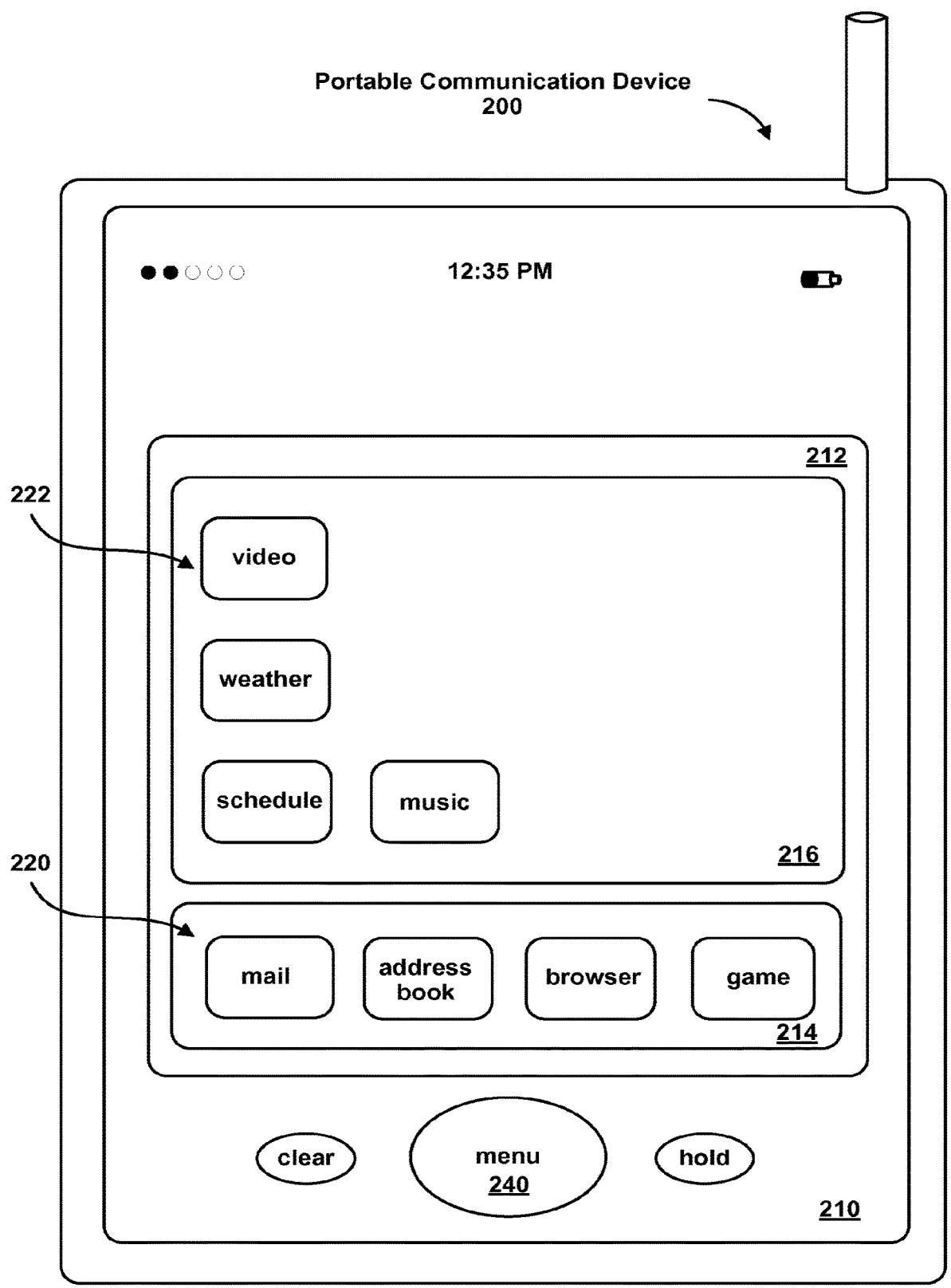
FIG. 2E is an illustration of one embodiment of a portable electronic device responsive to touch input for adjustment of the position of one or more icons.

FIG. 2E illustrates the portable electronic device 200 after the interface reconfiguration mode has been terminated or has terminated (due to a time out). The icons in GUI 210 have stationary positions. The game icon and the browser icon are displayed in their new positions in the tray 214.

The animated effects during the interface reconfiguration mode, such as the varying position(s) of one or more of the icons 222, may be in accordance with corresponding equations of motion for one or more of the icons in a plane substantially coincident with the display surface with GUI 210. The equations of motion may have a coefficient of friction less than a threshold allowing the simulation and/or animation of floating or sliding of one or more of the icons. The equation of motion for the respective icon may have a non-zero initial velocity, a non-zero angular velocity, and/or a restoring force about the respective average position of the respective icon such that the position of the respective icon oscillates in the region 224 (FIG. 2D) substantially centered on the respective average position of the respective icon.

Figure 3A:
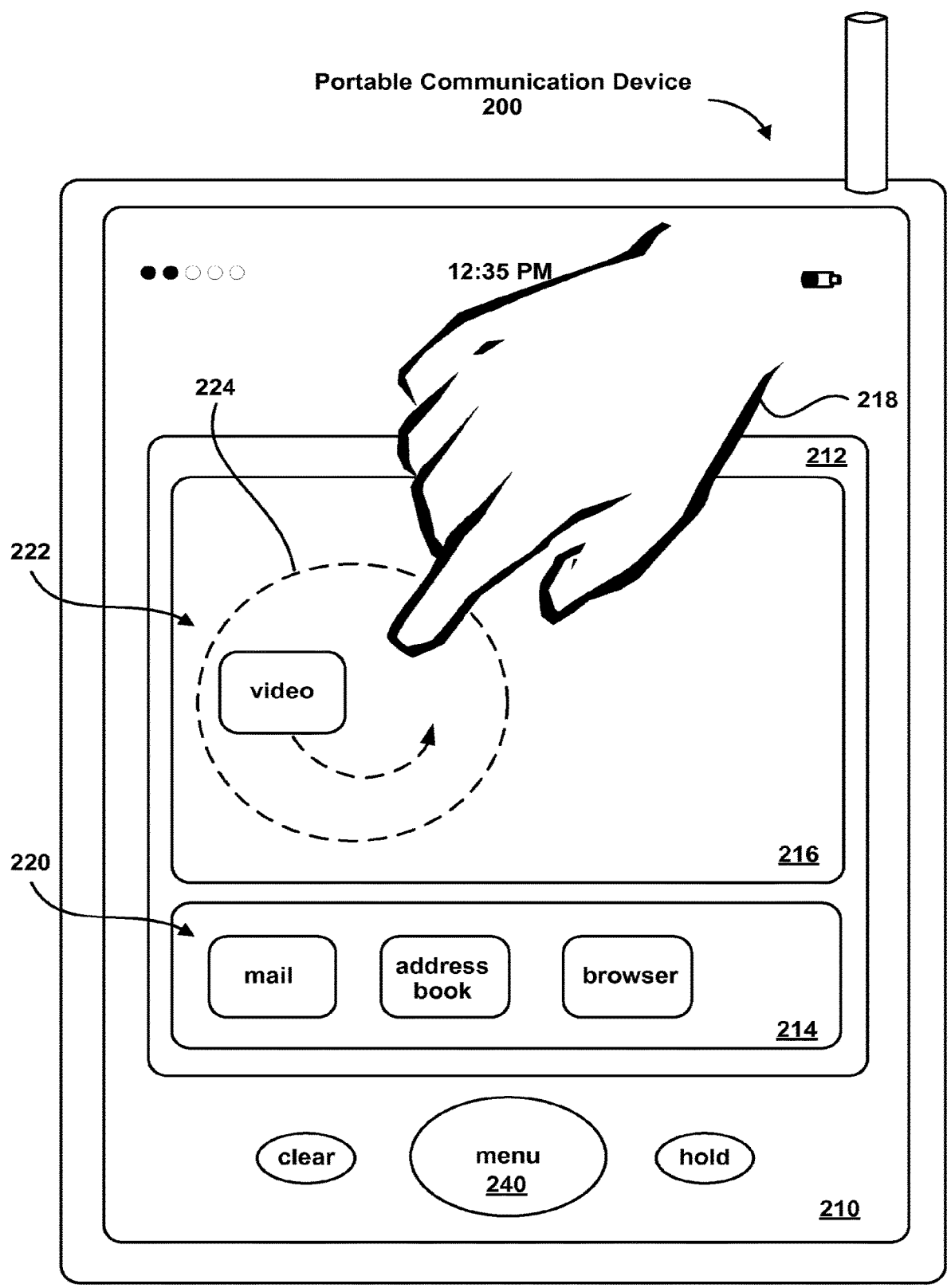
FIG. 3A is an illustration of one embodiment of a portable electronic device responsive to touch input for adjustment of the position of one or more icons.
Figure 3B:
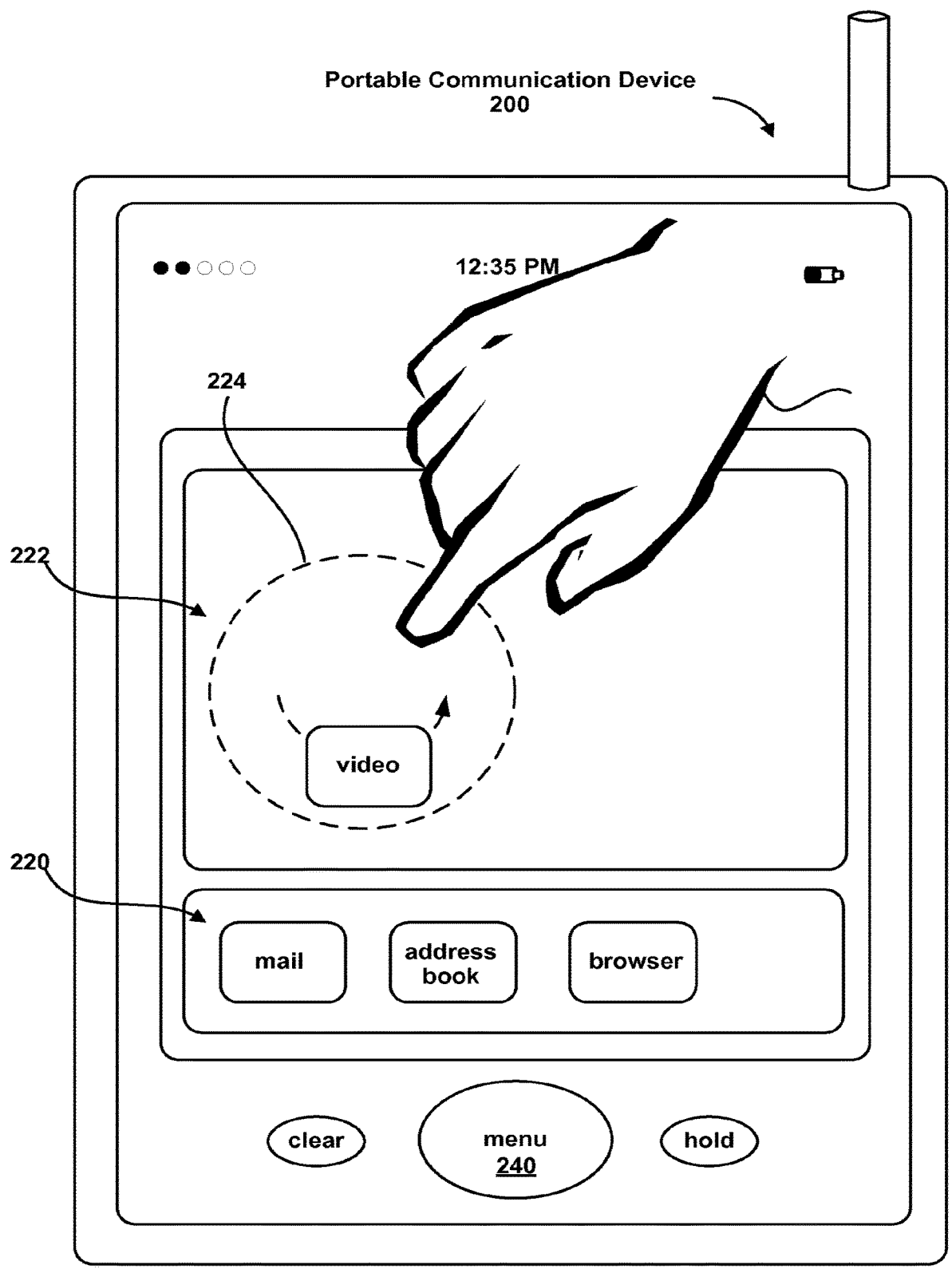
FIG. 3B is an illustration of one embodiment of a portable electronic device responsive to touch input for adjustment of the position of one or more icons.

In some embodiments, the position of the respective icon may be varied during the interface reconfiguration mode in such a way that the respective icon rotates about the respective average position of the respective icon while maintaining a fixed orientation with respect to the GUI 210 and the portable electronic device 200. This is illustrated in FIGS. 3A and 3B, which show the portable electronic device 200 during the interface reconfiguration mode. In this example, the position of the video icon 222 in tray 216 is varied in such a way that it maintains a fixed orientation in region 224. This may make it easier for the user to determine the function of the respective icon during the interface reconfiguration mode.

Portable Electronic Device Architecture

Figure 4:
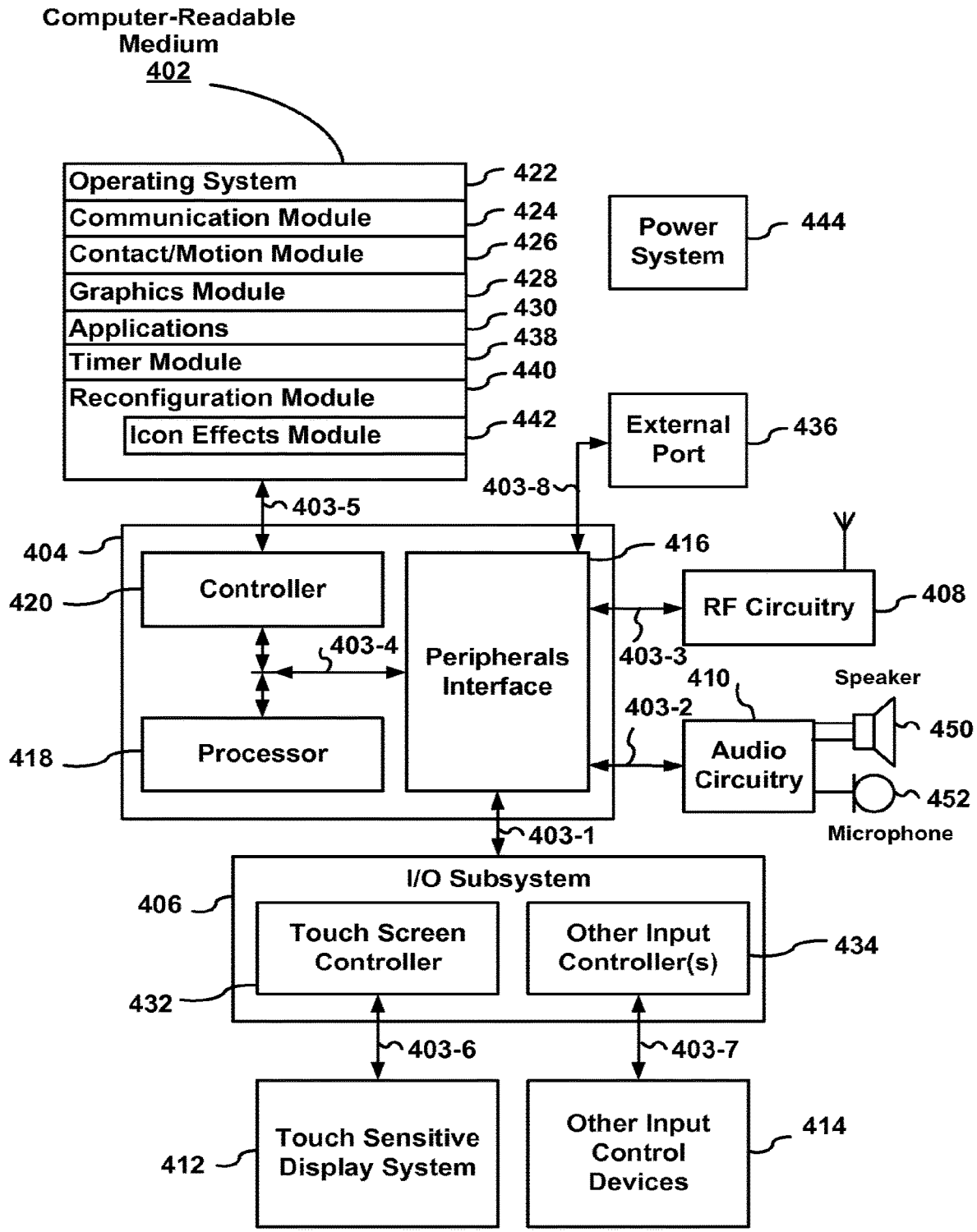
FIG. 4 is a block diagram of one embodiment of a portable electronic device.

Attention is now directed towards embodiments of the portable electronic device architecture. FIG. 4 is a block diagram of one embodiment of portable electronic device. A portable electronic device 400 generally includes one or more computer-readable mediums 402, a processing system 404, an Input/Output (I/O) subsystem 406, radio frequency (RF) circuitry 408 and audio circuitry 410. These components may be coupled by one or more communication buses or signal lines 403. The device 400 can be any portable electronic device, including but not limited to a handheld computer, a tablet computer, a mobile phone, a media player, personal digital assistant (PDA) and the like, including a combination of two or more of these items.

It should be apparent that the architecture shown in FIG. 4 is only one example of an architecture for the portable electronic device 400, and that the device 400 could have more or fewer components than shown, or a different configuration of components. The various components shown in FIG. 4 can be implemented in hardware, software, or a combination of both hardware and software, including one or more signal processing and/or application specific integrated circuits. The RF circuitry 408 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 408 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11g and/or IEEE 802.11n), Bluetooth, Wi-MAX, voice over Internet Protocol (VoIP), a protocol for email, instant messaging, and/or a short message service (SMS), or any other suitable communication protocol, including communication protocols not yet developed as of the filing date of this document.

The RF circuitry 408 and the audio circuitry 410 are coupled to the processing system 404 via the peripherals interface 416. The interface 416 includes various known components for establishing and maintaining communication between peripherals and the processing system 404. The audio circuitry 410 is coupled to an audio speaker 450 and a microphone 452 and includes known circuitry for processing voice signals received from interface 416 to enable a user to communicate in real-time with other users. In some embodiments, the audio circuitry 410 includes a headphone jack (not shown). Voice and data information received by the RF circuitry 408 and the audio circuitry 410 (e.g., in speech recognition or voice command applications) is sent to one or more processors 418 via the peripherals interface 416. The one or more processors 418 are configurable to process various data formats for one or more applications programs 430 stored on the medium 402.

Note that the term "data" includes but is not limited to text, graphics, Web pages, JAVA applets, widgets, emails, instant messages, voice, digital images or video, widgets, MP3s, etc., which can be used by one or more applications programs 430 stored on the medium 402 (e.g., Web browser, email, etc.). In some embodiments, the device 400 is capable of uploading and downloading various data from the Internet over a wireless network or an external port 436, such as files, songs, digital images, videos, emails, widgets, instant messages and the like.

The peripherals interface 416 couples the input and output peripherals of the device to the processor 418 and the computer-readable medium 402. The one or more processors 418 communicate with the one or more computer-readable mediums 402 via a controller 420. The computer-readable medium 402 can be any device or medium that can store code and/or data for use by the one or more processors 418. The medium 402 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 402 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

The one or more processors 418 run various software components stored in the medium 402 to perform various functions for the device 400. In some embodiments, the software components include an operating system 422, a communication module (or set of instructions) 424, a contact/motion module (or set of instructions) 426, a graphics module (or set of instructions) 428, one or more applications (or set of instructions) 430, a timer module (or set of instructions) 438 and a reconfiguration module (or set of instructions) 440.

The operating system 422 (e.g., Darwin, RTXC, LINUX, UNIX, OS X, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The communication module 424 facilitates communication with other devices over one or more external ports 436 or via RF circuitry 408 and includes various software components for handling data received from the RF circuitry 408 and/or the external port 436. The external port 436 (e.g., USB, FireWire™, etc.) is adapted for coupling directly to other devices or indirectly over a network (e.g., the Internet, wireless LAN, etc.).

The graphics module 428 includes various known software components for rendering, animating and displaying graphical objects on a display surface of a touch-sensitive display system 412. Note that the term "graphical object" includes any object that can be displayed to a user, including without limitation text, web pages, icons, digital images, animations and the like.

The one or more applications 430 can include any applications installed on the device 400, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 400 may include the functionality of an MP3 player, such as an iPod (trademark of Apple Computer, Inc.). The device 400 may, therefore, include a 36-pin connector that is compatible with the iPod. In some embodiments, the device 400 may include one or more optional optical sensors (not shown), such as CMOS or CCD image sensors, for use in imaging applications.

The contact/motion module 426 includes various software components for performing various tasks associated with the touch-sensitive display system 412, as previously described with respect to the embodiments in FIGS. 1-3.

The timer module 438 is a software timer used with the interface reconfiguration process 100 (FIG. 1). The timer module 438 can also be implemented in hardware.

The reconfiguration module 440 may include an icon effects module (or a set of instructions) 442. The icon effects module 442 may include animation for the icons during the interface reconfiguration mode. In some embodiments, the icon effects module 442 may be included in the graphics module 428.

The I/O subsystem 406 is coupled to the touch-sensitive display system 412 and one or more other physical control devices 414 (e.g., pushbuttons, switches, dials, LEDs, etc.) for controlling or performing various functions, such as power control, speaker volume control, ring tone loudness, keyboard input, scrolling, hold, menu, screen lock, clearing and ending communications and the like. The touch-sensitive display 412 communicates with the processing system 404 via the touch sensitive screen controller 432, which includes various components for processing user input (e.g., scanning hardware). The one or more other input controllers 434 receives/sends electrical signals from/to the other input or control devices 414. The other input/control devices 414 may include physical buttons (e.g., push buttons, rocker buttons, etc.), dials, slider switches, sticks, and so forth.

The touch-sensitive display 412 displays visual output to the user in a GUI. The visual output may include text, graphics, video, and any combination thereof. Some or all of the visual output may correspond to user-interface objects. The touch-sensitive display 412 may also accept input from the user based on haptic and/or tactile contact. The touch-sensitive display 412 forms a touch-sensitive surface that accepts user input. The touch-sensitive display 412 and the touch screen controller 432 (along with any associated modules and/or sets of instructions in the medium 402) detects contact (and any movement of release of the contact) on the touch-sensitive display 412 and converts the detected contact into interaction with user-interface objects, such as one or more soft keys, that are displayed on the touch screen when the contact occurs. In an exemplary embodiment, a point of contact between the touch-sensitive display 412 and the user corresponds to one or more digits of the user. The touch-sensitive display 412 may use LCD (liquid crystal display) technology, or LPD (light emitting polymer display) technology, although other display technologies may be used in other embodiments. The touch-sensitive display 412 and touch screen controller 432 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the touch-sensitive display 412.

The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 126 displays visual output from the portable device, whereas touch sensitive tablets do not provide visual output. The touch-sensitive display 412 may have a resolution in excess of 100 dpi. In an exemplary embodiment, the touch-sensitive display 412 may have a resolution of approximately 168 dpi. The user may make contact with the touch-sensitive display 412 using any suitable object or appendage, such as a stylus, pen, finger, and so forth.

In some embodiments, in addition to the touch screen, the device 400 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch-sensitive display 412 or an extension of the touch-sensitive surface formed by the touch-sensitive display 412.

The device 400 also includes a power system 444 for powering the various hardware components. The power system 444 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 416, the one or more processors 418, and the memory controller 420 may be implemented on a single chip, such as the processing system 404. In some other embodiments, they may be implemented on separate chips.

Repositioning Icons

Figure 5:
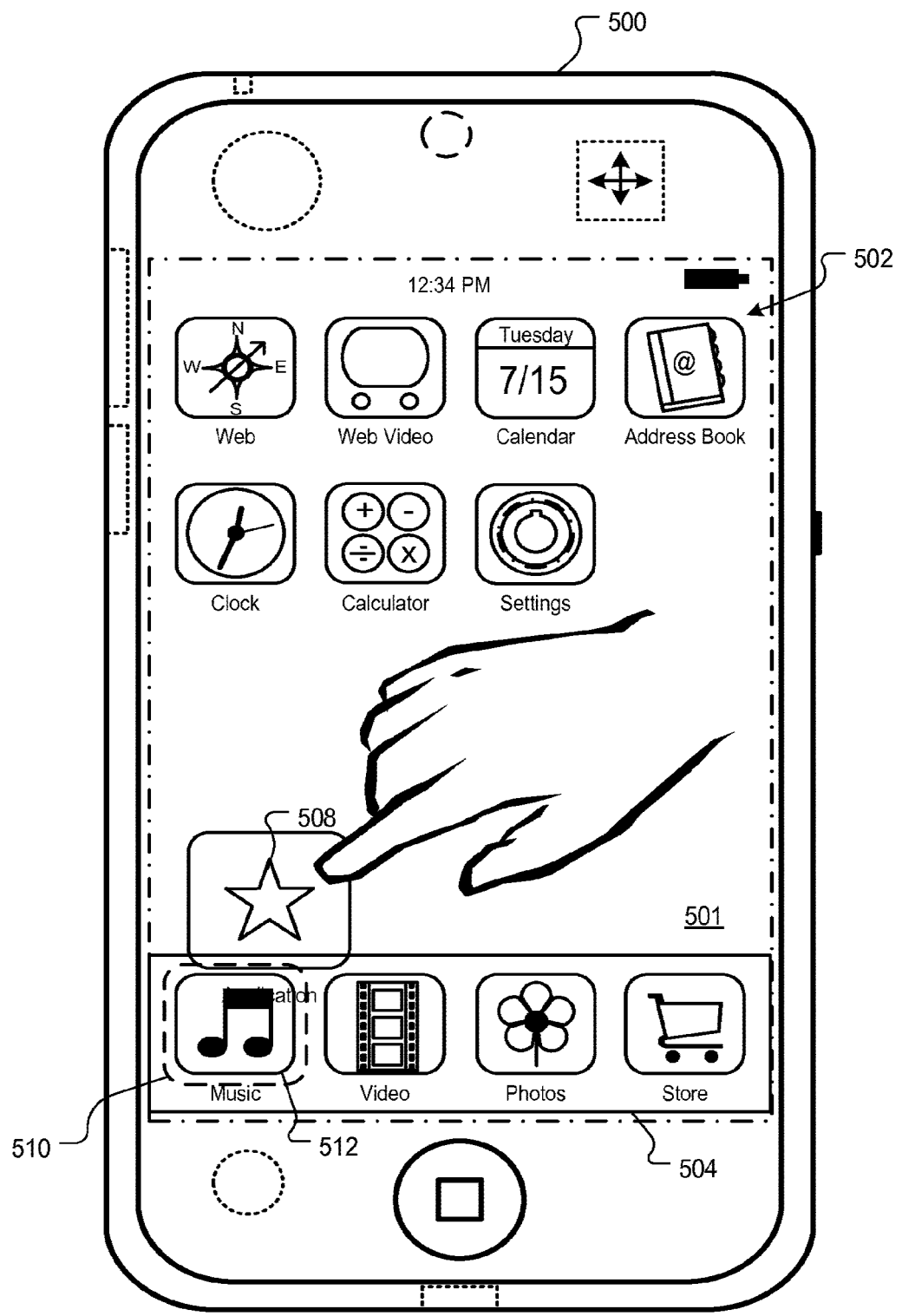
FIG. 5 is a block diagram of one embodiment of a portable electronic device illustrating repositioning of icons in one or more regions of a user interface.

FIG. 5 is a block diagram of one example of a portable electronic device illustrating the repositioning of user interface elements (hereinafter referred to generally as "icons") in one or more regions of a user interface. In some implementations, one or more icons 502 can be repositioned by a user in a user interface 501 of a device (e.g., portable electronic device 500). In some implementations, a user can initiate an interface reconfiguration mode on the device 500. While in the interface reconfiguration mode, one or more of the icons 502 can be repositioned in the user interface 501 by the user. While in the interface reconfiguration mode, the user can touch one of the icons 502 and drag it to a desired new position on the user interface 501. For example, the user can drag an icon 508 selected from the icons 502 to an empty or occupied position in a tray 504, in which case an occupying icon 512 will be replaced by the icon 508.

In some implementations, when the device 500 enters an interface reconfiguration mode, the icons 502 that are movable are displayed at a scaled size (e.g., scaled up by 150%). When the device 500 exits the interface reconfiguration mode, the icons 502 are displayed at their original size. Alternatively, an icon that the user touches and moves while the device 500 is in the interface reconfiguration mode (as opposed to all of the movable icons 502) is displayed at a scaled size to indicate its selection status to the user. When the touching ceases the icon can be displayed at its original size again. In other implementations, the selected icon can change color, animate, flash, change shape, display text or otherwise modify its visual appearance. In addition to changing its visual appearance, the device 500 can emit an audible sound (e.g., tone, succession of tones) to indicate its selection status. In some implementations, the repositioning of icons can be enabled without entering a reconfiguration mode on the device 500.

In some implementations where icons can be displayed in multiple "pages" and the user can navigate between the pages, as described in U.S. patent application Ser. No. 11/850,005, for "Application Menu User Interface," filed Sep. 4, 2007, which patent application is incorporated by reference herein in its entirety. In such implementations, the user can drag an icon from a first page of icons to a second page of icons. For example, a user can touch and drag an icon in the first page and drag the icon toward the edge of the user interface 501. When the icon is dragged to within a predetermined distance from the edge of the user interface 501 (e.g., 5 pixels), the first page of icons displayed on the user interface 501 can be replaced with a second page of icons. The user can then position the dragged icon within the second page, which is now displayed on the user interface 501.

In some implementations, a user can drag a first icon toward a second icon in the user interface 501 to exchange the positions of the two icons in the user interface 501. In this case, the second icon can be displayed with additional graphical effects to indicate its selection status for exchange with, or replacement by, the first icon. For example, the second icon can be displayed with an oscillating visual intensity, from a high intensity (e.g., bright) to a low intensity (e.g., dim) and back to high intensity. As another example, the second icon can be displayed with a "glow" effect. In some implementations, the additional graphical effects applied to the second icon can be triggered when the first icon is moved to within a predetermined distance of the second icon.

FIG. 5 illustrates an example mobile device 500 with a first icon 508 moved into proximity of a second icon 512 located in tray 504. The proximity can be x pixels (e.g., 1 pixel) from the periphery of the icon 512 as indicated by a boundary 510. When the first icon 508 is moved such that any part of the first icon 508 is within the region enclosed by the boundary 510, the second icon 512 can be displayed with additional graphical effects, such as a glow effect or an oscillating intensity, for example. In some implementations, the additional graphical effects are not displayed when the user releases the touch on the first icon 508 over the second icon 512, and thus having them exchange positions, or when the user moves the first icon 508 outside of the region enclosed by the boundary 510. In some implementations, the first icon 508 can be repositioned into an empty position in the tray 504. In such implementations, the outline 510 can be displayed to indicate the empty position within the tray 504 where the first icon 508 will be positioned when the user releases the touch. Other visual feedback can be provided to indicate an empty or available position in the tray 504, such as changing the color or opacity of the position in the tray 504 or applying a graphic, pattern overlay or animated object at the position in the tray 504.

Process for Exchanging Icon Positions

Figure 6:
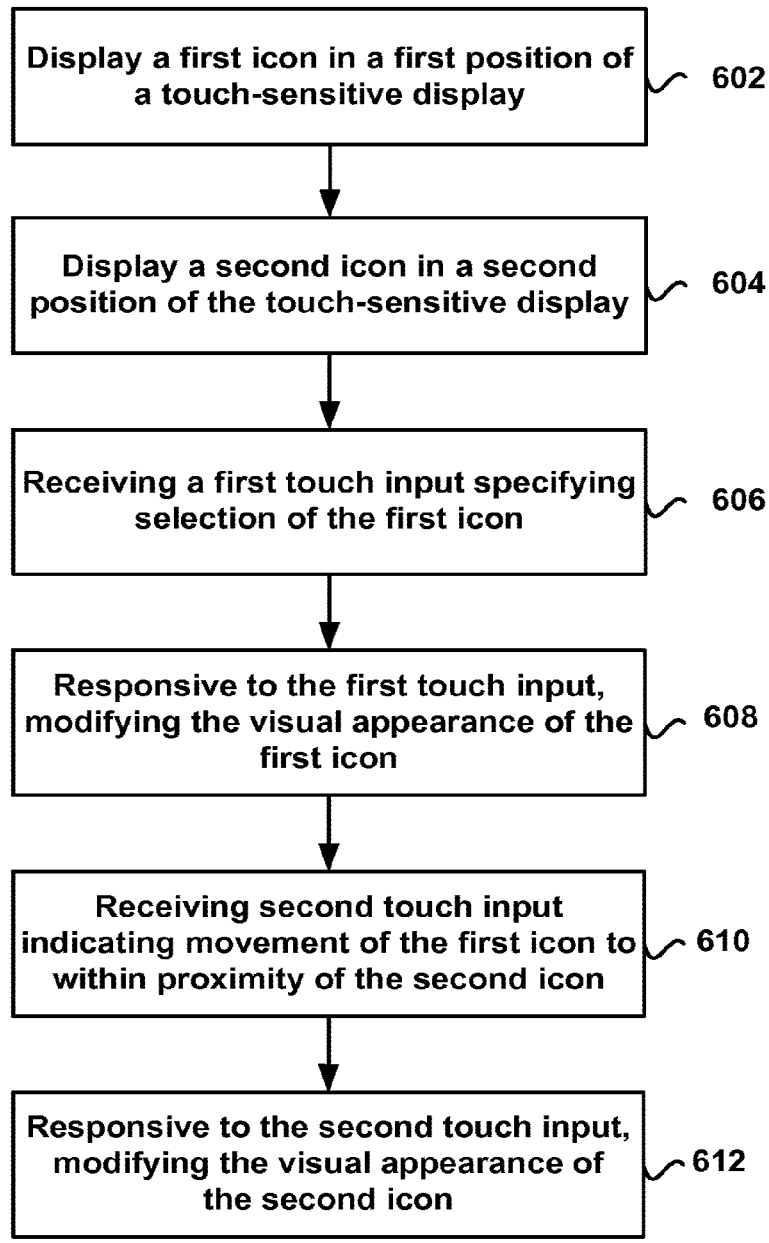
FIG. 6 is a flow diagram of one embodiment of a process for exchanging icons of a user interface.

FIG. 6 is a flow diagram of an example process 600 for exchanging icons of a user interface. In some implementations, the process 600 includes displaying a first icon in a first position of a touch-sensitive display (602). The touch-sensitive display can be a multi-touch sensitive display which is responsive to finger gestures as well as touch. A second icon is displayed in, or associated with, a second position of the touch-sensitive display (604). In some implementations, the first and second icon positions can be in different regions of a user interface. For example, the first region can be used to display a first set of icons and the second region can be a tray, dock, menu bar, a second page or any other user interface element capable of displaying a second set of icons in a manner that visually distinguishes or otherwise prominently displays the second set of icons from the first set of icons. The second set of icons can include icons that are frequently used icons or icons that have a common property or attribute (e.g. application icons).

The process 600 receives a first touch input specifying selection of the first icon (606). The touch can be with a finger or styles. Responsive to the first touch input, the visual appearance of the first icon is modified (608). Some examples of modifying the visual appearance of the first icon include but are not limited to: scaling, changing color, vibrating, bouncing, displaying text, animating, etc.

The process 600 receives a second touch input indicating movement of the first icon to within proximity of the second icon (610). The movement can be the dragging of the first icon across the display. In some implementations, proximity to the second icon occurs when a (transparent or non-transparent) boundary line at least partially surrounding the second icon is touched or crossed by the first icon as a result of, or in response to, the movement.

Responsive to the second touch input, the visual appearance of the second icon can be modified (612). Some examples of modifying the second icon include but are not limited to: scaling, applying a glowing effect, changing color, vibrating, bouncing, animating, etc.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device comprising:
a touch-sensitive display;
one or more processors;
memory; and
one or more programs, wherein one or more programs are stored in the memory and configured to be executed by the one or more processors, the one or more programs including instructions for:
concurrently displaying a plurality of application icons;
while concurrently displaying the plurality of application icons:
detecting a touch input on a first application icon from the plurality of application icons located in a first position on the touch-sensitive display;
determining whether the touch input on the first application icon located in the first position on the touch-sensitive display remains in contact with the display for more than a predetermined time period;
in response to a determination that the touch input on the first application icon located in the first position on the touch-sensitive display remains in contact with the display for less than the predetermined time period, activating an application associated with the first application icon;
in response to a determination that the touch input on the first application icon located in the first position on the touch-sensitive display remains in contact with the display for more than the predetermined time period, modifying a visual appearance of the first application icon automatically upon the determination that the touch input on the first application icon located in the first position on the touch-sensitive display remains in contact with the display for more than the predetermined time period;
after determining that the touch input on the first application icon located in the first position on the touch-sensitive display remains in contact with the display for more than the predetermined time period, detecting movement of the touch input from the first position to a second position on the touch-sensitive display, wherein the detected movement of the touch input causes the first application icon to be moved from the first position to the second position on the touch-sensitive display such that the first application icon ceases to be displayed in the first position;

in response to detecting movement of the touch input from the first position to the second position on the touch-sensitive display, modifying a visual appearance of the second position while concurrently displaying the first application icon at the second position;

after modifying a visual appearance of the second position while concurrently displaying the first application icon at the second position, detecting a lift off of the touch input at the second position on the touch-sensitive display; and in response to detecting the lift off of the touch input at the second position on the touch-sensitive display, continuing to display the first application icon in the second position on the touch-sensitive display.

2. The device of claim 1, wherein the instructions further comprises:
providing feedback to a user in response to displaying the first application icon in the second position.

3. The device of claim 2, wherein the feedback comprises at least one of audio feedback and tactile feedback.

4. The device of claim 1, wherein modifying the visual appearance of the second position comprises displaying a marker.

5. The device of claim 1, wherein modifying the visual appearance of the second position comprises displaying a line indicating at least partially a boundary of the second position.

6. The device of claim 1, wherein the second position is occupied by a second application icon prior to the first application icon being moved to the second position.

7. The device of claim 1, wherein the instructions further comprises:
displaying a second application icon on the touch-sensitive display;
detecting movement of the touch input that causes the first application icon to be moved from the first position to a position within a proximity of the second application icon on the touch-sensitive display; and
in response to detecting movement of the touch input that causes the first application icon to be moved from the first position to the position within a proximity of the second application icon on the touch-sensitive display, modifying a visual appearance of the second application icon.

8. The device of claim 7, wherein modifying the visual appearance of the second application icon comprises at least one of:
applying a glowing effect to the second application icon, and
exchanging positions of the first and second application icons.

9. The device of claim 1, wherein the touch-sensitive display is a multi-touch-sensitive display that is responsive to finger gestures.

10. The device of claim 1; wherein modifying the visual appearance of the first application icon comprises scaling the first application icon to a different size.

11. The device of claim 1, wherein detecting movement of the touch input that causes the first application icon to be moved from the first position to the second position comprises:
determining whether the detected movement of the touch input has touched or crossed a boundary line at least partially surrounding the second position on the touch-sensitive display.

12. The device of claim 1; wherein the touch input on the touch-sensitive display that causes the first application icon to be selected is a stationary touch contact with the touch-sensitive display on the first application icon that lasts for more than the predefined time period.

13. The device of claim 1, wherein modifying a visual appearance of the first application icon includes continuing to fully display the first application icon.

14. A non-transitory computer readable storage medium having one or more programs stored thereon, which, when executed by a portable electronic device with a touch-sensitive display, cause the device to perform operations comprising:
concurrently displaying a plurality of application icons;
while concurrently displaying the plurality of application icons:
detecting a touch input on a first application icon from the plurality of application icons located in a first position on the touch-sensitive display;
determining whether the touch input on the first application icon located in the first position on the touch-sensitive display remains in contact with the display for more than a predetermined time period;
in response to a determination that the touch input on the first application icon located in the first position on the touch-sensitive display remains in contact with the display for less than the predetermined time period, activating an application associated with the first application icon;
in response to a determination that the touch input on the first application icon located in the first position on the touch-sensitive display remains in contact with the display for more than the predetermined time period, modifying a visual appearance of the first application icon automatically upon the determination that the touch input on the first application icon located in the first position on the touch-sensitive display remains in contact with the display for more than the predetermined time period;
after determining that the touch input on the first application icon located in the first position on the touch-sensitive display remains in contact with the display for more than the predetermined time period, detecting movement of the touch input from the first position to a second position on the touch-sensitive display, wherein the detected movement of the touch input causes the first application icon to be moved from the first position to the second position on the touch-sensitive display such that the first application icon ceases to be displayed in the first position;
in response to detecting movement of the touch input from the first position to the second position on the touch-sensitive display, modifying a visual appearance of the second position while concurrently displaying the first application icon at the second position;
after modifying a visual appearance of the second position while concurrently displaying the first application icon at the second position, detecting a lift off of the touch input at the second position on the touch-sensitive display; and
in response to detecting the lift off of the touch input at the second position on the touch-sensitive display, continuing to display the first application icon in the second position on the touch-sensitive display.

15. The storage medium of claim 14, wherein the operations further comprises:

providing feedback to a user in response to displaying the first application icon in the second position.

16. The storage medium of claim 15, wherein the feedback comprises at least one of audio feedback and tactile feedback.

17. The storage medium of claim 14, wherein modifying the visual appearance of the second position comprises displaying a marker.

18. The storage medium of claim 14, wherein modifying the visual appearance of the second position comprises displaying a line indicating at least partially a boundary of the second position.

19. The storage medium of claim 14, wherein the second position is occupied by a second application icon prior to the first application icon being moved to the second position.

20. The storage medium of claim 14, wherein the operations further comprises:
   displaying a second application icon on the touch-sensitive display;
   detecting movement of the touch input that causes the first application icon to be moved from the first position to a position within a proximity of the second application icon on the touch-sensitive display; and
   in response to detecting movement of the touch input that causes the first application icon to be moved from the first position to the position within a proximity of the second application icon on the touch-sensitive display, modifying a visual appearance of the second application icon.

21. The storage medium of claim 20, wherein modifying the visual appearance of the second application icon comprises at least one of:
   applying a glowing effect to the second application icon, and
   exchanging positions of the first and second application icons.

22. The storage medium of claim 14, wherein the touch-sensitive display is a multi-touch-sensitive display that is responsive to finger gestures.

23. The storage medium of claim 14, wherein modifying the visual appearance of the first application icon comprises scaling the first application icon to a different size.

24. The storage medium of claim 14, wherein detecting movement of the touch input that causes the first application icon to be moved from the first position to the second position comprises:
   determining whether the detected movement of the touch input has touched or crossed a boundary line at least partially surrounding the second position on the touch-sensitive display.

25. The storage medium of claim 14, wherein the touch input on the touch-sensitive display that causes the first application icon to be selected is a stationary touch contact with the touch-sensitive display on the first application icon that lasts for more than the predefined time period.

26. The storage medium of claim 14, wherein modifying a visual appearance of the first application icon includes continuing to fully display the first application icon.

27. A method comprising:
   at a portable electronic device with a touch-sensitive display:
      concurrently displaying a plurality of application icons;
      while concurrently displaying the plurality of application icons:
         detecting a touch input on a first application icon from the plurality of application icons located in a first position on the touch-sensitive display;
         determining whether the touch input on the first application icon located in the first position on the touch-sensitive display remains in contact with the display for more than a predetermined time period;
         in response to a determination that the touch input on the first application icon located in the first position on the touch-sensitive display remains in contact with the display for less than the predetermined time period, activating an application associated with the first application icon;
         in response to a determination that the touch input on the first application icon located in the first position on the touch-sensitive display remains in contact with the display for more than the predetermined time period, modifying a visual appearance of the first application icon automatically upon the determination that the touch input on the first application icon located in the first position on the touch-sensitive display remains in contact with the display for more than the predetermined time period;
         after determining that the touch input on the first application icon located in the first position on the touch-sensitive display remains in contact with the display for more than the predetermined time period, detecting movement of the touch input from the first position to a second position on the touch-sensitive display, wherein the detected movement of the touch input causes the first application icon to be moved from the first position to the second position on the touch-sensitive display such that the first application icon ceases to be displayed in the first position;
         in response to detecting movement of the touch input from the first position to the second position on the touch-sensitive display, modifying a visual appearance of the second position while concurrently displaying the first application icon at the second position;
         after modifying a visual appearance of the second position while concurrently displaying the first application icon at the second position, detecting a lift off of the touch input at the second position on the touch-sensitive display; and
         in response to detecting the lift off of the touch input at the second position on the touch-sensitive display, continuing to display the first application icon in the second position on the touch-sensitive display.

28. The method of claim 27, wherein the second position is occupied by a second application icon prior to the first application icon being moved to the second position.

29. The method of claim 27, wherein modifying the visual appearance of the second position comprises displaying a marker.

30. The method of claim 27, wherein the touch input on the touch-sensitive display that causes the first application icon to be selected is a stationary touch contact with the touch-sensitive display on the first application icon that lasts for more than the predefined time period.

31. The method of claim 27, wherein modifying the visual appearance of the second position comprises displaying a line indicating at least partially a boundary of the second position.

32. The method of claim 27, wherein modifying a visual appearance of the first application icon includes continuing to fully display the first application icon.

* * * * *

UNITED STATES PATENT AND TRADEMARK OFFICE
CERTIFICATE OF CORRECTION

PATENT NO. : 11,010,017 B2
APPLICATION NO. : 14/261112
DATED : May 18, 2021
INVENTOR(S) : Imran A. Chaudhri et al.

It is certified that error appears in the above-identified patent and that said Letters Patent is hereby corrected as shown below:

On the Title Page

Item (72), Inventors, Line 3, after "Steven P. Jobs" insert -- Cupertino, CA (US) --, therefor.

In the Claims

In Claim 1, at Column 12, Line 24, delete "wherein" and insert -- the --, therefor.

In Claim 10, at Column 13, Line 57, delete "claim 1;" and insert -- claim 1, --, therefor.

In Claim 12, at Column 14, Line 1, delete "claim 1;" and insert -- claim 1, --, therefor.

Signed and Sealed this
Thirteenth Day of September, 2022

Katherine Kelly Vidal
*Director of the United States Patent and Trademark Office*